(12) United States Patent
Malek et al.

(10) Patent No.: US 7,308,418 B2
(45) Date of Patent: Dec. 11, 2007

(54) DETERMINING DESIGN PREFERENCES OF A GROUP

(75) Inventors: Kamal M. Malek, Weston, MA (US); David B. Teller, Boston, MA (US); Kevin D. Karty, Los Alamos, NM (US)

(73) Assignee: Affinova, Inc., Waltham, MA (US)

( * ) Notice: Subject to any disclaimer, the term of this patent is extended or adjusted under 35 U.S.C. 154(b) by 347 days.

(21) Appl. No.: 10/852,356

(22) Filed: May 24, 2004

(65) Prior Publication Data

US 2005/0261953 A1 Nov. 24, 2005

(51) Int. Cl.
*G06F 17/30* (2006.01)
(52) U.S. Cl. .......................................... 705/10; 706/13
(58) Field of Classification Search ................ 705/10; 706/13
See application file for complete search history.

(56) References Cited

U.S. PATENT DOCUMENTS

| | | | |
|---|---|---|---|
| 4,935,877 A | 6/1990 | Koza | 706/13 |
| 5,041,972 A | 8/1991 | Frost | 705/10 |
| 5,124,911 A | 6/1992 | Sack | 705/10 |
| 5,222,192 A | 6/1993 | Shaefer | 706/13 |
| 5,255,345 A | 10/1993 | Shaefer | 706/13 |
| 5,375,195 A | 12/1994 | Johnston | 345/630 |
| 5,400,248 A | 3/1995 | Chisholm | 705/12 |
| 5,559,729 A | 9/1996 | Abe | 703/2 |
| 5,651,098 A * | 7/1997 | Inoue et al. | 706/13 |
| 5,654,098 A * | 8/1997 | Aono et al. | 428/373 |
| 5,687,369 A * | 11/1997 | Li | 707/203 |
| 5,913,204 A | 6/1999 | Kelly | 705/500 |
| 5,930,780 A | 7/1999 | Hughes et al. | 706/13 |
| 5,995,951 A | 11/1999 | Ferguson | 706/10 |
| 6,078,740 A | 6/2000 | DeTreville | 703/22 |
| 6,088,510 A | 7/2000 | Sims | 706/13 |

(Continued)

FOREIGN PATENT DOCUMENTS

WO    WO 00/02138    *    1/2000

OTHER PUBLICATIONS

DSS Research A Review of Conjoint Analysis), Dec. 1999, The power of Information; pp. 1-8.*

(Continued)

*Primary Examiner*—Romain Jeanty
(74) *Attorney, Agent, or Firm*—George Nicholas Chaclas; Edwards Angell Palmer & Dodge LLP

(57) ABSTRACT

Disclosed are methods and apparatus for conducting market research and developing product designs. The methods involve generating and presenting, typically electronically, generations of design alternatives to persons participating in the design, selection, or market research exercise. The participants transmit data indicative of their preferences among or between the presented design alternatives. Some of the data is used to conduct a conjoint analysis or non-convergent exercise to investigate the drivers of the preferences of the group or its members, and at least a portion are used to derive follow-on generations of design alternatives or proposals. The follow-on designs are preferably generated through the use of an evolutionary or genetic computer program, influenced by the participants' preferences. The process results in the generation of one or more preferred product forms and information permitting a better understanding of what attributes of the product influence the preferences of the test group members.

59 Claims, 34 Drawing Sheets

U.S. PATENT DOCUMENTS

| | | | |
|---|---|---|---|
| 6,125,351 | A | 9/2000 | Kauffman ........................ 705/7 |
| 6,236,977 | B1 * | 5/2001 | Verba et al. ................... 705/10 |
| 6,249,714 | B1 * | 6/2001 | Hocaoglu et al. ............. 700/97 |
| 6,281,651 | B1 * | 8/2001 | Haanpaa et al. ........ 318/568.11 |
| 6,460,036 | B1 * | 10/2002 | Herz ............................ 707/10 |
| 6,915,269 | B1 * | 7/2005 | Shapiro et al. ................ 705/10 |
| 6,934,748 | B1 | 8/2005 | Louviere et al. |
| 2002/0016731 | A1 | 2/2002 | Kupersmit |
| 2002/0077881 | A1 | 6/2002 | Krotki |
| 2004/0123247 | A1 | 6/2004 | Wachen et al. |

OTHER PUBLICATIONS

Cattin et al Commercial Use of Conjoint Analysis: A Survey), Aug. 1982, Journal of Marketing, pp. 44-53.*

Su et al (An Internet-based negotiation server for e-commerce), Jan. 2001, The VLDB Journal, vol. 10, Issue 1, pp. 72-90.*

Sims, "Artificial Evolution for Computer Graphics," *Computer Graphics*, 25(4):319-328 (Jul. 1991).

Kim et al., "Knowledge-based Encoding in Interactive Genetic Algorithm for a Fashion Design Aid System," Genetic and Evolutionary Computation Conference; Jul. 10-12, 2000, p. 757.

Garcia, "Computer Screen Design Aided by a Genetic Algorithm," in *Late Breaking Papers at the 2000 Genetic and Evolutionary Computation Conference*, Whitley, D. ed. (2000) pp. 98-101.

Balakrishnan et al., "Genetic Algorithms for Product Design," *Management Science* 42(8):1105-1117 (Aug. 1996).

Graf et al., "Interactive Evolution of Images," *Evolutionary Programming IV—Proc. Fourth Annual Conf.—Evolutionary Programming*, MIT Press: Cambridge, Mass., 53-65 (1995).

Rowland, "Computer Graphic Control over Human Face and Head Appearance, Genetic Optimisation of Perceptual Characteristics," Ph.D. Thesis, University of St. Andrews, Scotland (Jan. 5, 1998).

Haupt et al., *Practical Genetic Algorithms*, 66-70 & 85-88 (1998).

Kim et al., "Application of Interactive Genetic Algorithm to Fashion Design," *Engineering Applications of Artificial Intelligence* 13:635-644 (2000).

O'Reilly et al., "A Preliminary Investigation of Evolution as a Form Design Strategy," in *Artificial Life VI*, MIT Press: Cambridge, Mass. (1998).

O'Reilly et al., "Evolution as a design strategy for nonlinear architecture: Generative modeling of 3-D surfaces," (1998).

Johnston, *Why We Feel: The Science of Human Emotions*, Perseus Books: Cambridge, Mass. 152-155 (1999).

Witbrock et al., "Evolving Genetic Art," *Evolutionary Design by Computers*, 251-259 (1999).

Steiner et al., "A Probabilistic One-Step Approach to the Optimal Product Line Design Problem Using Conjoint and Cost Data," *Review of Marketing Science Working Papers* vol. 1(4) (2002).

4-page International Search Report for PCT/2005/17179.

3-page Written Opinion of the International Searching Authority for PCT/US2005/17179.

5-page International Preliminary Report on Patentability for PCT/US2005/17179.

9-page International Preliminary Report on Patentability for PCT/US2005/21948.

Ely Dahan and V. Srinivasan, The Predictive Power of Internet-Based Product Concept Testing Using Visual Depiction and Animation, Journal of Production Innovation Management, vol. 17, 2000, pp. 99-109.

2-page International Search Report for PCT/US2005/021948.

7-page Written Opinion of the International Searching Authority for PCT/US2005/021948.

* cited by examiner

FIG. 7C

DETERMINING DESIGN PREFERENCES OF A GROUP

BACKGROUND OF THE INVENTION

This invention relates to improvements in the process of developing new products and services, and the attendant activities of consumer research, market segmentation, design iteration, market testing, and discerning consumer preference trends and attitudes, through direct customer participation.

In the past, many product development organizations relied on a few individuals in their design or marketing departments, or in their executive ranks, when designing new products. These individuals in turn relied on their knowledge of the market and the customer, on their understanding of the technological possibilities, and on their vision, judgment, experience, preferences, prejudices and biases.

More recently, companies have adopted flatter, less hierarchical organizational models, with decision-making responsibility pushed lower through the ranks, and they have embraced a new focus on the "voice of the customer." This movement was intended to remind them that as designers, they are mere proxies for the ultimate consumer of the goods or services being designed, and that the needs and desires of the customer should be the paramount input to that process.

But the process of going from the voice of the customer to a product or service that reflects it remains fraught with errors and the potential for distortions. The first source of error is in ascertaining the wants and needs of the customer; the second is in the process of translating that input into a decision, product, artifact or service without coloring and distorting it. Practitioners have developed and used several tools and techniques intended to assess the needs of the customer and to translate these needs into a product concept and into engineering requirements.

The tools and instruments that traditionally have been deployed by market researchers range from the highly qualitative methods borrowed from ethnography, such as open-ended interviewing, participant observation, and focus groups, to the highly popular quantitative statistical methods such as survey research and conjoint analysis. Co-pending U.S. application Ser. No. 10/053,353 filed Nov. 9, 2001 titled "METHOD AND APPARATUS FOR DYNAMIC, REAL-TIME MARKET SEGMENTATION", the disclosure of which is incorporated herein by reference, discloses a novel family of tools that have had very significant commercial success.

During the development of a new product or service, the design organization typically will undertake a number of market research studies. Early on during the project, these may be more qualitative in nature, intended to uncover latent needs, or to develop new ideas for products and services. Later, the research may be more focused, intended to obtain feedback from current or potential customers on certain features or attributes of the proposed product. These could rely on qualitative methods, a focus group for example, as well as quantitative ones, such as surveys or structured serial interviews. One problem with consumer clinics that ask participants for feedback on new products is that potential customers are typically shown, and asked to comment on, only a limited number of alternatives. This is done in order to keep the cognitive demands on the participants at a reasonable level and because the designs shown to the participants are in the form of models or prototypes that are sometimes costly to produce.

Furthermore, consumer clinics assume that people have preexistent preferences that are well-developed and stable. They therefore assume that the attitude that the participants form upon seeing the new product are valid and reflect the attitudes they will have when (and if) the product goes on the market. Yet, it is well-known that in many cases, people's long-term disposition towards a product differs from their initial reaction.

Another problem with clinics and focus groups has to do with the interpersonal dynamics that the situation entails. In general, group dynamics are desirable in the sense that the discussion that takes place between participants is the mechanism for generating data, and the desired output is the active sharing and comparison of the participants' experiences and opinions. Problems arise when one or a few strong individuals end up dominating and biasing the discussion. Another difficulty is finding participants who do not know one another. This is desirable in order to avoid having one participant choose a particular design simply because his or her friend also chose it. This situation arises often when the product or service being designed is targeted at a small group of users, or users who are all members of the same group, for example, designing a benefits package for the employees of one company. Similar problems arise when the potential customers for a product happen to be competitors, and therefore less willing to sit together and share their preferences.

Conjoint analysis is used to assess consumer preference for different choices of products and services. It is a multiattribute utility or preference measurement technique that explicitly accounts for the subjective tradeoffs people make when deciding among alternatives with multiple features and benefits. In its basic form, conjoint analysis is a decompositional technique: the parameters that measure the importance the decision maker ascribes to the different aspects of the product are derived, using statistical regression techniques, from the decision maker's evaluations of a number of full profile descriptions of the product or service. Conjoint analysis has been used in a wide range of applications, from developing soaps and dietary supplements to improving the appeal of military careers within the Department of Defense.

The first step in conducting a conjoint exercise is to identify the relevant attributes of the product or service in question, and to identify the levels of interest for each attribute. This is typically based on previous experience with similar products, and, on earlier qualitative research such as an open-ended interview or a focus group. As an example, in the case of an automobile study, engine displacement may be one attribute of interest, with 2.0, 2.5, and 3.0 liters the three levels to be tested; and body style may be another attribute, with "sedan" and "coupe" as the levels of interest. Next, a number of full-profile descriptions of potential products, that is, descriptions in which every attribute is represented by a value, usually using a highly fractionated factorial orthogonal design (i.e., only a small fraction of all possible product profiles are used in the test.) These profiles are shown to the respondent, traditionally in the form of prop cards, and the respondent is asked to rank them by order of preference or to rate each of them on an interval scale, for example, from 0-100. The responses then are analyzed using statistical tools such as Ordinary Least Squares regression to estimate the "part-worths" for each of the attribute levels, that is, the contribution of each attribute level to the overall preference level of a profile. Returning to the earlier example, it might turn out that for one particular respondent, a 2.0 liter engine has a part-worth of 0.0, the 2.5 liter a part-worth of 0.5, and so on; the "sedan" body style may have a part worth of 0.0, whereas the "coupe" style may have a value of 0.8. Once the part-worths for individual attributes are obtained in this way, it is then possible to search through all the possible combinations of attribute levels to synthesize the optimal product for that individual, that is, the product that would give him or her the highest possible level of utility, or that he or she would have the strongest intention of buying.

Conjoint analysis studies typically are conducted with more than one individual, and part-worths are typically obtained for a representative sample of consumers. This multi-respondent data can be used for several purposes. One is to identify the product design that would result in the greatest market share for the product development organization, given the attributes of competing products on the market (current and expected; this is known as the "share-of-choices" problem). Another purpose is to identify the product design that would maximize overall consumer utility, that is, the sum of utilities across all the consumers; this is known as the "buyer's welfare" problem. Solving these search problems is a hard computationally; mathematically, these are known as NP-Hard problems, requiring heuristic dynamic programming procedures for their solution. More recently, the adaptive search techniques of Genetic and Evolutionary Computation, more specifically Genetic Algorithms (GAs), have been used more effectively to find solutions to these problems.

Another purpose of collecting conjoint data from a representative group of participants is to identify distinct market segments with different preference profiles. This is done through cluster analysis, a statistical technique for finding subgroups of respondents such that respondents within a subgroup value the different product attributes similarly, but differently from respondents in other subgroups. Once clusters are identified, those that present significant commercial potential can be targeted with specific product designs.

Conjoint analysis has shortcomings. The first is the tediousness of participating in the process as a respondent. Generally, the product designers and marketers, by virtue of their intimate involvement with and knowledge of the product, want to answer a large number of issues and test a large number of attributes. The customers on the other hand are generally less engaged and reluctant to submit to lengthy questionnaires. And even though highly fractionated factorial designs are used, respondents are still typically asked to rate a considerable number of possibilities. For example, in a case where there are 12 product attributes, with four different levels for each attribute, the respondent would face about 35 profiles. That number is often multiplied by a factor of 3 in order to reduce the effect of random errors, resulting in the respondent having to face over 100 questions. The laboriousness of the process often leads to confusion and loss of attention and focus on the part of the respondents, who often end up resorting to heuristics as a shortcut for getting through the questionnaire (several example conjoint exercises can be found on the World Wide Web; see, for example, www.conjointonline.com). For example, instead of properly weighing all the attributes against one another, they only rely on one or two to make their decision, leading to inaccurate results.

More recently, several modifications to conjoint analysis that aim to reduce the tediousness of the process, and the resulting inaccuracy of the results, have been proposed and used in practice. These hybrid techniques do not consist exclusively of full profiles of hypothetical products, as in conventional conjoint analysis, but they start off by asking the respondent a set of self-explication questions (non-conjoint questions that involve no trade-offs), and follow that with partial-profile descriptions. Examples of such techniques include Adaptive Conjoint Analysis and the newer Hierarchical Bayes conjoint analysis.

In Adaptive Conjoint Analysis as implemented by Sawtooth Software (the most frequently used technique for commercial conjoint studies in both the United States and Europe), the survey starts by asking the respondent to eliminate those attribute levels that he or she would find unacceptable under any conditions. Those levels are no longer used in the subsequent part of the interview. Next, the respondent is asked to reduce the levels in each attribute to the 5 levels he or she is most likely to be interested in. The next step in the process asks the respondent to rate the importance of individual attributes; these ratings attempt to eliminate those attributes deemed unimportant, and to generate initial estimates of the respondent's utilities, which subsequently are used to generate a set of customized paired-comparison questions using partial profiles. With each response, the estimates of the respondent's utilities are updated, and appropriate paired-comparison questions generated. These questions are designed to converge and focus on the subspace of attribute comparisons that appears most favored by the respondent based on the earlier responses, with the objective of refining the estimates of that respondent's trade-off profile within that limited subspace.

Clearly, Adaptive Conjoint Analysis relies heavily on the self-explicated evaluation component of the questionnaire, where the decision-maker is asked explicitly to indicate his attitude towards various attributes separately. A key assumption behind that method is that the respondent's attitudes and preferences are pre-existent and stable. Adaptive conjoint relies on that assumption to quickly narrow the choices presented to the interviewee and reduce the workload imposed on him or her. Adaptive conjoint thus precludes the possibility that the respondent might uncover or evolve new personal preferences or attribute trade-off profiles as he or she participates in the study. The problem with that approach is the danger of reification of any preconceived notions or partial, ill-formed preferences the respondent might have a priori, resulting in a sub optimal to the product design problem. In fact, users of Adaptive Conjoint Analysis are warned against allowing respondents to eliminate attribute levels (the first step described in the previous paragraph) "unless there is no other way to make an interview acceptably brief."

A more recent development, Hierarchical Bayes conjoint analysis, improves on adaptive conjoint through the use of more robust and theoretically more defensible statistical methods. It does not however address the problem described above. Furthermore, Hierarchical Bayes Adaptive Conjoint Analysis relies on the responses of other participants in the study to improve the estimates of each individual's utilities; in other words, Hierarchical Bayes makes it possible to trade the number of the respondents surveyed with the workload on any individual respondent. It is highly computationally intensive procedure however, requiring several hours of running time on a typical personal computer; it is therefore not very useful in a real-time online context. The existing software products perform the Hierarchical Bayes analysis of the data obtained through an adaptive conjoint study after the fact, offline.

The second major shortcoming of conjoint analysis, one that is not addressed by any of the improved methodologies discussed above, stems from the assumption that the different product attributes are independent of one another. Conjoint analysis is a "main effects only" model; it assumes there are no interactions among attributes. In the additive part-worths model that is used universally, an individual's preference for a particular product is assumed to consist of the sum of independent functions of the attribute levels in that product. Using an automotive example again, a consumer's preference for exterior color, bright red versus dark gray for example, is assumed not to depend on body style, whether the automobile in question is a sport coupe or a luxury sedan. Yet we know empirically that bright red is a more popular on sporty cars than it is on luxury sedans. If the researcher suspects that there may be some interaction between two attributes (based on product knowledge or from statistical analysis), the solution within the conjoint analysis framework is to define composite variables ("superattributes") that are a combination of the two interacting attributes. These super-attributes are given the levels formed by combining the individual attribute levels. Returning to the previous example, the composite attribute would be "color-body style", and it would take on four levels (two times two): "bright red sports coupe", "bright red luxury sedan", "dark gray sport coupe", and "dark gray luxury sedan". The problem with that work-around is that it is highly deleterious to the respondent workload. (It is after all the main-effects only aspect of conjoint that makes possible the highly fractionated factorial designs.) Instead of two attributes with two levels each, we now have three attributes with a total of eight levels. This combinatorial explosion is much more severe when a more realistic number of individual attribute levels is used: in the case of five colors and five body styles, we would go from 10 levels (5+5) to a total of 35 levels (5+5+(5×5).) The number of parameters to be estimated by the conjoint study, and therefore the number of questions respondents are subjected to, increase in proportion to the number of these levels.

The "main-effects only" nature of conjoint analysis has a more subtle and insidious effect, as it affects how many marketers and product developers come to think about their products and services. By relying on conjoint analysis to obtain the voice of the customer, they tend to design studies that use those attributes of the product which are more readily decomposable; and they present them in a way that makes it easy for the respondents to separate them. Respondents end up focusing on a few of these attributes, and using them heuristically (as mentioned earlier), and not performing the additional mental processing that would reveal possible interaction between attributes. The result is an artificially good fit to the additive part-worths model, but poor predictive accuracy.

More fundamentally, the very notion that a product or service can be adequately described to a consumer by a set of attribute levels is itself problematic. Since conjoint analysis works by presenting decomposable stimuli to the respondent, it is particularly ill-suited for understanding how consumers evaluate important classes of products, namely, products that are perceived holistically by the consumer. Examples of such "unitary" products include, but are not limited to aesthetic objects, foods, fragrances, and music. In such cases, where the respondent cannot break the stimulus presented to him or her into component parts or attributes, attempting to build simple models of the respondent's preference based on factorially designed studies is unlikely to succeed.

By contrast, this invention does not require that the same factors used by the marketer or designer to alter the product presented to the respondent to assess his or her preference. In the present invention, the respondent is presented with a stimulus that matches the way in which he or she perceives the particular product or service in real-life.

SUMMARY OF THE INVENTION

The invention provides methods of efficiently analyzing the design preference tendencies from among various design alternatives for a product or service (referred to herein as a "decision object") of a group, e.g., a group of consumers. The methods may be used to gather rich data sets informative of the preferences of any given target group, to discern which attributes of a product or service are important or unimportant to the group, and to reveal product forms which respond to the "voice of the customer" faithfully and without bias. The methods are implemented electronically and typically asynchronously over a relatively short time period. They may be designed to meet any set of design or market research objectives, and to obtain data relevant to any specific design issues considered relevant to any type of product. Participants are easier to recruit than focus groups as they are presented with a relatively large time window into which to fit their engagement, and can work from any convenient location provided they are provided with a link to the network and a means of viewing or otherwise sensing the design objects and of logging their preferences.

Broadly, the methods comprise presenting, over an electronic network, to a plurality of individual "selectors," one or more groups of decision objects having a plurality of combinations of attributes; obtaining information from the selectors indicative of a preference of the respective selectors from among the presented decision objects; using the information to evolve or to select a derived group of decision objects comprising one or more different combinations of attributes; iterating these steps using a derived group to arrive at one or more preferred decision objects; and using at least some information from the selectors to implement a conjoint analysis to gather information relevant to the attribute preferences of the selectors. These data typically are combined in a report constituting a guide for successful product development.

In other embodiments, the invention provides a method of analyzing the design preference tendencies of a group of selectors comprising the steps of a) presenting, over an electronic network, to a plurality of selectors, one or more groups of decision objects having a plurality of combinations of attributes; b) obtaining data from the plurality of selectors indicative of a preference of a selector from among the presented decision objects; c) using at least some data from step (b) to implement a conjoint analysis to gather information relevant to the attribute preferences of the plurality of selectors; d) presenting, over an electronic network, to the same or a different group of selectors, one or more additional groups of decision objects having a plurality of combinations of attributes; e) obtaining information from a selector expressing a preference from among the presented additional decision objects; f) using the information to evolve or to select a derived group of decision objects comprising one or more different combinations of attributes; g) iterating steps (d) through (f), using a derived group from step (f) to arrive at one or more preferred decision objects; and g) upon achieving a stopping criterion, selecting one or a group of preferred decision objects for further development, manufacture, use, or sale.

A genetic algorithm may be used to evolve or to select the derived group of decision objects. The order of performance of the steps of the method are flexible. Thus, step (c) may be performed after step (g), or after step (h). The results of the conjoint analysis of step (c) may be used to influence the attribute combinations of the population of additional decision objects presented in step (d). The decision objects presented in step (a) may comprise random sets of attributes, or may comprise attributes designed to enhance the efficiency of the conjoint analysis. Before step (a), a plurality of questions may be presented to all or some of the selectors for a reply, to obtain demographic information and to qualify them, or to determine a starting point for the exercise by using their responses to questions to choose decision objects to be presented to that selector or others.

In a generic sense, the invention provides methods of determining both which of a large number of product forms is preferred by a selector (wherein each form has a plurality of alternative attributes or attribute values, i.e., decision objects), and determining preference information among attributes of the decision objects.

A "selector," as used herein, is one or a group of persons whose input is being considered during the course of the practice of a method of the invention. The selectors may comprise a person, a group of persons, a proxy for a person such as a machine learning system, a neural net, statistical or other mathematical model, or expert system, or a combination thereof. "Selector" may refer either to a collection of entities participating in an exercise, or the individual entities participating in an exercise. A selector may be a focus group or the individual members thereof, a working group of designers and/or managers within a company or professional design service organization, a group of people representative of a target demographic group, members of a club or class dedicated to some activity or pursuit, enthusiasts who are potential customers for a given product such as dog owners, golfers, interior decorators, cyclists, homeowners, teen-aged boys, persons who are employed by a company or who work within an industry, etc. Persons acting as selectors have presented to them once or serially groups of, for example, two to a dozen or so different possible design forms.

The selector also may comprise a group of persons engaged in a cooperative design of a product, such as a group of young women designing next spring's fashions, a professional industrial design group designing an automobile seat, a small group of architects designing a home for a client, or a group of musicians composing a piece of music. In this case, once a consensus for a design is reached the method may include the additional step of producing a plurality of units of a selected product form or a product resembling that form. When the selector is a group of persons, the derived group of product forms presented to a person in the group may be generated using data indicative of the preferences expressed by one or more other persons in the group. Also, the invention contemplates repeating the presentation of specific product forms within a particular derived group to one or more persons serving as the selector.

"Preference," which may also be referred to as "affinity," as used herein indicates a selector's favor (or disfavor) for a particular item having a set of attributes. In one embodiment a positive affinity value indicates that the selector favors a particular item while a negative value indicates that the selector disfavors that item.

In the methods of the invention, proposed designs are presented to the participants, and feedback from the latter is collected via, for example, individual personal computers connected in a network such as an intranet, an extranet, or the internet. It is accordingly possible to control the interpersonal dynamics among the participants. It is also possible to isolate them completely from one another, so that no one of them is aware of the preferences expressed by the others.

It is also possible to allow selective levels of information to be shared among the participants, to initiate a real or virtual group discussion, to control the degree of social pressure they may feel, to satisfy a craving for information about the status or direction of the project, or for information about what products others have purchased. This could be used to mimic the network externalities that take place in real life, where some people tend to favor the same products that their peers are buying and consuming, while others may choose to take a contrarian attitude. This is important in such products as fashion apparel or accessories, investment instruments or portfolios, computer software, and so on. Furthermore, by connecting participants via a computer network, it is possible to assemble a group of participants that are located in very different geographical locales, and to permit asynchronous participation. The methods thus also facilitate time management, as they reduce the need to bring together all participants at the same time by seamlessly integrating data that is received at different points in time (in certain embodiments of the invention).

"Products," as used herein and explained more fully below, are represented as decision objects, and is intended to be a generic term referring to goods, such as objects intended to be mass produced, modularized goods such as personal computers which comprise a plurality of interchangeable parts suitable for mass customization, services, such as mutual funds or travel services, packaging and advertising copy, and plans, such as a written list of alternatives for governing future conduct of an individual or organization, such as a business plan or a menu of food items to be consumed by a group, or other manufactured consumer goods.

"Attributes" of a product, as used herein, is intended to refer to the structural, functional, stylistic, or economic features constituting decision objects, e.g., components of the product, service or plan, and include things such as cost, color or color combination, size, strength, shape, style, pattern, length, weight, content feature, theme, option, choice of material, softness, etc. The product attributes may be aesthetic or functional. A given product has a series of possible attributes that are combined using the method of the invention to develop a design. Different types of objects of the design or selection obviously will have different groups of possible attributes. Thus, for example, designs for an aesthetically pleasing exterior appearance of a hands-free telephone would have "attributes" such as material (e.g., plastic or metal), distribution of materials (e.g., plastic sides with metal top), texture, color, color combination, length, width, and thickness. Designs for a billboard would have attributes such as dimension, aspect ratio, dominant color, background color, color scheme, size of print, and presence or absence of pictorial material.

The term "attribute" denotes both elements that are absolute, in the sense that they are either present in the product or not, and relative, in the sense that an attribute can have many values, or be broken down into many subtypes. In this respect, the meaning of "attribute" as used herein is broader, and distinct from the term as used in the conjoint analysis literature. An example of the former is the presence or absence of a clock in an auto dashboard design or a collar on a dress design. An example of the latter is the radius or other measure of the degree of curvature on the bow of a boat hull design, or the reflectivity of the glass covering a building.

Broadly, the invention involves generating and presenting, typically electronically, a number of design alternatives to persons who are participating in the design, selection, or market research exercise. The participants (selectors) transmit data indicative of their preferences among or between the presented design alternatives, and that data is used to derive or select a new generation of design alternatives or proposals, as a basis for a conjoint analysis to determine attribute preference information, or both. In a given exercise, decision objects specifically designed or selected to enhance a conjoint analysis (or random decision objects) are presented to a selector. These decision objects may be presented first, or at any time, and that data is used to perform a conjoint analysis, either on the fly as the exercise continues, or after termination of data collection. In one embodiment, an iterative design exercise is conducted as disclosed in co-pending U.S. application Ser. No. 10/053,353, wherein expressed preference data is used to drive the selection of subsequently presented decision objects or to evolve in real time new decision objects to be presented in subsequent iterations. In this embodiment, the preference information also is used to conduct a conjoint exercise. This permits group preference determination not only of overall designs, but also of the attributes driving the design preferences. In a preferred embodiment, data from early-presented decision objects provide the basis of a conjoint analysis. The results of the conjoint analysis are then used to populate, or determine attribute levels or combinations of attributes for decision objects used in a subsequent, typically seamless, iterative design exercise. In still another embodiment, interspersed in the respective presentations, are displays designed to facilitate conjoint analysis. In this embodiment, the displays may have been driven by earlier preference data. A conjoint analysis may be done at any time after sufficient objective data is collected, e.g., while the exercise is in progress or after its data collection phase terminates. This permits development of rich market information predictive of consumer behavior.

Presented decision objects directed to the task of generating data for subsequent conjoint analysis may have attributes selected randomly, or may be specifically designed for the purpose by an expert or by an algorithm. The new decision objects, or derived product forms, for presentation in the iterative design exercise, preferably are generated through the use of a computer program exploiting a genetic or evolutionary computational technique. The process is repeated, typically for many iterations or cycles.

Depending on the purpose of the effort, and how the method is designed and run, the experiment can be used in a number of new and useful ways. It can serve to design new products or services that are appealing to individual consumers or a targeted group of consumer. It can be used to facilitate group design efforts or to conduct market research in a better way than previously possible. For example research could include, but is not limited to, probing the affinity of individual consumers, demographically defined groups of consumers, or consumers with a particular state of mind, for a given product or service, elucidating the attributes of the design that are important or unimportant to the consumer appeal.

The invention may exploit various ways to gather data indicative of preference and various ways to tabulate, filter or aggregate, and use that data. Thus, data obtained from a subset of the persons comprising the selector may be given a disproportionate influence on the generation of the derived group of product forms, i.e., discounted, elevated in importance, or ignored. The selector may be permitted to specify an attribute of said product before or during the iterations of derived groups. This may involve fixing the value of that attribute at a particular value, or preventing that attribute from taking on particular values that the participant finds undesirable. Before beginning the iterative selection/design/analysis process, the system may obtain certain preference information from the selector and may use at least a portion of the information obtained in such prescreening to constrain the subsequent generation of derived product forms. For example, such information may include the range of prices the seller is willing to pay for the product, product style information, color preference, material preference, a performance specification, or a list of selector desired product functions.

Viewed from another perspective, the invention comprises a computer-aided bridge between incompatible constituent elements of the language of the science of design, on the one hand, and the cognitive language and thought processes employed by consumers when they consider their preferences or consider a purchase. It is this dichotomy which heretofore has inhibited effective consumer input to design tasks, input that is truly reflective of their preferences. The design analysis embodiments of the invention described herein essentially comprises a computer-mediated translation device, converting seamlessly and effectively the preferences of consumers, which often defy verbal description, into design-specific data specified through variables useful in implementing design. By allowing a consumer to evaluate an evolving set of whole designs, each of which incorporates aspects relative to that consumer's preference determination, the consumer is permitted to drive directly the design or product selection process without being familiar with specific design attributes or language. The product selection process may be driven by the consumer consciously revealing the preferred (or disfavored) features of the product, or by the consumer subconsciously driving the development of the winning design(s).

As noted generally above the preferred apparatus for implementing the methods of the invention comprise a network wherein the program resides in a server which is linked to plural terminals. The terminals employed in the apparatus may comprise a computer, a television, a telephone, a personal digital assistant, or other electronic device coupled wirelessly or via wires to a server. The apparatus most typically comprises a plurality of terminals. Of course, given the current state of the information technology art, other system architectures may be used to embody the system of the invention for implementing its various methodologies.

The method may involve iterating the cycle of selection and derived product form generation a sufficient number of times to permit determination of one or a plurality of product forms preferred by the selector. Particularly in a group design effort where the selector is a group of consumers, this may lead to the identification of more than one preferred design. Collecting demographic data about the selector and correlating the product forms preferred by the selector to the demographic data permits identification of market segments which may be exploited using differing strategies. Accordingly, the invention facilitates a new form of market research, in which its proprietor is enabled to discern the relative affinity of a consumer or group of consumers for a given product form, or to discern market segments, for example, early adapters, late majority, etc, and to determine attribute preference information.

The derived group of product forms next are presented to one or more persons comprising the selectors, who again input data indicative of their preferences, this time with respect to the new set of product forms, and the process is repeated until a stopping criterion is met. The stopping criterion may be, for example, a decision to purchase made by the selector, the cycling of a predetermined number of iterations, the reaching of a consensus agreement on attributes by a plurality of persons comprising the selector; the participation of a predetermined number of persons comprising the selector; the achievement of a predetermined number of assessments, the passage of a predetermined time for conducting the exercise, the arrival of a point in time in the future, the intervention of a supervisor such as a person who judges that a good design has been achieved, the lack of improvement in emerging product forms as judged by a person comprising the selector or a supervisor, or a suitably programmed computer; the selection of a specific product form by a person comprising the selector, the convergence of all design alternatives generated by the evolutionary algorithm to a small enough number of possibilities (i.e., the loss of genetic diversity or the arrival of a certain level of similarity in the population of designs), or some combination thereof.

Persons participating in the exercise making up the selectors will of course have preference profiles that may well evolve during a design cycle. The participant may be influenced by peer choice in group dynamics. Also, his or her preferences may be adjusted because he or she sees and thinks about alternatives in a more rigorous way then may otherwise be the case. Perhaps most significantly, participation in a design exercise by a person may well serve to increase that participant's confidence level in providing evaluations. Often, early generations of product alternatives may be fraught with low confidence evaluations. However, during the evolutionary design process, as the consumer's preferences are increasingly reflected in the design attributes, the consumer's own evaluations may well be made with a greater confidence. A similar phenomenon is that some consumers make purchase decisions more confidently if they have researched a product. Furthermore, inclusion of the consumer's design through repeated steps and the concentrated thinking about what really is his preference may well lead to a higher frequency of purchases than otherwise might be the case. Based on these behavioral insights, in accordance with the invention, in some embodiments it may be valuable to permit participants to input data indicative of the confidence they have in their preference at least at some points in the iterative process. The level of confidence in a design as expressed by a participant can be used as a cycle stop criterion, at least with respect to a particular participant.

The invention contemplates the use of a wide variety of programming techniques to aid in the achievement of the goals of a given exercise. Generally, many known computational techniques can be exploited in the design of computer programs useful in the methods and apparatus of the invention, and they can be adapted by the skilled programmer to achieve a given purpose. The preferred techniques for use in iterative design exercises are genetic or evolutionary computation techniques (GEC's) such as genetic algorithms, evolution strategies, distribution estimation algorithms, and genetic programming; other computational techniques the use of which is contemplated in the present invention include generative grammars, hill-climbing, simulated annealing, random search, a generator of random attribute values, statistical design of experiments techniques, or a combination thereof. Conventional conjoint analysis techniques may be used.

The program may execute a genetic algorithm operation, an evolution strategy operation, a genetic programming operation, a generative grammar operation, a generator of random attributes operation, or any other to generate a derived group of product forms. The program may select from a set of product attributes to assemble a derived set of product forms and/or may exploit a function which can generate new or modified attributes. The program also may permit a selector to delete a generated product form, to introduce a new product form within a derived group of product forms, to impose a constraint on the generation of a derived group to those forms comprising a preselected attribute or attribute value, or to those not comprising such particular attribute or attribute value, or to specify an attribute of the product or other object of the exercise. The apparatus may further comprising means for storing a plurality of product forms preferred by a selector and electronic means for effecting a sale to a selector of a product form she selected.

These various computational techniques are not per se considered an aspect of the invention, except insofar as they are used in combination with other process steps as set forth herein or as may be set forth in some of the appended claims. The invention also includes systems utilizing multiple levels of genetic or evolutionary computation techniques where, for example, the output of a first algorithm is used as the input of the next. The computer programs may embody various acceleration strategies, i.e., code implementing logic that reduces the participants' voting load, for example by using adaptive statistical models of the participant to evaluate some of the designs, or code that may reduce the number of design cycles needed to discern adequate or optimal forms by seeding the product form populations with "good" designs, by evolving higher-level modules first in the case of designs that are modular in nature, or by the use of various constraint parameters to reduce or eliminate impractical or impossible designs.

The method broadly comprises the steps of presenting, e.g., through a computer display or output device of some type, to the selector a group of product forms, each of which has a particular combination of attributes. The way these initial product forms are designed or chosen may involve screening of candidate designs to reflect previously articulated preferences of the selector or a supervisor. Alternatively, the initial product forms may comprise combinations of attributes discovered to be important to the selectors by an on-the-fly conjoint analysis based on preference data from a series of initially presented design options. The presentations typically are made electronically, e.g., by presenting graphical, alpha numeric or other visual data representative of the design alternatives or forms. Visual sensing of the presentation is not a requirement of the invention as the product being designed or selected may by an audible product sensed aurally such as a tune or a jingle. Attributes of the product may be sensed tactilely to discriminate among or between smoothness, texture, temperature, ergonomic curvature or softness, or degrees thereof. It is also possible to employ the methods and apparatus of the invention to design or select fragrances sensed nasally and tastes sensed orally or orally/nasally.

Next, the methods of the invention have the selector express a preference for a subset (one or more) of the presented product forms, and data indicative of the preference expressed by the selector is captured for use in evolving design alternatives and/or as a basis for a conjoint analysis. As disclosed herein, a variety of voting schemes may be used, with the selection of the protocol for gathering, aggregating, screening, or otherwise conditioning the data being dependent on the goals of the exercise. The captured data is entered into a program for generating a derived group, or "next generation" of product forms. These including product forms having either or both a new attribute (e.g., a new color or a new shape for a part or component of a product design), attributes with new values, or a new combination of attributes. As noted above, the program exploits various known or as yet to be developed approaches, strategies, data treatment methods, and algorithms to generate the derived group or next generation.

The program may select from a set of product attributes to generate at least a portion of a given derived set of product forms, or may exploit a function which creates or modifies an attribute. The program also may permit or encourage a selector or a third party, e.g., the proprietor or supervisor of the system, to delete a particular generated product form or to introduce a new product form at any point in the cycle. Also, the program may permit a third party or the selector to constrain generation of a derived group to those comprising (or, alternatively, not comprising) some preselected attribute (or attribute value) so as to enrich (or alternatively deplete) the population of derived product forms with that attribute, i.e., may be responsive to boundary conditions set by the selector or a supervisor controlling the system.

Adaptation of these computation techniques (or as disclosed below, voting techniques) for a given goal involves, for example, in the case of the market research embodiment, controlling the algorithm/program so that the participants (typically a large number of consumers on line) are provided through the computer program with a variety of product forms in successive generations which are designed specifically to present eclectic, widely varying design alternatives so as to promote exploration of the design space having diverse combinations of product attributes. Alternatively, or in addition, the computer program generates derived product forms which converge on a set of product attributes matching the preference of one or a subset of consumers, i.e., evolving toward a "fit product"—one that best matches the consumer's preferences. In still another aspect, the computer program generates derived product forms which converge on a plurality of forms of products having sets of product attributes matching the preferences of a corresponding plurality of subsets of consumers. Thus, the system can permit identification both of groups of consumers with similar preferences and designs which satisfy that preference.

The method may involve iterating the cycle of selection and derived product form generation a sufficient number of times to permit determination of one or a plurality of product forms preferred by the selector. Particularly in a group design effort where the selector is a group of consumers, this may lead to the identification of more than one preferred design and insights into the underlying motivators that led to them. Collecting demographic data about the selector and correlating the product forms preferred by the selector to the demographic data permits identification of market segments which may be exploited using differing strategies. Accordingly, the invention facilitates a new form of market research, in which its proprietor is enabled to discern the relative affinity of a consumer or group of consumers for a given product form, or to discern market segments, for example, early adapters, late majority, etc.

Thus, the invention provides methods for conducting hybrid experiments, which typically combine convergent and non-convergent exercises in order to analyze the design preference tendencies of a group of selectors.

In various embodiments, the non-convergent exercise includes conjoint analysis and the convergent exercise comprises evolving or selecting decision objects through the use of a genetic or evolutionary algorithm. The differing embodiments of the invention employ diverse methods to transition between convergent and non-convergent experiments, each method being differently beneficial in the scope of obtaining information about design preferences of selectors. Various repetitions, time limits and other criteria are used to determine when and how to switch between a non-convergent and a convergent exercise. In some versions, the experiment is a hybrid of convergent and non-convergent exercises. In other versions it is a hybrid of data collection and convergent exercises. These variations, and others, are discussed in greater detail throughout the remainder of the specification and the attached claims.

BRIEF DESCRIPTION OF THE DRAWINGS

The advantages of the invention described above, together with further advantages, may be better understood by referring to the following description taken in conjunction with the accompanying drawings. In the drawings, like reference characters generally refer to the same parts throughout the different views. Also, the drawings are not necessarily to scale, the emphasis instead is placed on conveying the concepts of the invention.

FIG. 7C is a screenshot depicting one embodiment of a second voting screen following vote submission.

DETAILED DESCRIPTION OF THE INVENTION

In brief overview, the claimed invention provides methods of efficiently analyzing selectors' design preference tendencies from among various design alternatives for decision objects and their attributes. The methods may be used to gather rich datasets informative of the preferences of any given target group, to discern which attributes of a product or service are important or unimportant to the selectors, and to reveal preferred product forms faithfully and without bias. The methods are implemented electronically and typically asynchronously over a relatively short time period. They may be designed to meet any set of design or market research objectives, and to obtain data relevant to any specific design issues considered relevant to any type of product. Advantageously, the methods make use of both convergent exercises and non-convergent exercises to obtain a wide variety of preferential information from the selectors.

Figure 1:
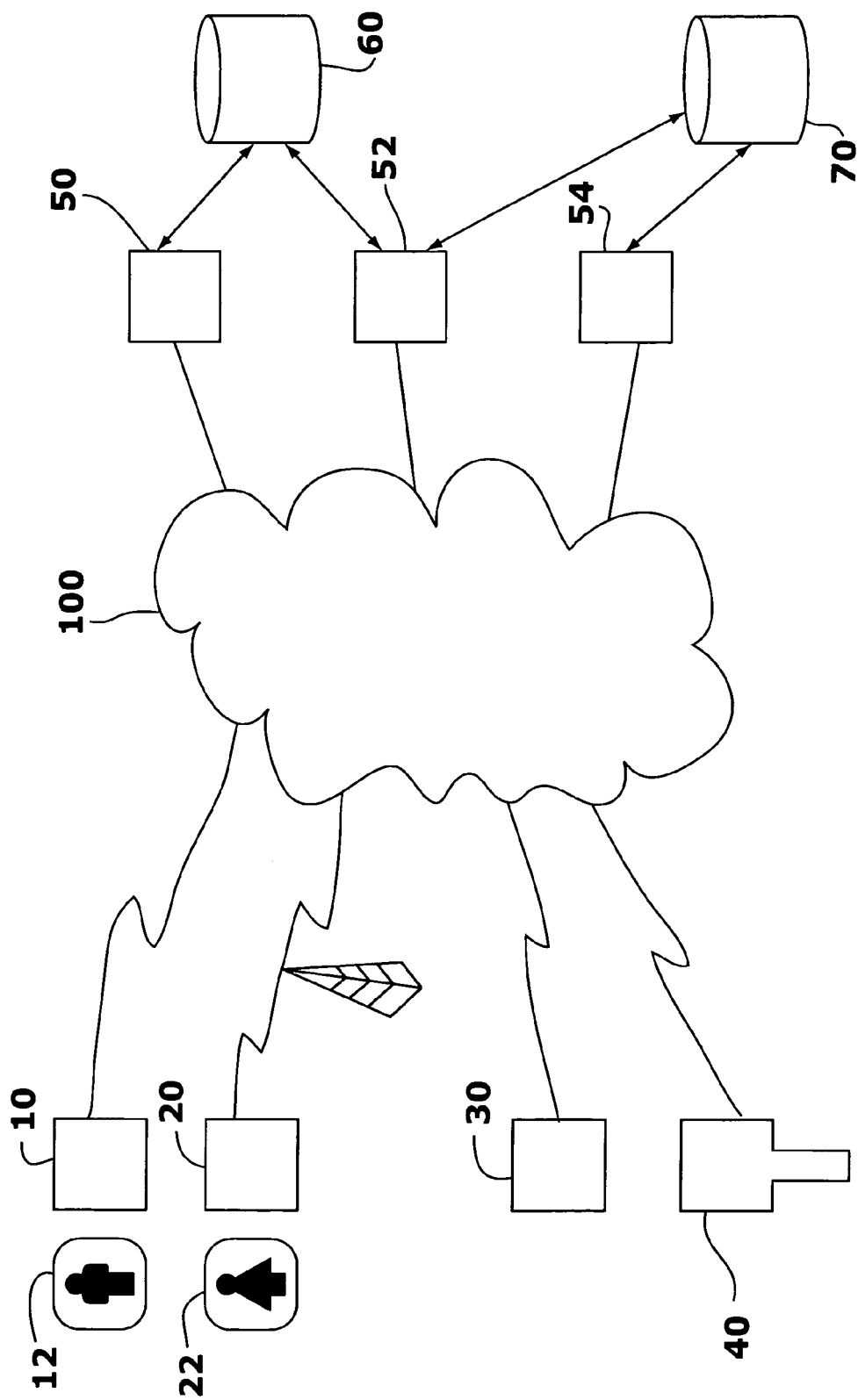
FIG. 1 is a block diagram illustrating one embodiment of the system for performing the invention.

FIG. 1 shows one embodiment of an environment in which the present invention may be used. Selectors may use one or more client systems 10, 20, 30, 40 to communicate with one or more server computing systems 50, 52, 54 over a network 100. The network 100 can be a local-area network (LAN) such as an Ethernet network or a wide area network (WAN) such as the Internet or the World Wide Web. Client systems 10, 20, 30, 40 can be connected to the network 100 through a variety of connections including standard telephone lines, LAN or WAN links (e.g., T1, T3, 56 kb, X.25), broadband connections (ISDN, Frame Relay, ATM), and wireless connections. The connections can be established using a variety of communication protocols (e.g., TCP/IP, IPX, SPX, NetBIOS, Ethernet, RS232, and direct asynchronous connections). For example, the network 100 may be a corporate intranet connecting decisionmakers in an organization to a centralized decision engine, or it may be a secure extranet or virtual private network connecting different entities such as a company's suppliers or consultants to the company's design engine.

As shown in FIG. 1, client systems 10, 20 may be client computing systems typically used by a user, such as any personal computer (e.g., 286-based, 386-based, 486 based, Pentium-based, iTanium-based, Power PC-based), Windows-based terminal, Network Computer, wireless device, information appliance, X-device, workstation, mini computer, mainframe computer, personal digital assistant, or other computing device. In these embodiments, client systems 10, 20 may use any one of a number of windows-oriented operating systems such as Windows 3.x, Windows 95, Windows 98, Windows NT 3.51, Windows NT 4.0, Windows CE, Macintosh, Java, Unix, and Linux. In this embodiment, the selector comprises the user 12, 22 interacting with the system via the client devices 10, 20.

In other embodiments, a client system 40 is an information kiosk located in a retail establishment. In these embodiments, the client nodes 40 may include a touch-sensitive screen or membrane keyboard for receiving consumer input. In other embodiments, the client system 40 is a retail point-of-sale terminals that collects consumer reference information from sale transactions. Client system 30 in FIG. 1 depicts an embodiment of a selector that is a proxy for a real person, such as a computer programmed and trained as a neural net, a statistical model, a distribution estimation algorithm, a reinforcement or Q learning method, a learning classifier system, or other machine learning methods or expert systems. In these embodiments, client system 30 may be one or more processes (threaded or otherwise) that implement evaluative models or algorithms, such as neural net models, learning classifier system, statistical models, or an expert system, which emulate the voting preferences of a human and which vote by proxy. These processes may execute on client system 30 and communicate with server systems 50, 52, 54 via network 100. Alternatively, the client system 30 may execute on the server systems 50, 52, 54 and communicate with various server processes using pipes, shared memory, or message-based communication such as remote procedure calls.

In many embodiments, one of the servers 50, 52, 54 is responsible for presenting to selectors the initial population of product forms, generating the derived product forms to be presented to the selector, and capturing and processing the data that is indicative of the selector's preference. This server is referred to as the "presentation server." At least one attribute database 60 stores the possible attributes available for generating product forms. At least one voting database 70 stores the preference data obtained from the selector during the course of the process. In some embodiments a single database is used to store both the possible product attributes as well as obtained preference data.

Another of the servers 50, 52, 54 implements generative and evolutionary computation programs that utilize the stored attribute data and the stored preference data to generate representations of the product forms. This server is referred to as the "generate server." The presentation server processes these product form representations to generate product forms that can be presented to the selector.

Yet another of the servers 50, 52, 54 serves as a vote aggregation analysis server. This server plays several roles: it captures the preference data coming from the selector and stores it in the voting database 70; it also analyzes the data and transforms or conditions it into a format that can be used by the generate server; it is also used to develop models, such as statistical or neural net based models or other machine learning models of the selector preferences, and may use these models to eliminate some of the forms generated by the generate server prior to presenting them to the selector. Additionally, it may provide data indicative of the preference of subsets of the selector, which may be appended to the presented forms by presentation server. Although depicted as separate servers, the generate server, presentation server, and vote aggregation/analysis server may be embodied as any number of physical servers.

For embodiments in which the invention allows for or exploits a purchase decision by the selector or subset thereof, one of the servers 50, 52, 54 may be an e-commerce server. For example, a purchase decision may provide one of the stopping conditions for a design exercise, or individuals comprising the selector may be permitted to place a purchase order for one of the intermediate product forms that they find satisfactory. The e-commerce server, which is well understood by those skilled in the art, uses a database containing customer information such as billing information and shipping address. The e-commerce server may be used to obtain the relevant billing and shipping information from the client, process it, store it in the database, and forward the relevant data to the order fulfillment entity.

The selector also may comprise one or more computers programmed as a statistical model, neural net, learning classifier system, other machine learning models, or with other appropriate software algorithms "trained" to mimic or simulate a consumer's preference pattern. Such a surrogate selector can, among other things, facilitate the feedback and evaluation process during a computer-driven emergent design cycle. A suitable computer program can facilitate or even eliminate the consumer's participation except perhaps as a supervisor. For instance, after going through a training phase, an evaluation program may express a suggested preference pattern (evaluation) for a given set of alternatives for the consumer to accept or adjust before submission as input to the generation program. After repeated cycles, the consumer may allow his or her personal evaluation program to provide unsupervised input to the generation program for several cycles before pausing to allow the consumer to make adjustments. Ultimately a sense of trust may develop between the consumer and the evaluation program that allows the evaluation program to act as a proxy for the consumer. An advantage of such a method is that the evaluation program-generation program can interact for several cycles starting from many initial seed evaluation sets (alternatives) in order to scout more fully the fitness landscape between the consumer preferences and a particular design alternative.

The neural net, learning classifier system, machine learning system, expert system, or other type of evaluation programs can be trained using a set of emergent design cycles with computer generated alternatives and consumer specified evaluations. The prospect of having a personalized evaluation program available to assist in the future interactions with the emergent design process may be an inducement to the consumer to engage in a large set of design cycles.

In other embodiments of the invention, the selector consists of a single individual, i.e., the system is a single-user system. In this case, there are no multiple votes to be aggregated and analyzed. Therefore, the voting database 70 is used to store the preference data throughout the design exercise or decision making process for the particular selector. The voting database 70 may also contain preference data from other selectors who may have participated in similar exercises previous to the current one, including data from exercises in which the same selector may have participated previously. One of the servers 50, 52, 54 collects, analyzes and stores the incoming preference data from the selector; it may also be used to provide feedback to the participant by providing data to the presentation server, which is indicative of the evolution of the selector's preferences over the duration of the exercise, or which may provide the selector with a basis for comparing present preferences to data stored in the voting database 70.

Figure 2:
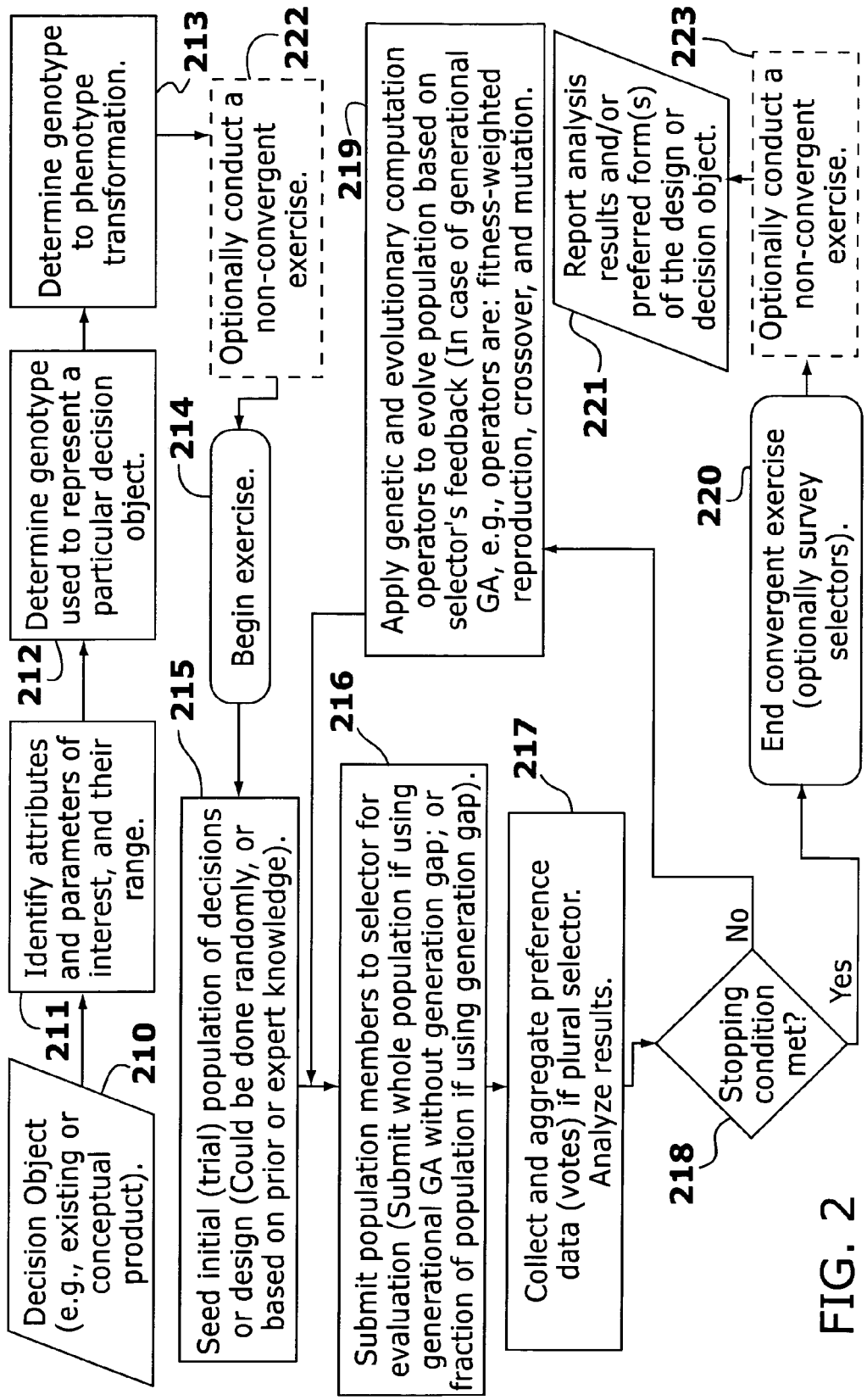
FIG. 2 is a flowchart showing one embodiment of the process steps of decision-making or design exercises conducted in accordance with the invention.

FIG. 2 is a process flow diagram for an exemplary decision making or product design exercise, embodying a method of the invention.

In this example, the process starts with identifying the object of the exercise, that is, the decision object or the design object, represented by block 210. At this point, the object is identified in very general terms, such as, "the colors of a tennis shoe," "next week's meeting agenda," "the menu for next month's association meeting." Next, in step 211, those attributes of the object that will be permitted to change during the exercise are identified, and the different values that they will be permitted to take on are determined. For example, in the case of the colors of the tennis shoe mentioned above, step 211 may involve identifying the individual elements of the shoe which are subject to design variation; the result may be: the vamp color, the eye stay color, the tongue color, the heel color, the sole color, and the laces color. Furthermore, the range of colors that each of these elements may take are established. For example, the laces may have three different colors they can take on, e.g., white, black, and red, or there may be four shades of red, or red attributes with different values. In other embodiments, an attribute may have a continuous range of values.

The next step in the process, represented by block 212, involves determining the representation or genotypic coding that will be used to represent the particular design or decision object internally, in the genetic algorithm, genetic program, or other GEC program. In the case where a genetic algorithm, the "genotype" is a data structure that encodes each attribute value, such that a particular instance, combination of attributes, or "value" of that structure represents one particular product form. It is directly tied to the previous step 211, in which the attributes and their possible values are decided, sometimes called "featurization." Continuing with the example of the tennis shoe colors, an appropriate genotype might consist of six integers strung together, each of which can be thought of as a gene representing one of the identified features such as the laces color. That integer in turn would be limited to taking on distinct integer values, here, as an example, three, say 0, 1, and 2, each of which is used to represent one of the three predetermined, allowable colors for the laces. This example genotype structure is shown schematically below.

| Integer 1 | Integer 2 | Integer 3 | Integer 4 | Integer 5 | Integer 6 |
|---|---|---|---|---|---|
| Represents vamp color | Represents eye stay color | Represents tongue color | Represents heel color | Represents sole color | Represents laces color |
| Range: 0-7 | . . . | . . . | . . . | . . . | Range: 0-2 |

The next step in the flowchart, represented by block 213, involves determining a mapping or transformation from the genotype representation described above, a data structure internal to the evolutionary algorithm, to the phenotype which is the corresponding form representation that can be presented to the selector. In the example of the tennis shoe color, this mapping is trivial, as there is a simple correspondence between a particular feature color and its index value. In other cases, this mapping may be more complex. For example, in a case where genetic programming is used, the genotype may encode a program or set of instructions that generate a product form, say a geometric shape, or determining the parametric computer aided design model of a shape, the parameters of which are encoded by the genome.

In the next step 222, a non-convergent exercise is optionally conducted. In a non-convergent exercise, data is obtained from the selectors, but such data is preferably not used to evolve decision objects or to narrow the scope of decision objects being evaluated. In various embodiments, the data may be used, however, to populate one or more focus windows viewed by the selectors in a convergent exercise. Alternatively, the data may be stored, and used later to analyze and/or report upon the preferences of the selectors. Embodiments discussing the use and interaction of convergent and non-convergent exercises, and the switching conditions facilitating a transition between the two are further described below in the section entitled "Hybrid Experiments."

The preceding steps are preparatory steps for the convergent part of the process, which begins at 214. In 215, an initial population of possible solutions for the convergent exercise—possible designs, possible decisions, possible menus—is generated. In the language of Genetic and Evolutionary Computation, this initial population is often referred to as a seed population or trial population. Typical population sizes may range from 2 to 100,000.

Each member of the population is an instance of the genotype described earlier, that is, a data structure where each field or "gene" takes on one of its allowable values; these are also referred to as chromosomes. The seed population may be generated by picking random values from the allowable ranges for each field in the chromosome. Alternatively, the seed population may be chosen through the use of the non-convergent exercise 222 described above. For example, at this stage various embodiments may employ a conjoint analysis based upon input received from selectors in advance. Other possible ways to populate the initial set of possible solutions is to use chromosomes that are the result of a previous exercise, ones that represent product forms designed by people using other (more traditional) means, or among other methods which depend in part on the goals of the process.

Once the initial population is generated, it is presented to the selector for evaluation. This step is represented by 216. Presenting the possible solutions may require using the genotype to phenotype transformation scheme that was determined in 213. Step 216 may involve presenting the whole population of possible solutions to the selector, or it might involve presenting a subset of that population. In some particular embodiments, the selector is presented with subsets of, or "windows" onto, the global (in this case, the initial) population. At a minimum, two of the possible solutions are presented to the selector. At 216, along with the presentation of the product forms, the selector also is presented with means for expressing a preference among them. This can be implemented in any number of ways, from clicking on the ones that are deemed good, to moving the assigning grades to the various forms presented, ordering the forms by order of preference, and so on. Each of these methods results in particular types of preference data that is captured and used in the next step. In particular, one way a selector may indicate his of her preference is by issuing a purchase request for one of the forms presented, one that is presumably deemed satisfactory.

In step 217, the preference data from the selector is collected and analyzed, typically electronically. In the case where more than one individual comprise the selector, the preference data from the different individuals must be aggregated and conditioned to make it usable in the subsequent steps of the process. In this step, any number of vote aggregation methods may be used. It should be noted that the vote aggregation method and the method provided to the selector to express their preference are technically related.

The voting systems useful in the practice of the invention may include, without limitation, the following:

Majority Rule and majoritarian methods rely only on information from binary comparisons between alternatives. Perhaps the most familiar example of a majority rule is the presidential election process in the United States, which is often a choice between two candidates. The winner of a majority rule election scheme is the alternative (or candidate) preferred by more than half of the voters.

Positional Methods utilize more information about voters' preference ordering than majoritarian methods (but not the whole ordering necessarily.) In plurality voting (also known as first past the post) every voter votes for his or her most preferred n alternatives, where n is the number of candidates to be elected. The alternatives with the most votes win. Unlike majoritarian methods, due to vote splitting in plurality voting, it is possible for two similar candidates both to lose to a third candidate that is different enough, even though it is less preferred by the overall electorate. Positional methods are particularly relevant to several preferred embodiments of the present invention, as these involve presenting a number of alternatives to the participants in the exercise, and asking them to rank the alternatives by order of preference.

Multi-Stage Methods use different functions or mechanisms at different stages of the voting process; they may also use the same mechanism iteratively on a decreasing number of alternatives.

In Single-Transferable Voting (STV), voters submit their preference ranking over all candidates. Any candidate who receives more then a threshold number of first places is elected. If the elected candidates receive more votes than are necessary for election, the excess votes they have received are redistributed over the remaining candidates based on the second-choice preferences of the voters. And again, any voter who receives more than the necessary number of votes, following the redistribution of the excess votes, is elected, and a new round of redistribution is carried out. If no more excess winning votes are available, and the necessary number of winners has not been reached, the lowest scoring candidate is eliminated and the votes for that candidate are redistributed.

Coomb's procedure is similar to STV, except that the alternatives that garner the most last places are eliminated (and their votes redistributed.) Whereas STV tends to select the most intensely liked alternative, Coomb's procedure tends to select the alternative that is least disliked by the majority.

Utilitarian Methods. Unlike the methods discussed so far, which only required the voter to provide an ordinal ranking of the alternatives, Utilitarian methods require a cardinal rating. The voters are asked to assign utility values to each of the alternatives presented to them. These utility values are intended to reflect the amount of happiness or satisfaction the voters expect to derive from each alternative, using a finite scale (commonly used scales are those that go from 1 to 5, 1 to 7, 0 to 10, or from 0 to 100.) The outcomes in utilitarian methods is based on the aggregation of the utility values given by the voters for the various alternatives.

In one embodiment, the claimed invention contemplates switching of voting scheme from one system to another as the design exercise progresses. In alternate embodiments, various voting methods are contemplated for gathering information in both convergent and non-convergent exercises.

As will be apparent from the list of voting methods noted above, some are better on certain measures of fairness, such as maximizing participation, while others are better at quickly finding an alternative that potentially only a small part of the persons making up the selector feel strongly about. In other words, the voting system in use during an exercise conducted in accordance with the invention at any given point during the exercise may help exploration, for example, when exploiting the market research embodiment, or help reach rapid optimization, or convergence to a particular design favored by a person or set of person comprising the selector's representative, for example, of a particular market segment. Thus, the claimed invention can be practiced by switching between voting paradigms during the course of the exercise to help exploration early on and then drive toward a solution in a later stage. Similarly, differing voting methods may be used in conjunction with both the convergent and non-convergent exercises. This general concept has been recognized as having value of certain standard techniques used in genetic algorithms for preventing premature convergence and allowing exploration early on.

Still another aspect the invention contemplates running simple voting systems in parallel and, for example, comparing the output at each generation or at assigned posts during the course of the exercise. A decision-making scheme or rule or supervisor then may decide which one to use or possibly to use some combination of their outcomes to drive the next iteration in the process. Such a decision could be based not only on the current voting data at the time the assessment is made but also on the outcomes of different vote or data aggregation schemes and voting history or earlier iterations.

In step 218, the preference data as well as other parameters of the exercise (such as the time elapsed, the number of iterations run, etc.) is tested to see whether a stopping condition has been met. If a stopping condition has not yet been met, the process moves on to step 219. In this step, the genetic computation operations are performed on the population of possible solutions, in order to generate a "new" or derived population of solutions. The algorithms used at this stage may vary widely as noted above. In the preferred form, the operation is a genetic algorithm with real and integer-valued genes. The operators that are typical in most implementations of genetic and evolutionary computation include selection or reproduction operators, recombination or crossover operators, and mutation operators. Reproduction operators basically create copies of the members of the current generation of solutions as a function of their fitness. Those possible solutions that were preferred by the selector, that is, that were found by the selector to have a high degree of fitness, are more likely to be selected and reproduced than the ones that were found to be less desirable. It should be noted that most implementations of reproduction operators are not deterministic, but involve an element of randomness. In other words, it is the likelihood that a possible solution will be reproduced that varies in accordance with its fitness. It should also be noted that a highly fit solution may result in several copies of that solution showing up at this intermediate stage of reproduction.

Another operator is the crossover operator, which acts on the intermediate population of solutions that is the outcome of the reproduction operation. In crossover, members of the intermediate population are paired, and the two chromosomes of each pairing are split and the different parts cross-combined, resulting in a pair of offspring, i.e., new pair of possible solutions. The schematic below represents the case of single point crossover.

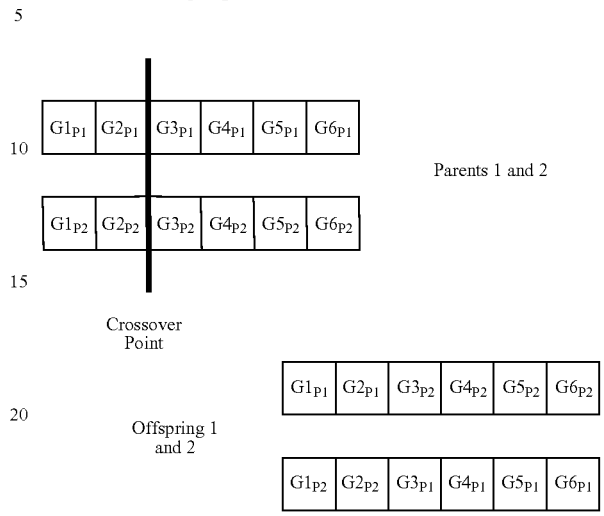

The resulting product has two chromosomes, following single point crossover between genes 2 and 3.

The pairing process could be performed at random, based on the fitness or desirability of the different chromosomes. In addition, certain schemes may pair parents according to their genetic similarity or dissimilarity (we describe a more complex assortative mating scheme later herein.) Furthermore, decision to effect a crossover operation on any given pair may involve an element of randomness. In single point crossover, the crossover location may be determined at random as well. (Some of the embodiments used in the invention, and described later, result in a single offspring for each pair of parents.)

A number of crossover operators have been developed by researchers and practitioners in the field of genetic computation; these include multipoint crossover and uniform crossover, each offering different performance (in terms of convergence, or the exploration/exploitation trade-off) under different conditions. In the case of real-valued genes, the crossover operator may involve both interpolation and extrapolation between the values of the corresponding genes in the parent chromosomes.

Following crossover, a mutation operator is applied to the offspring, that is, the results of crossover. Mutation is a random operation intended to increase the exploration of the space of possible solutions. The implementation depends on the particular representation used. In the case where a binary valued genetic algorithm is used, the genotype consists of a string of 0' and 1's; in that case mutation involves flipping a bit (from 0 to 1, or vice versa) at random, at a given probability. For example, if the mutation rate is 0.1%, then, on average, one in every 1000 bits encountered in the population of chromosomes, one will be selected at random and flipped. In the case where a gene takes on an integer value, then, at the appropriate mutation probability (say, every one in 1000 genes on average), the integer is replaced by another one selected at random from the range of allowable values for that gene, or from a certain neighborhood of the current value of that gene.

At that point, after all genetic computations are applied to the population of possible forms or solutions, a derived population is obtained, and step 219 is effectively complete.

(There may be an additional operation applied, sometimes referred to as "monster killing" whereby non-allowable chromosomes that may have been generated are eliminated and replacements generated.)

The derived population is now ready to be presented to the selector for evaluation at step 216, thus completing one iteration of the loop.

If, at block 218, one of the stopping conditions is met, the process proceeds to block 220, which represents the end of the convergent exercise. At 220, a preferred form or several preferred forms 221 have been found. It is possible at this point to repeat the exercise with a different selector, or with the same selector but with a different initial population of solutions, or both. It is also possible to perform a related exercise, using different attributes or different attribute ranges for the same design or decision object (i.e., step 211 is repeated to obtain different attributes, although 210 is unchanged.) This may be the case if a hierarchical design process is being undertaken, whereby one aspect of the product is designed first, then another aspect. For example, design the shape of a shoe in one phase, followed by choosing the color palette for it.

Various embodiments may also incorporate a survey of the selectors, or questionnaire, before, during or after the convergent exercise. This is depicted in step 220 for this embodiment. The survey may be a standard market research survey, designed to solicit selectors' opinions, known to those in the art. Information obtained through the use of a survey may be incorporated into an optional non-convergent exercise 222, 223 or analyzed or reported according to the methods described herein.

Figure 3A:
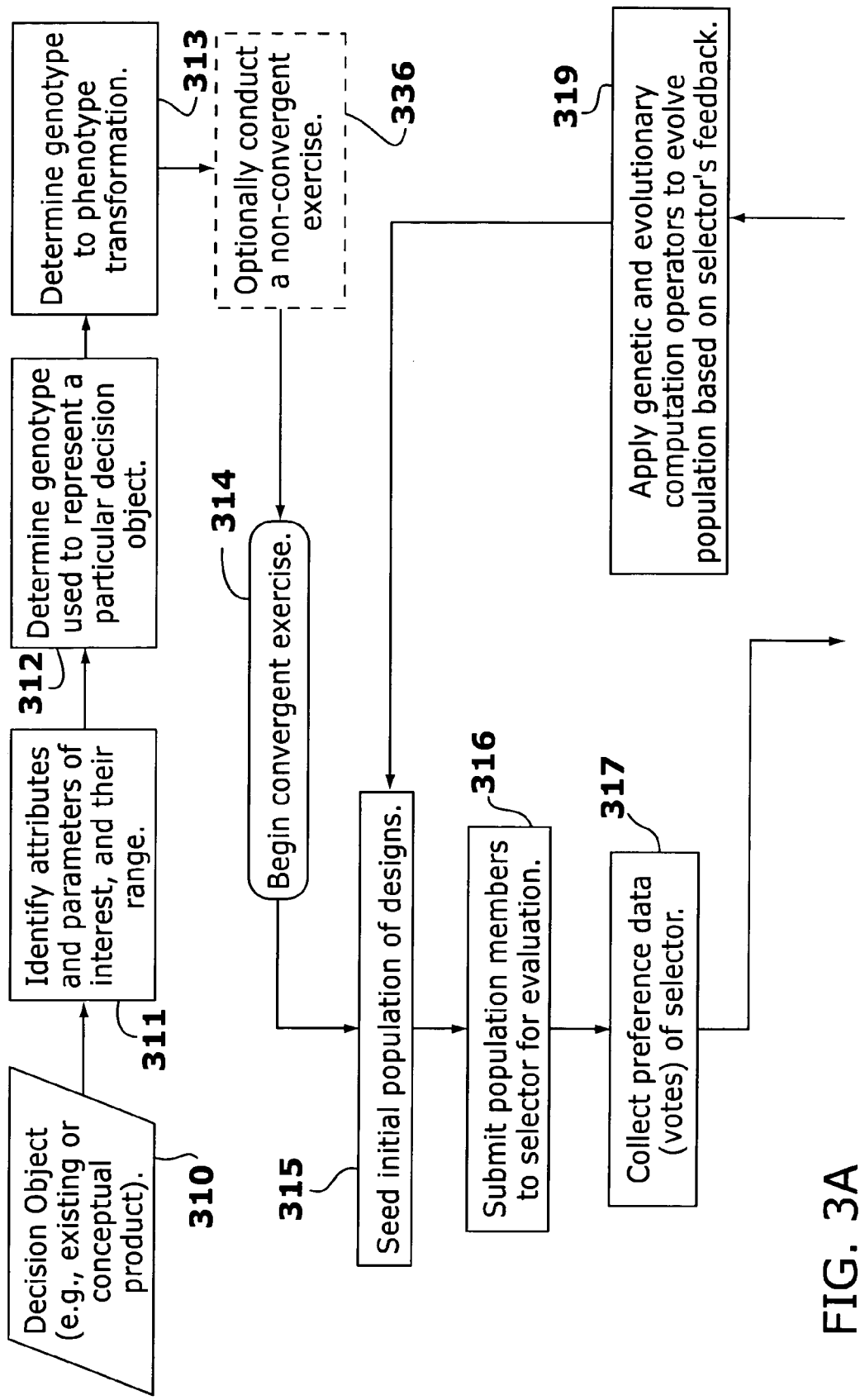
FIGS. 3A and B comprise a flowchart showing one embodiment of the steps to be taken in an exercise involving a multipurpose selector entity with purchase decisions as the outcome.
Figure 3B:
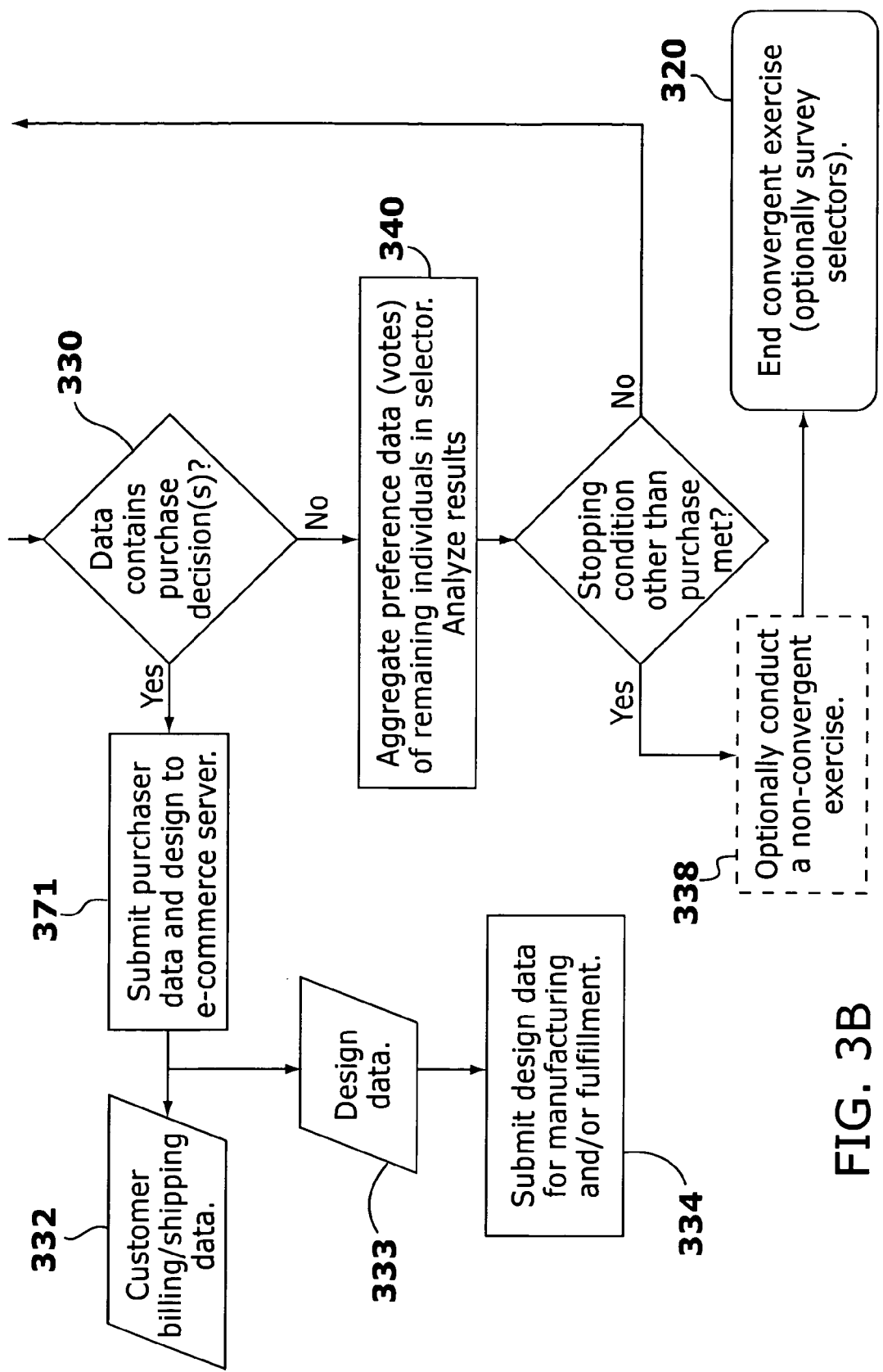

FIGS. 3A and 3B represent the process flow for an example product design exercise with purchases as allowed outcomes. Blocks 310 through 316 as well as blocks 318 through 320 are similar to their counterparts described previously for FIG. 2. Blocks 336 and 338 disclose optionally conducting a non-convergent exercise, as in blocks 222 and 223 of FIG. 2.

In this embodiment of the invention, after preference data is collected from the selector in block 317, it is checked for the presence of any purchase requests from any member of the selector for one of the product forms presented in 316. If the preference data includes such a purchase request or requests, the member of the selector, along with the information identifying the selected product form are directed to an e-commerce server where the needed shipping and billing information 332 is obtained from the individual(s). The information about the selected product form is sent forwarded in 333 to a fulfillment center, or to a manufacturing and fulfillment operation 334 that is outside the described process.

Figure 4A:
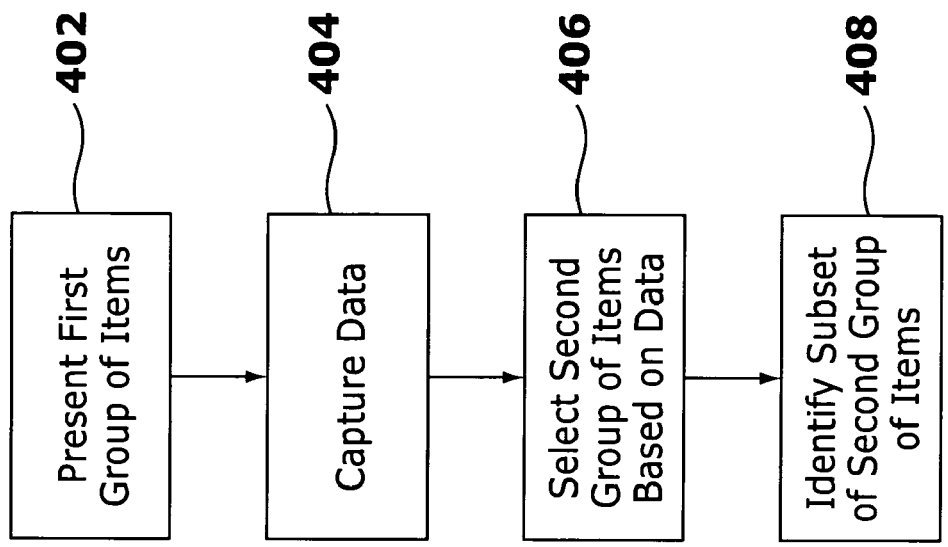
FIG. 4A is a flowchart showing one embodiment of the steps to be taken to identify market segments in an evolutionary design exercise.

Referring now to FIG. 4A, and in brief overview, a method of dynamically identifying a set of items for which a plurality of selectors have a similar affinity includes the steps of: presenting for display to a group of selectors a first group of items (step 402); capturing data indicative of an item preference expressed by a least some of the group of selectors (step 404); selecting a second group of items responsive to the captured data (step 406); and identifying a subset of the second group of items having similarity among respective attributes (step 408).

Still referring to FIG. 4A and in more detail, a first group of items is presented for display to a group of selectors as described above in connection with step 216 of FIG. 2. For example, the items may be presented graphically, that is, a graphic representation such as a drawing or a photograph of the item is displayed to one or more selectors. In other embodiments, display of the items refers to the provision of a data file such as a computer-aided design (CAD) file or computer-aided manufacturing (CAM) file representing one or more items. In still other embodiments, items may be presented aurally. The items may be presented by the server computing nodes 30, 32, 34 or the client computing nodes 10, 20. Selection of items to be presented for display may be performed by the client nodes 10, 20, the server nodes 30, 32, 34, or some combination of client nodes and server nodes.

Data indicative of item preferences is captured (step 404) as described above in connection with step 217 of FIG. 2. Item preferences may be captured at each client node 10, 20 in response to the display of items in step 202. There exist many ways in which a selector may express preference across k entities of the population. The selector may rank the entities according to preference, for example, where the favorite entity (or entities, in case of a tie) receives a score of k, the next favorite a score of k−1, and so on. Alternatively, the selector may rate each entity on a scale of zero to one hundred, or merely indicate which entities are acceptable and which unacceptable. Regardless of the manner in which voter feedback is given, the feedback from all voters is subsequently appropriately scaled such that responses are directly comparable.

Scaling selector responses removes inconsistencies resulting from the case where the selector responds by rating entities on some scale (say, [0, 100]). If one selector is highly enthusiastic about all of the k entities, while another is very unenthusiastic, then the scales of the two sets of responses will not be comparable. As a result, the scores given by the enthusiastic selector will have more influence over the trajectory of the evolutionary system.

The scaling problem is solved through the use of normalization. Let $u_j^i$ be the "raw" response, or score, given by voter i to entity j. Vector $u_i$ is normalized to create vector $g_i$:

$$g_j^i = \frac{u_j^i}{\sum_{m=1}^{k} u_m^i}$$

where $g_j^i \in [0,1]$ and $$\sum_j g_j^i = 1.0$$

The score of entity j is given by:

$$s_j = \sum_i g_j^i$$

Clearly, this step is unnecessary if voters respond by ranking entities, since ranking cannot produce a scaling problem. Where scaling problems do not exist, normalization may nonetheless be performed, since it does no harm to the voting data.

Assembling a second group of items responsive to the captured data (step 406) involves determining the "fitness"

of the members of the population, selecting, based on fitness, a subset of the population for mating, selecting "mates" for them, and allowing the resulting parent pairs to "reproduce," as described above.

Figure 4B:
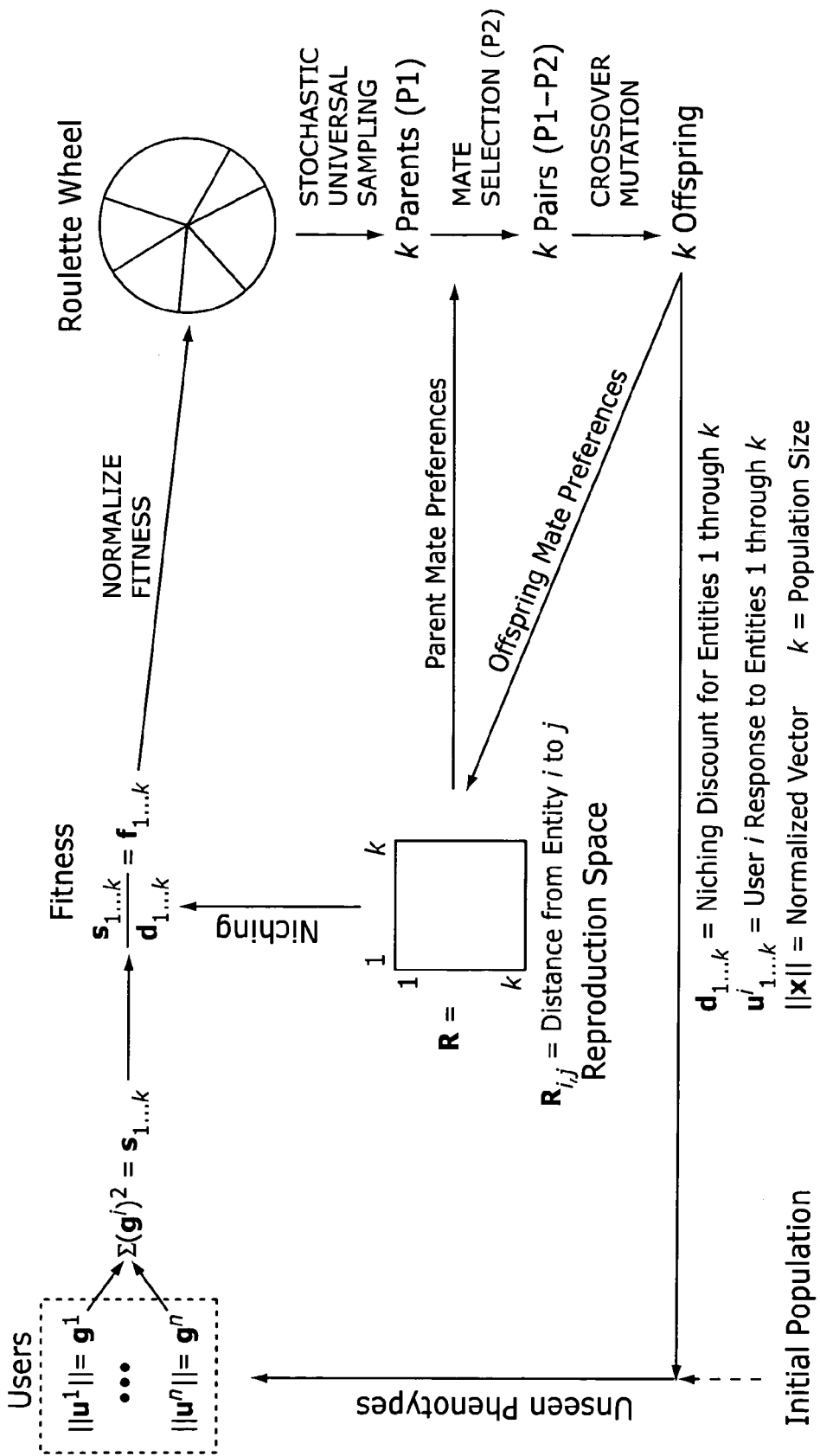
FIG. 4B is a flow diagram depicting one embodiment of evolutionary algorithm featuring speciation and niching.

As shown in FIG. 4B, the fitness $f_j$ of an entity j is defined to be its score ($s_j$ given above) divided by its niching discount. The niching discount, described in detail below, is a quantity that reflects the degree to which an entity adds redundancy to the population. By making the discount a positively correlated function of redundancy, we create a pressure to maintain genetic (and, presumably, phenotypic) diversity. Diversity maintenance is essential to successfully achieve and maintain distinct species, which can be viewed as separate preference profiles and/or market segments.

The fitness vector, f, is normalized to obtain the probabilities with which each entity will be selected to parent an offspring. Such a scheme is referred to as fitness-proportionate selection. Typically, fitness-proportionate selection is implemented by a simple "roulette wheel" algorithm, where each entity has a slice of the roulette "pie" that is proportionate in size to its probability of being selected. The wheel is "spun" once each time we wish to select a parent. If the probability of an entity being selected is p, and we spin the wheel k times, then the expected number of times the entity will be selected is pk.

This roulette wheel implementation yields a multinomial distribution. Thus, if the number of spins is large, the observed behavior will closely match the expected behavior. But if the number of spins is small, the observed behavior has a high probability of deviating from expected behavior. For any finite number k of spins, there exists a non-zero probability that an entity having probability 0<p<1.0 of being selected will be selected anywhere from zero to k times.

For embodiments using recombinative variational operators (i.e., crossover), the creation of k offspring requires k pairs of parents. Rather than use fitness information to select the mates, mating preferences are used. Each entity that evolves has a genome composed of two distinct parts. One part of the genome determines the merit traits of an entity—the characteristics that are evaluated by human voters and ultimately lead to the entity's fitness. The other part of the genome determines the reproductive traits of an entity—the characteristics that express the entity's mating preferences. Reproductive traits do not affect an entity's fitness.

The precise structure of an entity's merit traits—the types and ranges of allele values—is domain dependent. In contrast, reproductive traits are defined to be real numbers and are not limited to fall into a particular range. All entities have the same number of reproductive traits—q real-valued genes. We interpret an entity's q reproductive traits as a point in q-dimensional Euclidean space. An entity prefers to mate with other entities that are closer to it in this q-dimensional "reproduction" space than those that are farther.

Figure 4C:
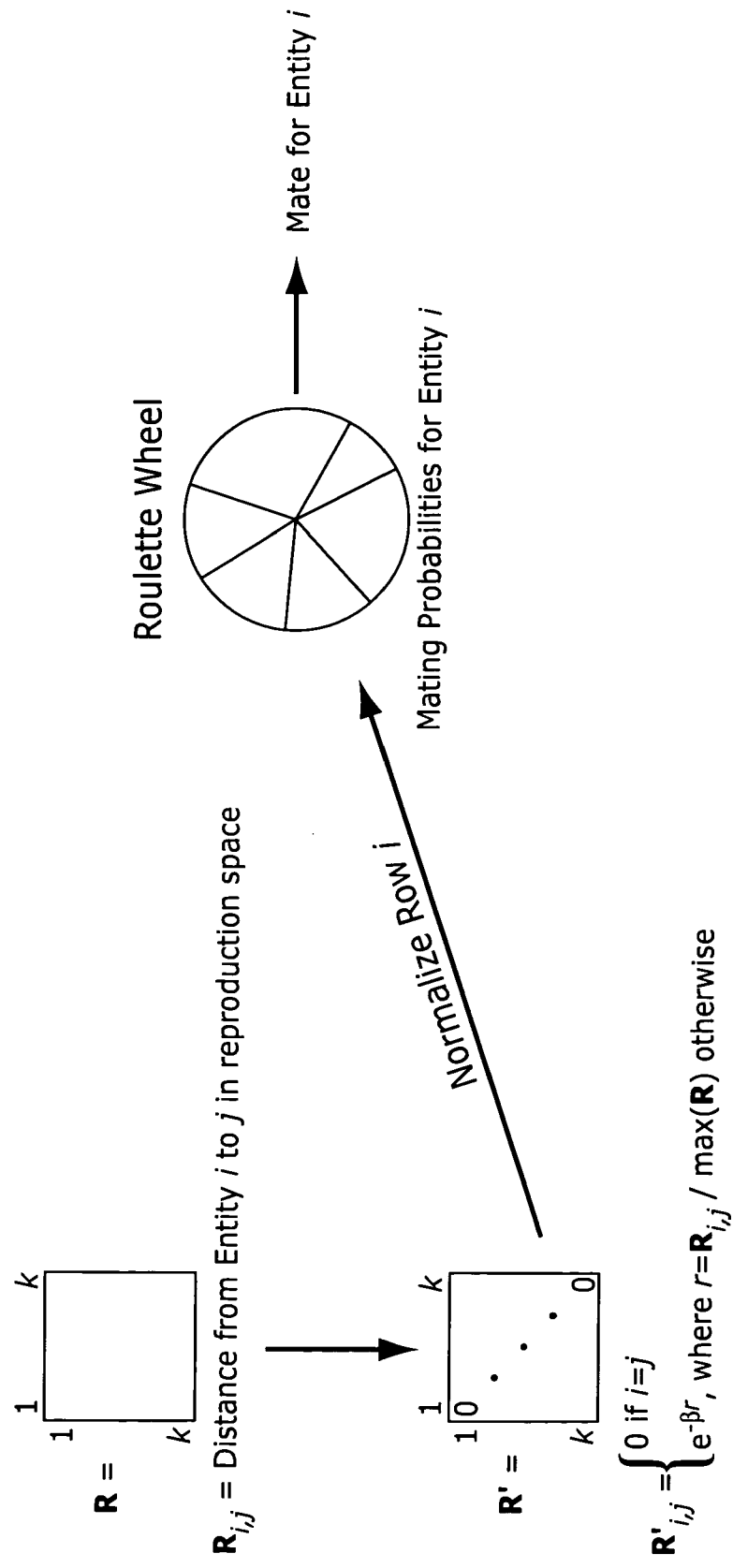
FIG. 4C is a flow diagram depicting one embodiment of the steps to be taken to compute mating probabilities.

FIG. 4C details how an entity picks a mate. A symmetric matrix R is computed where entry $R_{ij}$ is the Euclidean distance between entities i and j. Our next step in computing mating preference is to derive matrix R' from R, as defined below. The larger the value of entry $R'_{i,j}$, the more entity i is willing to mate with entity j. An entity may not mate with itself, so the diagonal is composed of zeros. Specifically, the willingness for entity i to mate with entity j is:

$$R'ij = \begin{cases} 0 & \text{if } i = j \\ e^{-\beta r} & \text{otherwise} \end{cases}$$

where $$r = \frac{R_{ij}}{\max(R)}$$

Thus, willingness to mate drops exponentially with Euclidean distance. This drop may be scaled using a coefficient, β. If β=0, then the entities have no mating preferences and will mate randomly (though self-mating will still not occur.) If entity i has been selected because of its fitness, we pick a mate for it by normalizing row i of matrix R' to obtain probabilities of mate selection. These probabilities are used to construct a roulette wheel, which is spun once to select a desired mate. This process is repeated for every entity seeking a mate.

In this implementation, when two parent entities mate, a single offspring is produced. The recombination operators applied to merit traits are dependent upon the types and ranges of allele values allowed, and thus vary from domain to domain. The recombination operator applied to the parents' reproduction traits computes the arithmetic mean of their locations in reproduction space—the offspring is located midway between its parents in reproduction space. In one embodiment, after the offspring's location is computed, as small amount of Gaussian noise is added. In one particular embodiment, the added noise has a mean of zero and standard deviation of 2.0.

As discussed above, an entity's fitness is defined to be its score divided by a discount factor that correlates to the amount of redundancy the entity brings to the population. While genotypic similarity is generally easy to measure, it is not necessarily an accurate predictor of phenotypic similarity, which is the space in which diversity is sought. Further, phenotypic similarity can be very difficult or impossible to determine, depending upon the nature of the problem domain and genotype-phenotype mapping. A species may be defined as a group of entities that is reproductively isolated from other groups of entities; entities within a species can reproduce with each other. The speciation process is driven by use feedback. If the collection of human aesthetic opinions clusters into two incompatible groups of designs, such that no entity belonging to the first group can produce a viable (high fitness) offspring by mating with an entity belonging to the second group, then two species will form. Niching facilitates the speciation process and allows species to more stably persist. Therefore, we can compute the redundancy an entity brings to the population by measuring its proximity to other entities in reproduction space. If one species begins to overpopulate the population, its members will begin to receive larger discounts than entities that belong to other (smaller sized) species. (An alternative embodiment, described later, uses genotypic similarity as the basis for computing the fitness discount.)

Figure 4D:
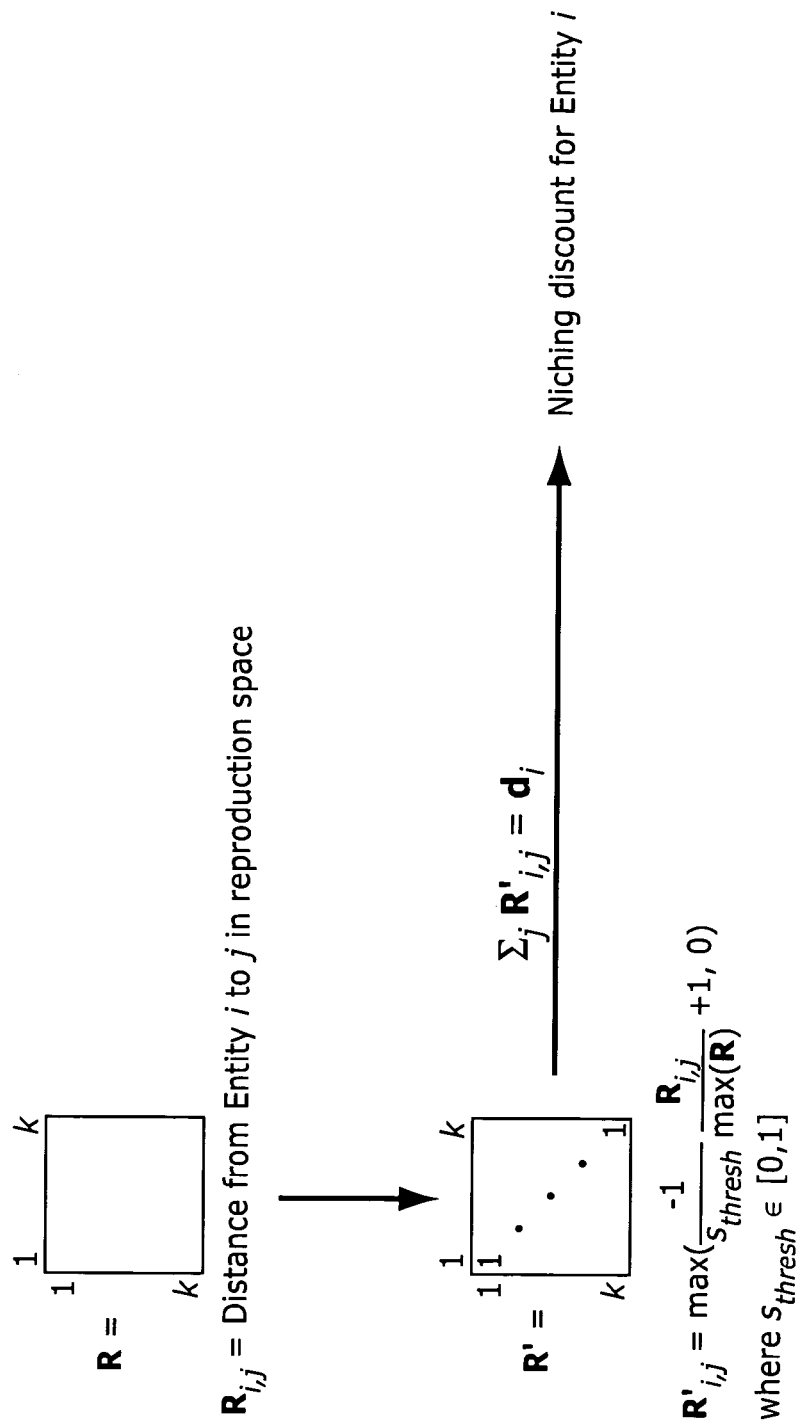
FIG. 4D is a flow diagram depicting one embodiment of the steps to be taken to compute and entities niching discount.

FIG. 4D shows how the niching discount is computed. As with the mate selection procedure, we begin with a matrix R where entry $R_{i,j}$ is the Euclidean distance between entities i and j in reproduction space. From this matrix we derive matrix R' where entry $R'_{i,j}$ signifies the amount of discount generated with respect to entity j to be applied to entity i. Given our similarity metric, we use a triangular method of computing similarity-based discounts:

$$R'_{ij} = \max\left(\frac{-1}{s_{threshold}} \frac{R_{i,j}}{\max(R)} + 1, 0\right)$$

where $s_{threshold} \in [0,1]$ is a parameter that determines the minimal amount of similarity (or, maximal amount of dissimilarity) that will generate some amount of discount. Larger values of $s_{threshold}$ decreases the minimal amount of similarity between entities i and j needed to generate a non-zero discount.

Figure 5:
FIG. 5 is a screenshot depicting one embodiment of a registration page useful in connection with the invention.

In the embodiment shown in FIG. 5, a user's e-mail address, desired password, and zip code are entered in text entry boxes 502, 504, 506. Demographic information such as gender, age, country of origin and income range are entered using pull-down menus 510, 512, 514, 516. Other information is entered using check boxes 520, 522, 524. Other graphical user interface techniques may be used, such as radio buttons and sliders.

Figure 6:
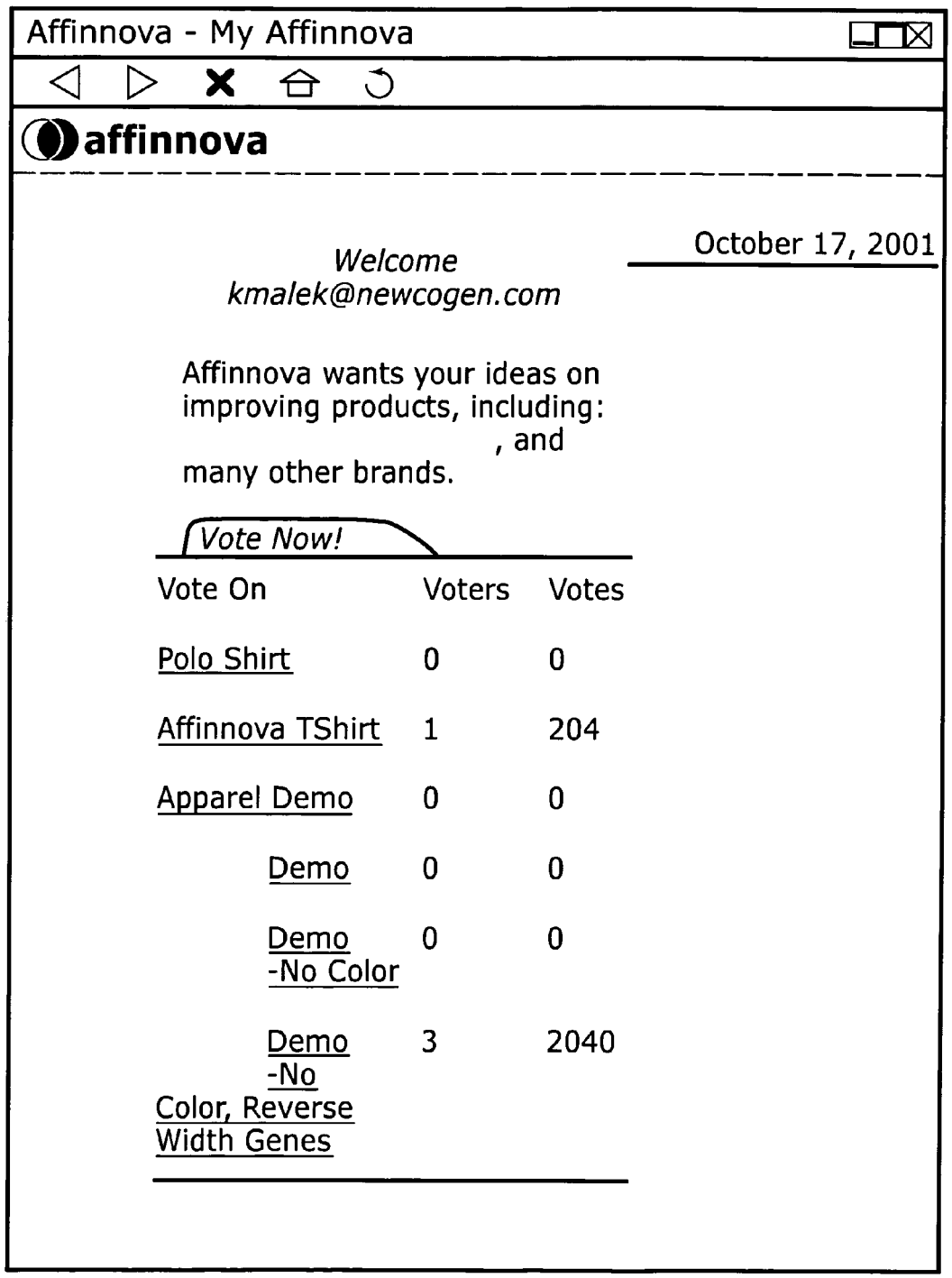
FIG. 6 is a screenshot depicting one embodiment of a dialogue screen useful in connection with the invention.

After entering demographic information, the participant is led to the exercise. In some cases, there may be more than one exercise in which the person has been invited to participate; in those cases, the participant is led to the different exercises, either in a controlled or prespecified fashion, or through a dialogue screen that allows the participant to select the exercise he or she wishes to work on. FIG. 6 shows such a dialogue. In the embodiment shown in FIG. 6, three design exercises are presented to the user: a polo shirt design exercise; a tee shirt design exercise, and a "demo" exercise.

Figure 7A:
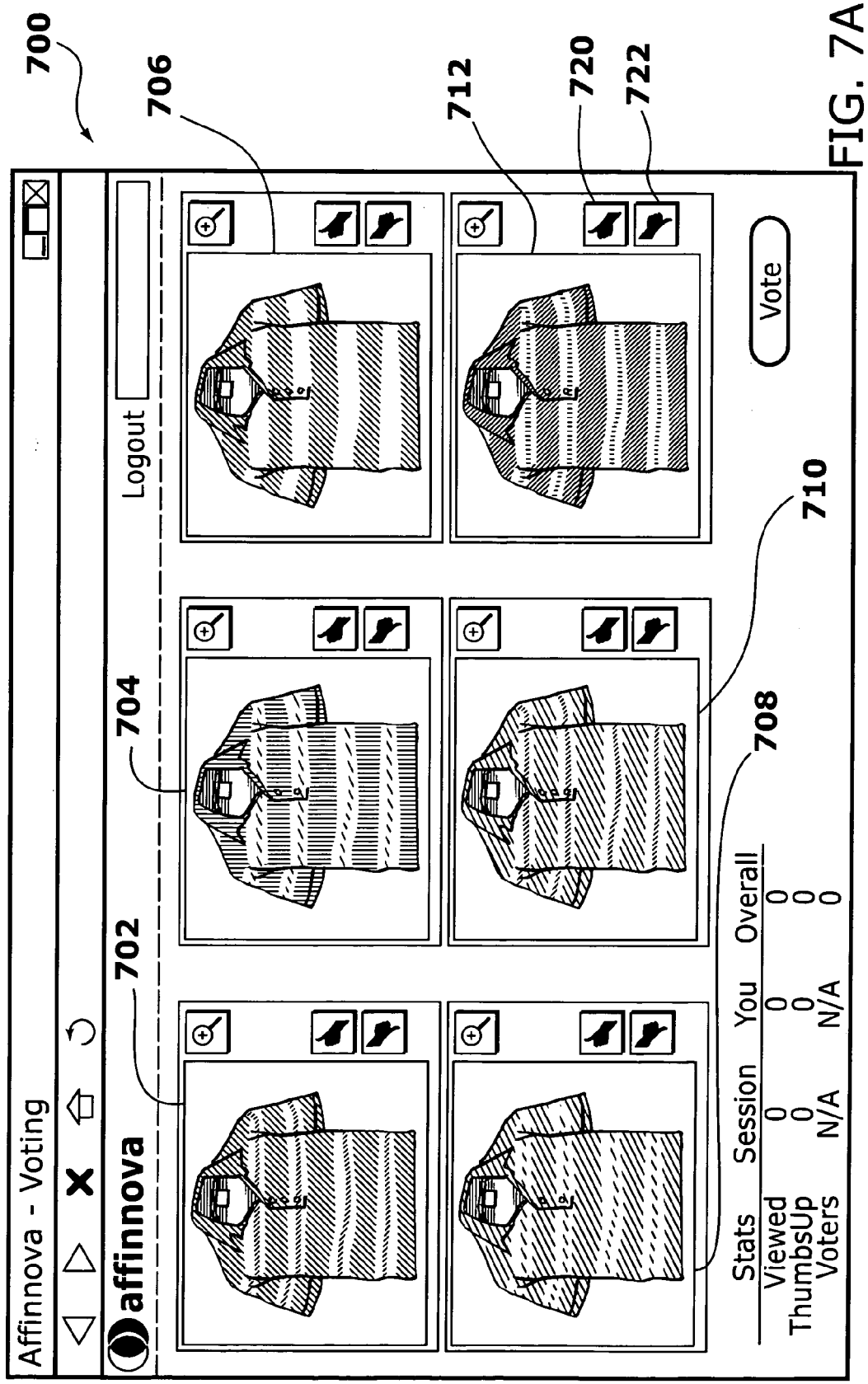
FIG. 7A is a screenshot depicting one embodiment of a screen useful for receiving user input.
Figure 7B:
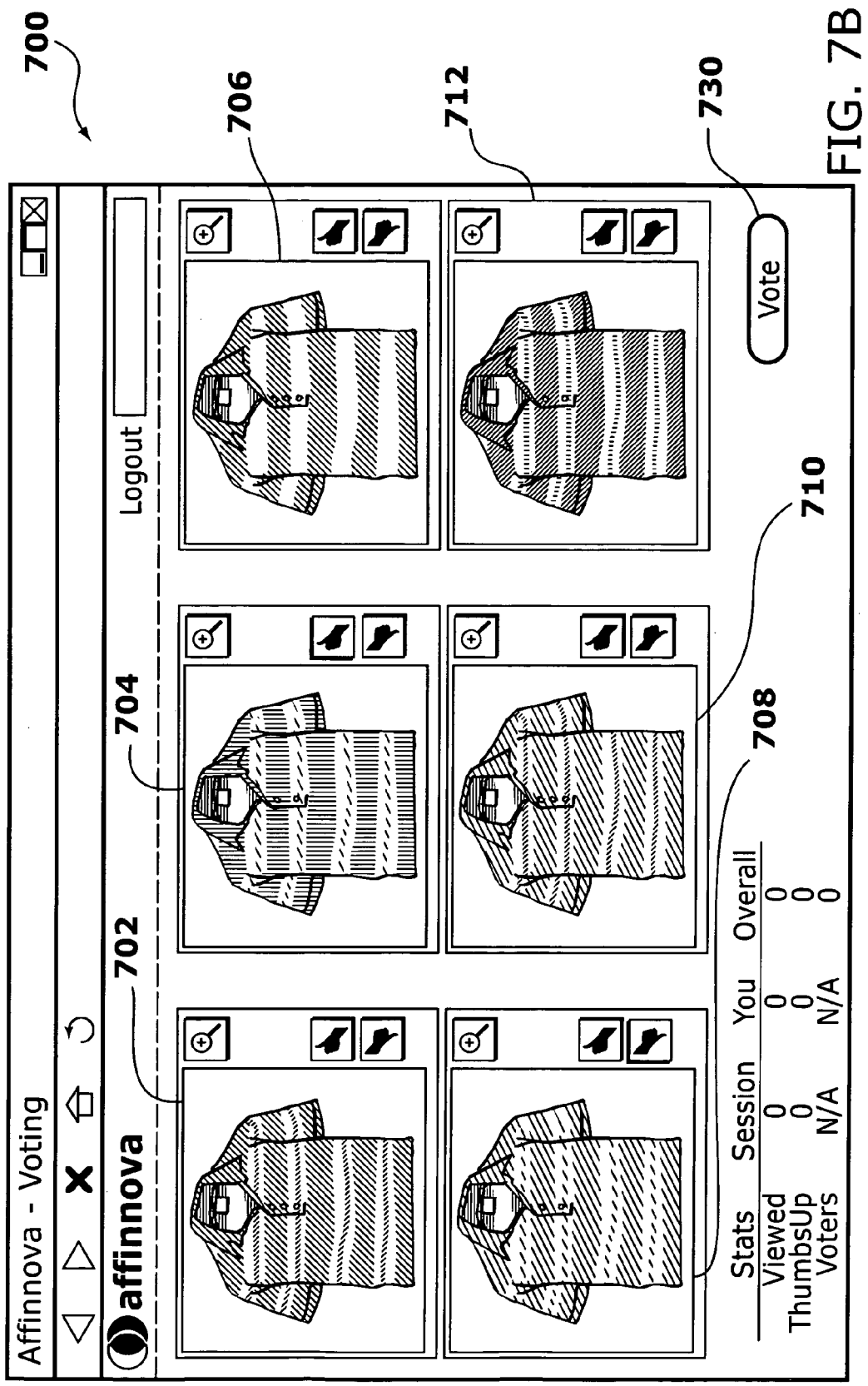
FIG. 7B is a screenshot depicting a particular preference assessment prior to vote submission
Figure 7C:
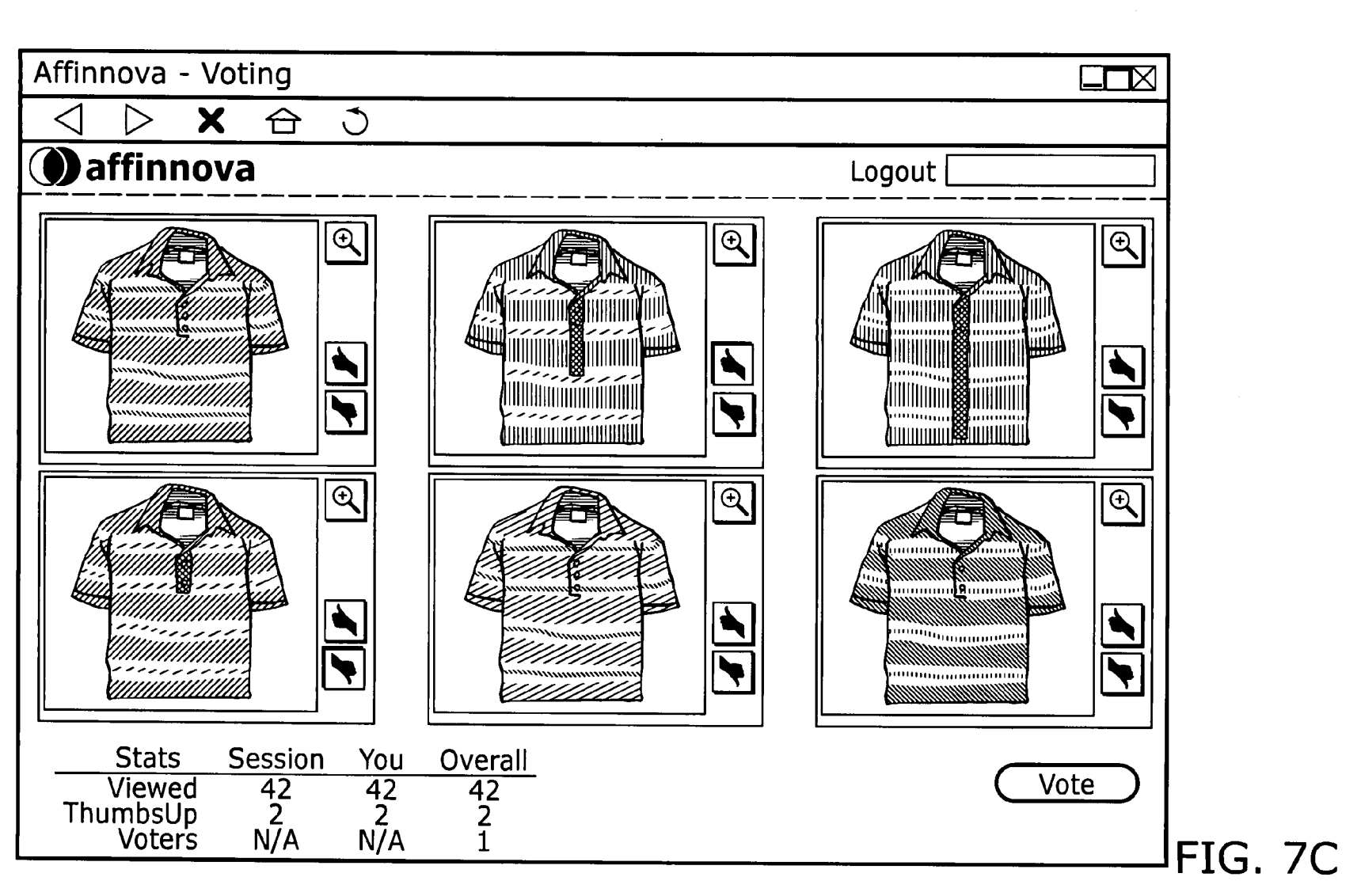

FIG. 7A shows a typical screen 700 that would be seen by a participant once he or she reaches the exercise proper. Such a screen presents the participant with a number of alternative choices for the design (or decision) object 702, 704, 706, 708, 710, 712. In this figure, the design object is a polo shirt, and the number of alternatives presented in this particular screen is six. Next to each design alternative, a "thumbs up" 720 and a "thumbs down" 722 button are provided as means for the participant (also referred to as "voter") to express their opinion about the design alternative in question. FIG. 7B shows the same screen after the participant has given the design alternative 704 a positive vote, and design alternative 708 a negative vote. In some embodiments, green and red borders may be used as a visual feedback mechanism to remind the participant of their assessment for the corresponding alternatives. In this figure, the remaining four design alternatives 702, 706, 710, 712 have received neither a positive nor a negative assessment, meaning that the participant is neutral or ambivalent towards them, neither liking nor disliking them. Once the participant has input his or her assessments, votes are submitted by clicking on the "Vote" button 730. This results in a new set of design alternatives being presented for assessment to the participant, triggering a new iteration in the process described above. FIG. 7C shows a screen containing one such set of derived alternative designs. In the particular implementation described in this section, the assessment or voting information provided by the participant at each iteration is used in a number of ways, which are described below. Before that however, the next paragraph describes the particular product featurization used in this example.

The design object used in this exercise represents one particular product featurization. A polo shirt could be featurized in an infinite number of ways. In this particular example, a simplified featurization is used, consisting of the following design elements: the color of the body of the shirt, the style and color of the collar, and in the case of a particular collar type—the tab collar—the length of the tab. Each of these design elements or design attributes can take on any of a set of values. In the case of the body color, there could be, for example, twelve discrete colors. In the case of the collars, there could be, for example, four possible styles, each of which has a fixed color. Finally, in the case of the tab collar, the tab length could take on any real numeric value within a specified range (which is chosen so that the tab length cannot exceed the length of the body of the shirt.) A specific design candidate corresponds to a particular triplet of body color, collar style, and collar tab length (although the latter value may go unused if not needed.)

Evolutionary Algorithm

In one embodiment, an evolutionary algorithm is used to evolve the designs towards ones that are more fit, that is, to generate designs that are more in line with the preferences expressed by the voters. The genotype used to represent each design candidate consists of variables or genes representing the three design attributes described in the previous paragraph, along with additional variables that are used to control the way in which different design candidates are selected for mating (an operation, described in more detail below, in which attributes from two "parent" designs are combined to generate a new "offspring" design.) The first set of genes, G1, G2, and G3, are referred to as the "merit" genes or variables (also, "feature" genes or "attribute" genes), since they are directly responsible for determining what a design candidate looks like, and therefore the degree of approval it gets. The second set of genes are hidden, in the sense that the way in which a design candidate looks to the participant is unaffected by the value of these genes. These genes are referred to as "reproduction" genes or variables, for the role they play in mating and mate selection, as described later. In this particular implementation, these genes are real-valued and they represent the orthogonal dimensions of a Euclidean space, referred to as the "reproduction" space. Table 1 below represents the genotype for the polo shirt exercise under discussion. In this case two reproduction genes, R1 and R2, are used.

TABLE 1

| Schematic representation of genotype | | | | |
|---|---|---|---|---|
| G1 | G2 | G3 | R1 | R2 |
| (Collar Style) | (Body Style) | (Collar tab length) | (Reproduction variable 1) | (Reproduction variable 2) |

The evolutionary algorithm is a population-based search and optimization algorithm. In the present embodiment, the algorithm works with a population of designs of size N, where N typically ranges from 50 to several hundred. At the start of the exercise, this population is seeded at random, that is, by selecting allele values at random for each gene from the allowed range for that gene. Alternatively, the current embodiment allows for deterministic seeding, in order to reflect a particular desired starting population.

Breeding

Mate Selection

When a participant submits a vote after assessing a first screen of candidates, the information is used to generate new designs and to populate the subsequent screen that is presented to him or her, based on the following procedure. Every design candidate in the first screen that received a thumbs-up vote is immediately selected for breeding; in other words, it selected to be a parent, call it P1. Next, a suitable mate is selected for it from among the larger population of designs. That mate becomes parent P2. If less than half of the displayed candidates receive thumbs ups, the current implementation can be, and usually is, set so that each of the selected candidates is bred twice. In this particular embodiment, mate selection is done stochastically based on the Euclidean distance in reproduction space between P1 and all other members of the population at that point in time. More specifically, the probability that any of the N−1 members of the population (or "entities") will be selected as a mate for P1 is computed based on the following formula:

$$Pr(j \mid i) = \frac{f(d_{ij})}{\sum_{j \neq i} f(d_{ij})}$$

where Pr(j|i) is the probability that entity j will be selected as a mate for entity i (with Pr(i|i)=0) and where f ($d_{ij}$) is a function of the Euclidean distance between entities j and i in the reproduction space, i.e.:

$$d_{ij} = \sqrt{(R1_i - R1_j)^2 + (R2_i - R2_j)^2}$$

The particular function used in this case decreases monotonically with distance; specifically:

$$f(d_{ij}) = e^{-\beta \left(\frac{d_{ij}}{d_{max}}\right)}$$

where β is a real valued parameter that determines the strength of proximity bias in mating, and $d_{max}$ is the maximum distance in reproduction space between any two entities at that point in time:

$$d_{max} = \underset{i,j}{MAX}(d_{ij})$$

The value of β is in the range [0, ∞), where a value of zero results in no mating bias and larger values give an increasingly more restrictive mating bias.

Another version of function f ($d_{ij}$), also used in this embodiment, is given by:

$$f(d_{ij}) = \frac{1}{\sqrt{\gamma \pi}} e^{-d_{ij}^2 / \gamma}$$

In this case, γ is a real valued parameter that determines the strength of distance bias in mating. The value of γ is in the range (0, ∞), where smaller numbers give an increasingly more restrictive mating bias.

The distance-weighted probabilities thus computed are used to load a "roulette wheel", or are used in a Stochastic Universal Sampling scheme. Once a mate is selected for P1, that entity becomes the second parent, P2, for the offspring about to be created. This is done through a crossover operation, optionally followed by a mutation operation.

In one alternative method for mate selection a genetic algorithm is used in which the bit string representation includes a set of functional genes (which correspond to our feature genes) and two other sets of genes that control mating (which correspond to our reproduction genes). One set of mating genes is called a mating template and the other set is called a tag. Both sets must have the same number of genes. The template and tag genes evolve along side the functional genes and are subject to crossover and mutation. A template gene can take on one of three values: 0, 1, or a wild-card symbol. A tag gene will be either a 0 or 1. Two individuals are allowed to mate if the template of one matches the tag of the other. If a 0 or 1 is specified for a particular template gene of one individual, then the same value must appear in the corresponding tag gene of the other individual. If the wild-card appears in a particular template gene, then any value of the corresponding tag gene will match. One mating scheme requires that the template of one individual match the tag of the other; an alternative scheme requires that each individual's template match the tag of the other for mating to occur. In either case, if no matches are found, partial matches may be allowed.

Generally, the idea of R-space is to prevent inter-breeding between distinct clusters of designs. Nevertheless, occasional experiments with inter-breeding can lead to important innovations. The dimensionality of R-space affects the neighborhood structure between clusters, and therefore the ease with which different clusters may attempt inter-breeding experiments. One obvious modification is to increase the dimensionality of the R-space from two to a higher number. Another possibility is to interbreed two designs that have received a thumbs-up from the same voter, perhaps within the same focus window. Such inter-breeding will create a small bridge in R-space between the two R-space regions where the parent designs are located. If the inter-breeding experiment is successful, then a new cluster will form. If the experiment is unsuccessful, then the offspring will become extinct.

An Alternative to R-space

An alternative embodiment of the present invention may include an assortative mating mechanism that determines mate selection based upon genealogical distance, as opposed to the R-space distance scheme described above. Specifically, the likelihood of two individuals $P_i$ and $P_j$ mating is related to the length of the shortest path that connects them in the "family tree." Individuals in the initial population are considered siblings, that is, we assume the existence of a "primary" parent that creates the initial population. The family tree is represented as a graph, where vertices correspond to individuals, and edges represent parent/child relations. Thus, an edge will exist between two individuals if and only if one of them is a parent of the other. Each individual records the identities of its parents, of which there are exactly two, so the graph is easily constructed. The only exception to this rule applies to individuals in the initial population, which all have an edge to a single parent vertex (the "primary" parent) that is inserted into the graph. The distance $d_{ij}$ between two individuals $P_i$ and $P_j$ (neither of which are the "primary" vertex) is the length of the shortest path between them on the graph. In the current implementation, the length of a path is measured by the number of distinct edges (or parent-child relationships) traversed to go from one individual to the other individual (as opposed to the Euclidian distance which is used in the R-space implementation described earlier.)

The probability of individual $P_j$ being selected as a mate for $P_i$ is:

$$Pr(j|i) = \frac{f(d_{ij})}{\sum_j f(d_{ij})}$$

where:

$$f(d_{ij}) = \max(d_{max} - d_{ij}, v_{min})$$

and where $d_{ij}$ is the length of the shortest path connecting vertices $p_i$ and $p_j$, $d_{max}$ is the maximum over all $d_{ij}$ (also known as the diameter of the graph), and $v_{min}$ (a parameter $<d_{max}$) is the minimal value that function f will return, to provide a non-zero minimum probability of mating for individual designs that are very far from each other.

Over time, the weaker branches of the family tree become extinct, leaving other branches that may possibly be distantly related. If so, then the different branches are reproductively isolated and therefore distinct species. The branches that go extinct are genetic combinations that are poor relative to the genetic combinations that survive. Thus, this method provides another approach to assortative mating.

Crossover operations are represented schematically below:

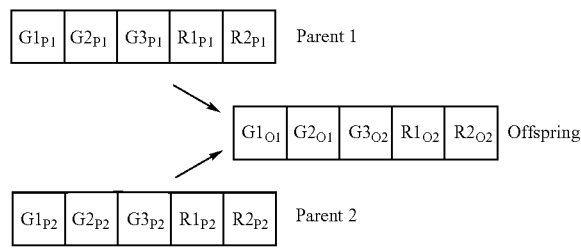

In the implementation described here, the parent genomes are crossed on a gene-by-gene basis. In other words, the genes for the body style, G1, from parent P1 and parent P2 are "combined" or "crossed" by themselves, followed by the G2 genes representing the collar style, then the G3 genes representing tab length. The reproduction space genes, R1 and R2 are also crossed, again individually. The particular cross-over operation used depends on the nature of the gene in question. For example, in the case of gene G1, which represents a categorical variable, the allele value from one of the parents is selected at random. Similarly for gene G2. This is shown schematically below:

$$G1_{O1} = \begin{array}{c} \overset{\alpha}{\nearrow} G1_{P1} \\ \underset{1-\alpha}{\searrow} G1_{P2} \end{array}$$

Where $\alpha$ is a random variable picked from a uniform distribution:

$$\alpha \sim U[0,1]$$

Gene G3 represents an integer value, which makes it possible to use different crossover operators, as an alternative to the "random pick from one parent" scheme. One possibility is to compute interpolated and extrapolated values using the two values from the parents, and then to select one of these two possibilities at random. The process is described below. First, a Bernoulli trial (a "coin flip") is performed to decide whether to interpolate of extrapolate a value for the offspring gene, from the two values of parent genes.

$$G3_{O1} = \begin{array}{c} \overset{\gamma}{\nearrow} \text{Interpolate between } G3_{P1} \text{ and } G3_{P2} \\ \underset{1-\gamma}{\searrow} \text{Extrapolate between } G3_{P1} \text{ and } G3_{P2} \end{array}$$

Where $\gamma$ is either a deterministic real value between 0 and 1, or a randomly generated variable within that range, for example one from a uniform distribution:

$$\gamma \in (0,1)$$

or $$\gamma \sim U[0,1]$$

If the decision is interpolation, a formula such as the one below is used:

$$G3_{O1} = \text{Round}(\mu \cdot G3_{P1} + (1-\mu) \cdot G3_{P2})$$

where $\mu$ is a real value between 0 and 1, either selected deterministically or drawn at random, at the beginning of an exercise, or at every breeding. Alternatively, different deterministic values or different distributions (in the case of variables drawn randomly) could be used at different points in the exercise. Since G3 is an integer gene, the value obtained by interpolation is rounded to the nearest integer.

If extrapolation is selected instead of interpolation, one of parent values is picked to determine the direction of such extrapolation; this is done at random. If P1's is picked, then a formula like the following one can be used:

$$G3_{O1} = \text{Round}(v \cdot ((1+\mu) \cdot G3_{P1} - \mu \cdot G3_{P2}))$$

where v is a (possibly random) real valued parameter, typically less than 1.0, chosen to scale down the size of the extrapolation step taken. An additional step not reflected in the formula above involves checking that the value thus computed does not exceed the allowable range for gene G3, and setting it equal to that limit if it does.

If P2 is picked as the extrapolation direction, then the following can be used:

$$G3_{O1} = \text{Round}(v \cdot ((1+\mu) \cdot G3_{P2} - \mu \cdot G3_{P1}))$$

The reproduction space genes, R1 and R2, being real-valued, can be treated similarly, except that the rounding operation is not needed. In the present implementation, a modified averaging operation is used, as follows:

$$R1_{O1} = \frac{1}{2} \cdot (R1_{P1} + R1_{P2}) + \varepsilon$$

where $\varepsilon$ is a Gaussian noise:

$$\varepsilon \sim N(0,2)$$

The calculation of $R2_{O2}$ proceeds similarly.

Many other schemes are within the knowledge of those of ordinary skill in the art.

Mutation

In addition to the crossover operation, or concurrent with it, a mutation operation is applied, to introduce occasional random variation in the design candidates that are generated. In the current implementation, this is done on a gene-by-gene basis again. For each gene, a determination is made, either before of following the crossover operation, as to whether a mutation is going to be applied. This is based on Bernoulli trial with a relatively low probability of success, around 0.01 typically. In the case of categorical genes, the mutation involves selecting, at random, one of the allowable allele values, typically a value that is different from those of the two parents. In the case of integer and real-valued genes, a Gaussian noise is added to the gene value obtained after the crossover operation is complete. Again, a check is performed to make sure that the mutated value is within the allowable range; if it falls outside that range, it is set equal to the upper or lower limit, as appropriate. Another case, not used in this example (the polo shirt) is where a gene is encoded as a binary bit or string. An example would be a design feature such as a logo or rings around the sleeves, which are turned on or off, depending on whether that bit is enabled or not. In that case, a mutation would simply involve a bit flip.

Mutation, as described so far, is only applied after a breeding event, and a breeding event is only triggered by a thumbs-up vote. A refinement to the implementation is triggered when no thumbs-up votes are generated, to prevent the evolutionary process from stagnating. In that case, we generate some number of random individuals every time a voter submits a set of votes that contain no thumbs-up. The merit attributes for these random individuals are generated as described above for initializing the population. The R-space attributes for these random individuals are determined as described below, in the section that discusses re-insertion of voter "picks".

Replacement/Removal Policies

Once one or more new design candidates (the offspring) are created, they are introduced into the population. In order to do that, a corresponding number of current members of the population must be selected for replacement. Various strategies are employed for that purpose, ranging from purely random selection, to relatively intricate schemes based on fitness (or lack thereof) and redundancy. (Various ways used to measure redundancy and diversity are described later.) In the simple case, a population member is chosen at random: a random integer i uniformly distributed between 1 and N (the size of the population of design candidates) is generated, and the $i^{th}$ member of the population is removed and replaced by the offspring. This is repeated as many times as the number of offspring created by a mating event. Another option in the current implementation is to bias the removal by fitness, or rather, lack of fitness. In that case, a misfitness score is maintained for each member of the population, and that score is either used deterministically to remove the member(s) with the highest misfitness score(s), or stochastically by loading a "roulette wheel" with slices proportional to these misfitness scores. A very simple algorithm for computing misfitness scores, one which only relies on "thumbs-up" votes, is the following. First, any members of the population of N designs that have not been assessed yet, and that therefore have received no votes, are set aside and are not candidates for removal. This is to avoid the premature loss of design candidates, unless absolutely needed (at which point we pick uniformly at random). Next, for each of the remaining members of the population, the rate of "thumbs-ups" is computed as the ratio of "thumbs-up" votes received by that entity divided by the total number of votes received by it (i.e., the sum of "thumbs-up", "thumbs-down", and "neutral" votes.) Next, the average rate of "thumbs-up" for all members of the population is computed, and the population of designs is divided into two groups, those that have a "thumbs-up" rate greater then average, and those that have a rate equal to or lower than the average rate. Members of the latter group are selected at random for removal, as needed.

A more discriminating removal scheme that uses all three types of votes—thumbs-up, neutral, and thumbs-down—is sometimes used in the current implementation. In that case, the misfitness $m_i$ for the $i^{th}$ member of the population is computed as a weighted sum of that member's thumbs-up, neutral, and thumbs-down rates, as follows:

$$m_i = w^{down} \cdot R_i^{down} + w^{neutral} \cdot R_i^{neutral} + w^{up} \cdot R_i^{up}$$

where the $w^{type}$ terms are the weights for the particular type of vote, and $R_j^{type}$ terms are the vote rates of the given type for the $i^{th}$ member, with $w^{down} > 0$, $w^{up} < 0$, and $w^{neutral}$ generally positive. For example:

$$m_i = w^{down} \cdot R_i^{down} + w^{neutral} \cdot R_i^{neutral} + w^{up} \cdot R_i^{up}$$

Again, design candidates that have not been seen by any of the participants are set aside, to prevent their premature elimination (unless absolutely necessary, for example in some cases early on in an exercise.)

Another variation on the removal policy modifies the contribution to the misfitness rating of similar votes, based on whether they were all cast by the same participant or by different participants. The idea behind this version is to penalize a design candidate more if it disliked by a number of different participants, that is, if different participants gave it thumbs-down for example, as compared to when it gets the same number of thumbs-down from only one participant. In this version, the individual votes for each entity are tracked, and the misfitness is computed based on declining weighting function or schedule for each participant's votes, as in the equation that follows:

$$m_i = \frac{1}{V_i} \left[ w^{down} \cdot \sum_j \sum_{n=1}^{V_{i,j}^{down}} e^{-\gamma(n-1)} + w^{neutral} \cdot \sum_j \sum_{n=1}^{V_{i,j}^{neutral}} e^{-\gamma(n-1)} + w^{up} \cdot \sum_j \sum_{n=1}^{V_{i,j}^{up}} e^{-\gamma(n-1)} \right]$$

where $m_i$ is the misfitness score of entity i, $V_i$ is the total number of votes received up to that point by entity i, $$V_{i,j}^{type}$$

is the number of votes of the given type cast by voter j for element i, $$\sum_j$$

represents the summation over all voters j, and γ is a real parameter that determines the steepness of an exponentially decreasing weighting function that reduces the impact of additional votes cast by the same participant.

Another class of removal schemes take into account how redundant a particular member of the population is, in addition to its misfitness. The idea here is the following: given two entities that are equally unfit, it is preferable to remove the one that is genotypically similar to many other members of the population, in order to minimize the loss of genotypic diversity in the population. The redundancy computation can be based either on the reproduction genes, the feature genes, or both. These computations are described in the next section. Given a redundancy value $R(P_i)$ for a member of the population $P_i$, its adjusted misfitness value $m'_i$ is computed, as:

$$m_i' = R(P_i) \cdot m_i$$

The next section describes various ways of measuring redundancy, or its opposite, diversity.

Diversity Measurement

Diversity measurement techniques are applied to both feature genes as well as reproduction genes. We use measures of diversity to dynamically control various parameters of the evolutionary algorithm, such as the mutation rate (mutation probability), as well as various strategies used in the system, such as the removal (or replacement) strategy and the strategies used to populate a participant's voting window (which are described later.)

Redundancy

Diversity in the evolving population of N designs is measured using a metric of genotypic (or phenotypic) similarity between pairs of evolving designs ("individuals"). A pair-wise similarity metric $S(P_i, P_j)$ is defined, which returns a value between 0 and 1, where 1 signifies that $P_i$ and $P_j$ are genotypically (or, alternatively, phenotypically) identical. We then use this metric to compute the redundancy of each individual in the evolving population with respect to the population as a whole, as follows:

$$R(P_i) = \sum_{j=1}^{N} S(P_i, P_j)$$

An individual with a high redundancy value is relatively common, in the sense that there exist many other individuals in the population that are similar to it. These redundancy values are used to help maintain diversity by biasing removal policies towards more redundant individuals, as explained in more detail below. Redundancy values are also used to provide a graphical visualization of genetic (or phenotypic) diversity.

Two similarity functions are used in the current implementation. One is based on the feature genes, the other on the reproduction genes. In the case of the polo shirt, the first one uses the first three genes of the genotype. (The first two are categorical genes and the third an integer-valued gene.) We define our function S as follows:

$$S(P_i, P_j) = \frac{1}{k} \cdot \sum_{k} S'(P_i^k, P_j^k)$$

where $P_i^k$ denotes the $k^{th}$ gene of an individual i in the population.

In the case of the categorical genes, G1 and G2, S' is given by:

$$S'(P_i^{1,2}, P_j^{1,2}) = \begin{cases} 1 & \text{iff } P_i^{1,2} == P_j^{1,2} \\ 0 & \text{otherwise} \end{cases}$$

In the case of gene 3, which is an integer gene, S' is computed as follows:

$$S'(P_i^3, P_j^3) = 1 - \frac{|P_i^3 - P_j^3|}{\text{Max}\Delta^3}$$

where $\text{Max}\Delta^3$ is the range of gene G3, that is, the difference between the maximum and minimum values it is allowed to take.

In the case of real-valued genes such as those used for the reproduction variables, redundancy or density is computed using the Euclidean distance $d_{ij}$ (described earlier) in R-space between the different population members, as follows. The redundancy or density of the $i^{th}$ population member is given by:

$$R(P_i) = \sum_{j} f(d_{ij})$$

where $d_{ij}$ is the distance in R-Space between individuals i and j, and $$f(x) = \max\left(1 - \frac{x}{\text{threshold} \cdot d_{\max}}, 0\right)$$

where threshold is a constant in the interval (0, 1] and $$d_{\max} = \max_{ij}(d_{ij})$$

Clustering

In this section, we describe the subject of clustering, which relies on similarity measurements, and which is used at different times in the embodiment described here, as discussed later. If the function $S(P_i, P_j)$, described above, indicates the similarity between individuals $P_i$ and $P_j$, then we can define a new function $$D(P_i, P_j) = 1 - S(P_i, P_j)$$

to indicate the dissimilarity between these two individuals. With the function D, we can compute a dissimilarity matrix M, where each entry $M_{ij}$ is the dissimilarity between individuals $P_i$ and $P_j$. This matrix is symmetric and has zeros on the diagonal.

With the matrix M, we can apply any number of known clustering techniques to group the individuals either according to genotypic similarity or proximity in R-space, such as the K-medoid clustering algorithm. The K-medoid algorithm must be told the number of clusters to find. If the number of clusters that would best fit the data is not known, then the silhouette value of a clustering, can be used to decide how many clusters should be sought.

We may also cluster the human users based upon their voting behaviors. In this case, we measure the correlation in the voting records of any pair of users $V_i$ and $V_j$ and derive an entry $M_{ij}$ in matrix M, as follows:

$$M_{ij} = 1 - \frac{1 + \text{correlation}(V_i, V_j)}{2}$$

Strategies for Populating the Voting Window

The voting window, also referred to as the focus window, is the window presented to each voter for the purpose of displaying a set of design candidates and collecting that voter's assessment of them. The various policies used to populate the focus window at each voting iteration are described in this section. Generally speaking, these policies seek to achieve a number of sometimes conflicting goals: a) giving the participant an opportunity to explore as much of the design space as possible, and b) giving the participant a sense that the system is responsive to his or her votes.

Voting Window Mixture Policy

The voting or focus window mixture policy examines the votes that are submitted from a first focus window and determines the number of slots in the next focus window (for the participant whose votes the system is currently processing) that will be filled with: a) offspring of design candidates shown in said first focus window, and b) samples of design candidates from the general population of design candidates.

In the present implementation, all individuals in the focus window that receive a thumbs-up vote will parent at least one, but no more than two, offspring. If the number of thumbs-up votes is less than the number of focus window slots, then the individuals that have received a thumbs-up vote will be used to produce a second offspring until each has produced a second offspring, or until the slots of the new focus window are filled, whichever comes first. For example, if the focus window has six slots, and two individuals are given a thumbs-up, then both will parent two offspring, which will fill four of the six slots of the new focus window. If, instead, four individuals are given a thumbs-up, then the first two individuals will each parent two offspring, while the last two will each parent one, thus entirely filling the six slots of the focus window.

If, once all the thumbs-up votes are acted upon, any slots remain empty, then they are filled by sampling the general population of individuals, as described in the next section.

The policy described above is modified slightly when only one offspring is allowed for each candidate that receives a thumbs-up (see breeding section above.)

An alternative mixture policy used in the current implementation introduces the notion of elitism—well known in the Evolutionary Computation literature-into the focus window, such that some or all of the individuals that receive a thumbs-up are retained in the next focus window. Typically, elitism is used in generational versions of evolutionary algorithms in order to avoid the disappearance of highly fit members of the population across subsequent generations. In this case, we use a similar notion in the focus window or voter window. The motivation behind that policy is to provide a sense of continuity for the participant who might be uncomfortable with the disappearance from the focus window of previously preferred design candidates. When thumbs-up voting is used, as described in this example, if more entities received thumbs-up than there are elite slots in the next window, random picks are made among those entities that received thumbs-up, until the elite slots are filled.

Yet another alternative policy in the current embodiment fixes the minimum and maximum number of focus window slots that will be allocated for: a) elites (individuals that have received a thumbs up and that are carried over), b) offspring of those individuals that have received a thumbs up, and c) samples of the general population. If the number of thumbs-up votes exceeds the number of slots allocated for offspring, then a sampling method is invoked such that only some of the recipients of thumbs-up votes are able to parent an offspring. Alternatively, we can limit the number of thumbs-up votes that a user is allowed to make per focus window. Yet another alternative is to create offspring for every individual receiving a thumbs up, but not include all the offspring in the subsequent focus window (those not appearing in the focus window will still be in the general population).

Focus Window Sampling

For focus window slots that are available for samples from the population at large, a policy is needed to decide how these candidates are chosen. In the current implementation, the simplest policy used is one where we sample randomly, uniformly across the population of individuals. This sampling takes place after all offspring (parented by the individuals that received a thumbs up) have been inserted into the population. The sampling procedure does not attempt to prevent the same individual from appearing twice in the focus window, nor does it attempt to prevent two distinct individuals that are genotypically identical from appearing together in the focus window.

An alternative approach is to bias the sampling away from regions of high redundancy (redundancy being computed as described in a previous section.) The advantage of these policies is to allow for greater exploration of the design space by the participants, by affording greater diversity in their focus windows. One such policy, used in this embodiment, utilizes R-space redundancy to discount how likely a particular population member is to be selected. More specifically, roulette wheel selection is used, with the slice given to each of the N members of the population being inversely proportional to the redundancy of that member:

$$PR(P_i) = \frac{1}{N \cdot R(P_i)} \Big/ \sum_i \frac{1}{N \cdot R(P_i)}$$

Another policy uses feature space redundancy (calculated on the basis of the feature genes) to bias the sampling, again using the same formula as above.

An alternative policy embodied in the present system performs a cluster analysis (described above) of the individuals in the population, either with respect to their positions in R-space, their genotypic characteristics, or both. Once the clusters are determined, the random sampling is conducted such that each cluster is equally likely to provide an individual for the open focus window slots, regardless of the number of individuals in each cluster. The advantage of this scheme is to allow the participant to sample equally from the different species or preference clusters (or aesthetic clusters) that are emerging during the exercise (speciation is discussed later.) This is in contrast to uniform sampling where, in effect, we sample from every cluster in proportion to the cluster size. A related approach is one where we select the representative design candidate for each cluster (the centroid or medoid of that cluster).

In yet another policy, we bias the sampling in favor of individuals that have been infrequently viewed by that participant. In this case, the probability of a member of the population being selected is inversely related to the number of times it has appeared in his or her focus window. The probabilities used to load the roulette wheel are given by:

$$Pr(P_i) = \frac{1}{f(m_{ij})} \bigg/ \sum_i \frac{1}{f(m_{ij})}$$

where $m_{ij}$ is the number of times that design candidate $P_i$ has appeared in the focus window of participant j, and f(x) is a monotonic function. For example:

$$f(m_{ij}) = m_{ij}^2$$

In a related policy, we bias the selection in favor of individuals with feature properties that have been infrequently viewed (based on feature similarity), or in favor of individuals in regions of R-space that have been infrequently viewed in the focus window. Here too, the probabilities used to load the roulette wheel for selection are given by:

$$Pr(P_i \mid W^t) = \frac{1}{R(P_i \mid W^t)} \bigg/ \sum_i \frac{1}{R(P_i \mid W^t)}$$

where $R(P_i|W^t)$, the redundancy of population member $P_i$ with respect to the $t^{th}$ focus window $W^t$ ($W^1$ being the current window, $W^2$ the previous window, etc.) of the given participant is given by:

$$R(P_i \mid W^t) = \sum_q S(P_i, W_q^t)$$

where $$\sum_q$$

is the summation over all q members or design candidates in the focus window, and $S(P_i, W_q^t)$ is the similarity between entity $P_i$ and the $q^{th}$ member of focus window $W^t$. Finally, S, the similarity function, is computed using any of the methods given in the previous section on redundancy and similarity, as appropriate.

A variation on this policy is one where we track not only the last focus window, but the last few or n focus windows and where we either give all of them equal weight or give the content of the more recent focus windows greater importance in the redundancy calculations. One particular version of this looks at the last n focus windows (n=3, e.g.), and weights them differentially. The slices or shares used in the roulette wheel in this case are given by:

$$Q(P_i) = \sum_{t=1}^n \omega_t \cdot \left( \frac{1}{R(P_i \mid W^t)} \bigg/ \sum_i \frac{1}{R(P_i \mid W^t)} \right)$$

with the weighting factors $\omega_t$ decreasing with $$\omega_t = \frac{1}{t}$$

as an example.

In yet another sampling policy, used with in this implementation, we bias the sample away from individuals that are redundant (either based on feature space similarity or on reproduction space similarity, or both) with respect to individuals that have been given a thumbs-down vote by the participant whose focus window is being populated. This is intended to minimize the chances of subjecting that participant to design candidates that he or she already voted down. This is done in a manner similar to the ones described in the previous policy, except in this case, the redundancy used is not $R(P_i|W^t)$ but $R(P_i|W^{down,t})$, which is computed only with respect to those focus window members that received a negative vote from the participant in question. A related policy is one where we bias the sample towards individuals that are redundant (either in feature space, reproduction space, or both) with respect to individuals that have been given a thumbs-up vote (alternatively, a neutral vote) by the user whose focus window is being populated. In that case, $R(P_i|W^{up,t})$ is used, the probabilities or shares used in the roulette wheel are directly proportional to redundancy, as opposed to inversely proportional; for example:

$$Pr(P_i \mid W^t) = \frac{R(P_i \mid W^t)}{\sum_i R(P_i \mid W^t)}$$

Yet another policy attempts to maximize the diversity in the focus window with respect to the genetic content of design candidates (either based on feature genes, reproduction genes, or both) with each subsequent sample being biased away from the properties of the individuals placed into the focus window up to that moment. The rationale is to increase diversity in the participant's focus window.

Any of the policies mentioned above, or variations thereof, can be employed to populate a participant's window when that participant returns after being away from an ongoing exercise for a while. Another policy used specifically for that purpose involves reloading a returning participant's window with the same candidates that were present in his or her last focus window when they last logged off. This policy is often problematic however, as these candidates are likely to have been removed from the population, necessitating that they be recreated and re-inserted in the population. An alternative is to present the participant with as broad a sampling of the current design population as possible. This is done by sampling from cluster representatives as described earlier. This policy is also used in the case of a participant who joins the exercise after it has been ongoing for some time, and who is not identified with any particular preference segment.

Figure 7D:
FIG. 7D is a screenshot showing an embodiment of a voting screen featuring a "pick panel" and a "progress bar."
Figure 8:
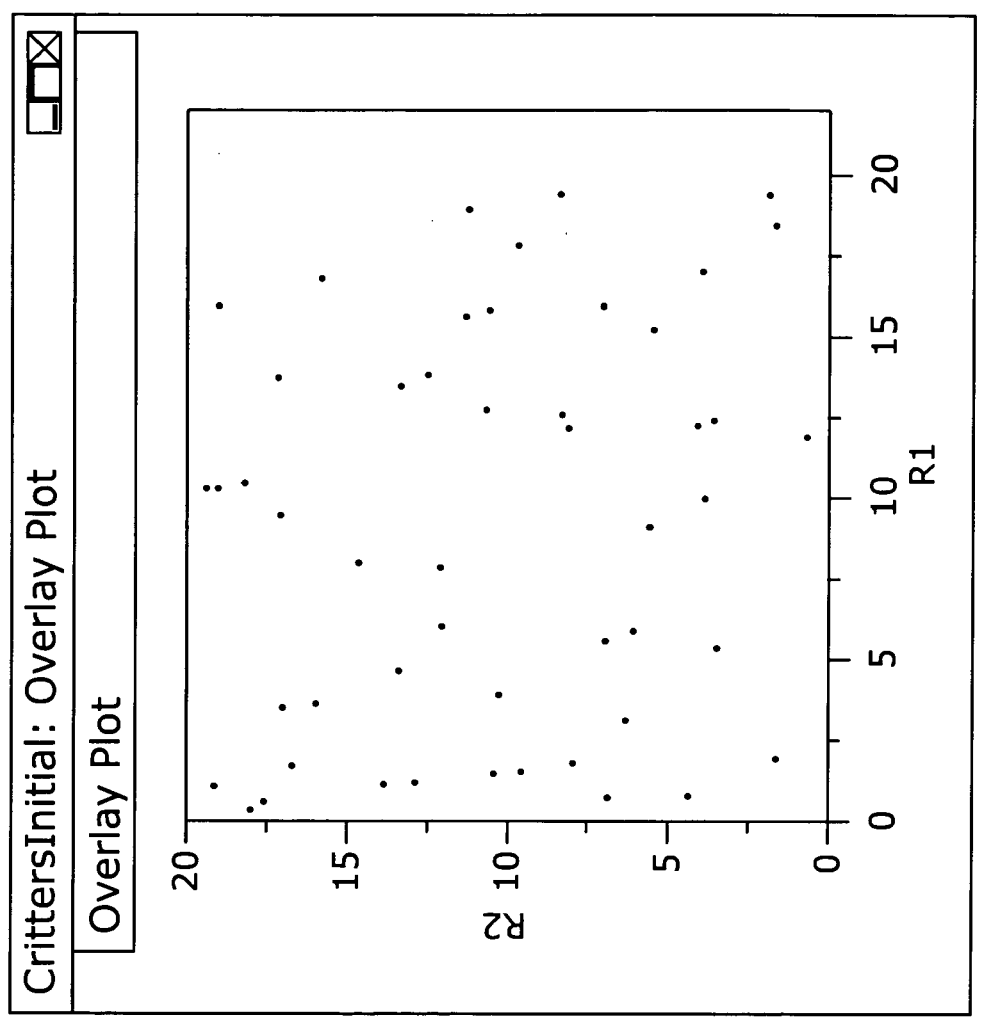
FIG. 8 is a screenshot depicting an embodiment of a display of items based on their R-space representation.
Figure 9:
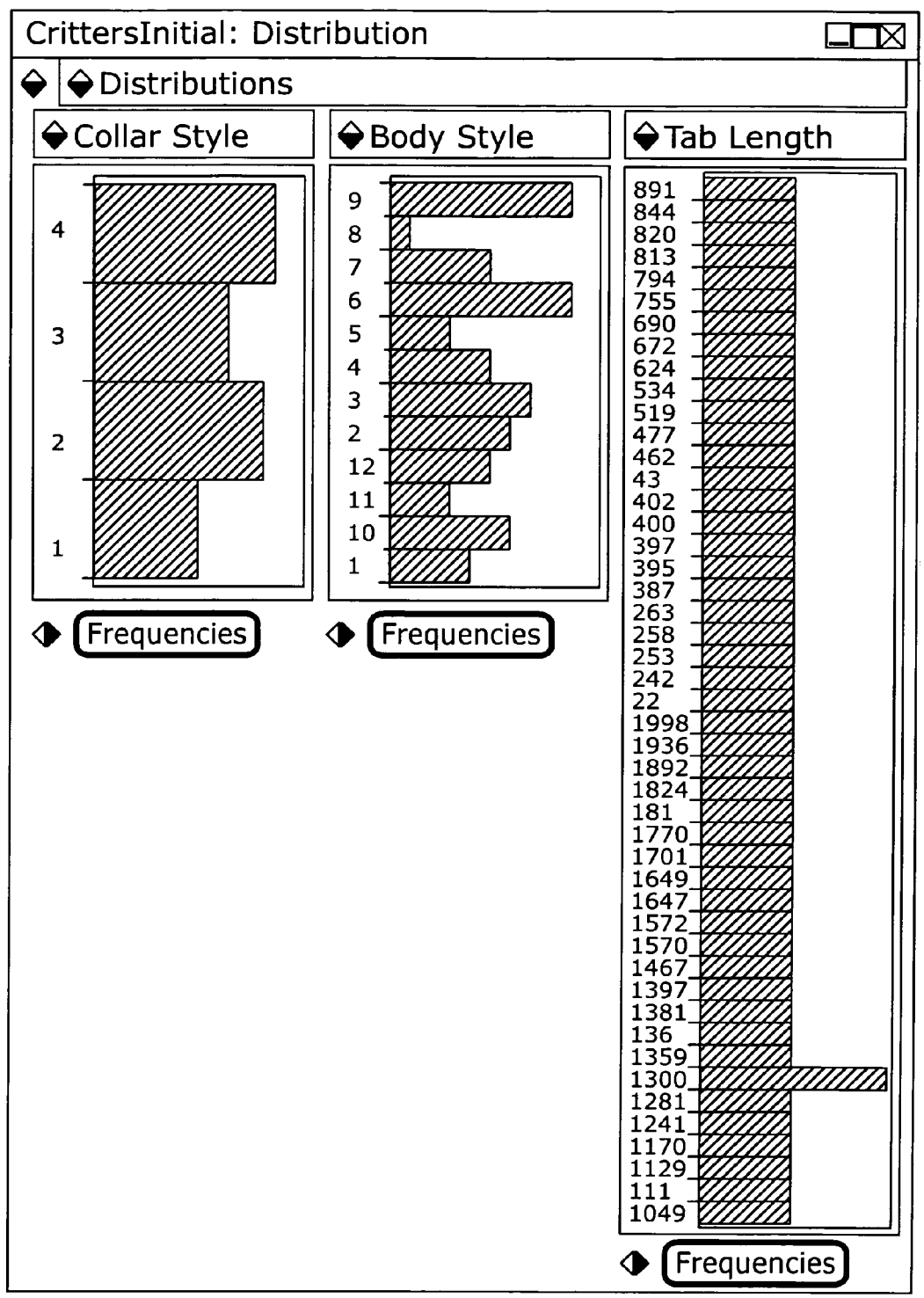
FIG. 9 is a screenshot depicting an embodiment of a display of items based on their feature representation.

In one embodiment certain refinements are added to the voting window, which are intended to provide the participant with some or all of the following: a) a measure or indication of progress during the exercise; b) a sense of accomplishment as goal posts are reached during the exercise; c) more direct control over the evolution process; d) a sense of membership in a community of co-participants in the design process. FIG. 7D shows a voting window with two of these refinements on the right hand side. These include a progress bar 780 that covers a range from 0% to 100%, and that indicates the level of progress with a colored section. The other refinement shown in the same figure is the "pick panel" 788, which is the panel on the right hand side of the voting window, under the progress bar, labeled "Marker Designs". In the figure, the picks panel shows three thumbnails arranged vertically, one of them with a selection in it, and the other two still blank. The picks panel displays particular design candidates at certain points during the exercise, based on one of the strategies described below. In the case shown, an "X" mark under the selected pick allows the participant to remove said pick and to restart that part of the exercise that resulted in that particular pick.

Four classes of strategies may be used in this embodiment. The first class of strategies relies on a fixed number of votes submitted by the participant; a second class depends on the degree of similarity among the candidates that are showing up in the participant's last few voting windows, and therefore may involve a variable number of voting submittals by the participant in question. A third class allows the participant to directly select one of the design candidates in the voting windows a pick, by using a special button next to the thumbs-up and thumbs-down button (not shown in this figure.) Finally, a fourth class of strategies are intended to use the pick panel to show the participant how other participants are voting.

Strategy I: Analyze a Preset Number of Votes and Pick

In this strategy, the system is set to allow each participant to view and assess a preset number n of voting windows, with typical values of n ranging between 6 and 40. In this case, the progress bar increases in proportion to the ratio of voting windows viewed by the participant up to that point, to the preset number n. After the n vote submittals, a pick is automatically made on behalf of the participant based on his voting patterns, as described below, and the progress bar is reset to zero, a new voting window populated at random from the population of designs at large, and a new set of n vote submittals is started. The voting window shown in FIG. 7D corresponds to a case where the participant is asked to go through three sets of n vote submittals, resulting in three picks.

After the preset number n of voting windows, an analysis is performed on that participant's votes on these n windows (all the votes may be examined or only the last 80% of the n submittals may be examined to remove any "training" or accommodation effects.) In one scheme, the analysis involves counting the thumbs-up votes received by each allele, and using the counts to generate the most "selected" combination of attributes values. At that point, a design candidate is assembled using these most selected attribute values, and it becomes the pick. This approach works well when there are few or no dependencies between genes. A more refined analysis that works well even if there are dependencies involves the following steps: After the n vote submittals have been received, all candidates in these voting windows that have received a positive vote (thumbs-up) are collected. Then, a first positive-vote-candidate is selected, and, starting with the first gene of that candidate, a count of how many of the other positive-vote-candidates share the same allele for that gene is performed. This is repeated for all the genes of the selected candidates, and these k counts (k being the number of genes) are added up; this count is the "representativeness" score for that candidate. This process is repeated for every one of the positive-vote-candidates, and these are ranked on the basis of their score. Of those, the top-ranking positive-vote-candidate is selected as a pick.

In one variation, the participant is given a chance to reject the chosen pick, in which case the next highest scoring one is selected as a pick, and so on. If several (for example, three) are rejected, that set of n iterations is restarted. In another variation, the participant is presented with a panel showing the three highest scoring pick candidates, and he is given the opportunity of choosing the one he deems closest to what he had been voting for.

Strategy II: Focus Window Convergence Pick

In the second class of progress indication strategies, the progress bar does not increase monotonically, but it might regress depending on the behavior of the participant. If a voter votes consistently, then it is more likely that his successive voting windows will be populated with increasingly similar design candidates; in that case, a progress bar tied to the similarity of the contents of these successive voting windows will increase. In this case, the number of vote submittals prior to a pick selection is variable. As some fraction (say, ¾) of the design candidates in the voting window became identical or very similar, the most duplicated candidate is chosen as a pick. Having made the pick, and if the pick is not rejected by the participant, a new focus window is populated (e.g., at random), and the participant starts the next phase of the process that will yield the next pick. If the pick is rejected, alternatives similar to the ones presented above under Strategy I are followed.

Strategy III: Direct Selection

In this case, after a certain number of voting submittals have been made by the participant, an additional button is enabled next to each of the design candidates in the focus window. That button is a direct pick button, which allows the participant to select the corresponding candidate to become a pick. Alternatively, when direct picks are enabled, the participant is allowed to drag the desired candidate from its location in the voting window onto the picks panel area, which will place a copy of it there. Once the participant makes a direct pick, the direct pick buttons are again disabled for a preset number of voting iterations. The pick panel has a fixed number of slots to hold the picks, and when a new pick is inserted by clicking its direct pick button, it gets placed at the top of the Pick Panel, while everything else moves down one slot, the design occupying the bottom slot being discarded. If the pick is made by dragging it onto the pick panel, then the picked design either replaces the item in the slot onto which it is dragged and dropped, or the items at that slot and below are shifted down one slot (item in bottom slot again discarded). No matter how the pick panel is managed, the history of all picks is recorded for subsequent analysis.

Strategy IV: Social Network Effect Schemes

This is a family of strategies that involve showing the participant, in a pick window, not only the pick candidates estimated based on his voting patterns, but also the picks (candidates or actual) for other voters. In this case, the most popular design candidate across voters is estimated using the same techniques described under Strategy I above, except that the positive-vote-candidates are collected from all participants, not only from the participant whose voting window we are discussing.

Speciation and Dynamic (or Co-Evolutionary) Segmentation

When the β parameter used to control mate selection 3 is set to a high enough value, such as 40.0, then the mechanisms and procedures outlined above will automatically allow different preference profiles to emerge and to coexist during the process. To the extent that the participants represent a population of consumers in a market, and to the extent that different subgroups in that market end up evolving preferences for distinct combinations of product attributes, then the system in effect performs a sort of dynamic segmentation of that market. The term "dynamic" is used here to indicate that the preference profiles and the corresponding preferred designs are co-evolved during the process. This is different from existing approaches to market segmentation, which either assume given preference profiles (for which appropriate design are developed), or given designs for which the appropriate customers are identified. This section is intended to explain how the current implementation affords that segmentation capability, and to present a simple example.

Assortative Mating

To the extent that crossover operations between certain individuals (design candidates) results in new candidates that are less preferred by the participants, we seek to prevent such mating from occurring. However, we do not know a priori which such matings will be deleterious. The R-space mechanisms that express individuals' mate choices can learn, over time, which mate pairs are compatible and which are not, based upon the assessment by participants of the outcomes of actual matings. Pairings of genetic material that are successful will gradually tend to occur more frequently and, thereby, crowd-out those pairings that are less successful. The prohibition (or reduced likelihood) of certain mate pairs is known as assortative mating, and each set of individuals that are allowed to mate with each other, but not with members of another set, is known as a species.

The evolution of species (speciation) is of direct importance to dynamic participant preference segmentation. When a design exercise begins, the R-space is homogenous: the R values of the population of design candidates are distributed uniformly in R-space. As evolution proceeds, information is gained (through the participants' feedback) about which pairings of genetic material are more successful than others. As a result of participants' assessments and the crossover operations on the reproduction genes, the distribution of the gene values in R-space becomes heterogeneous. In other words, the R-space begins to cluster. This heterogeneity is structured in a way that keeps certain individuals near each other and far from others. These clusters correspond to species, that is, sets of individuals that are reproductively isolated. As reproductive isolation emerges, each species, along with the participants who have evolved it through their voting, become specialized to a particular sub-region of the design space, and they are less subject to interference from other species.

Multiple Niches in an Ecology

When a market has multiple segments, there exists a set of distinct preference profiles for each of these segments. Each segment's preference represents an area in the design search space. These areas can be thought of as distinct ecological niches. The assortative mating dynamic allows multiple species to emerge and persist, where each species inhabits its own niche. The number of participants supporting each segment—a proxy for the size of that market segment—determines the carrying capacity of that niche, and thus the size of the corresponding species. In other words, as R-space clusters form, the size of a cluster (the number of design candidates that belong to that particular species) reflects the size of the market segment (assuming a balanced level of voting among participants, which can be controlled in the current implementation, either by limiting the number of voting screens presented to each participant, or by disregarding the votes submitted by a given participant that participant has reached his or her allotted number of votes.) Because the participants discover design possibilities as they interact with the system (and thereby form opinions), and the designs evolve in response to the participants, one can describe the interaction between designs and participants to be in some sense co-evolutionary. The preferences evoked by the evolving designs allow the system as a whole to converge on a set of designs that delineate multiple segments in the market.

Figure 10:
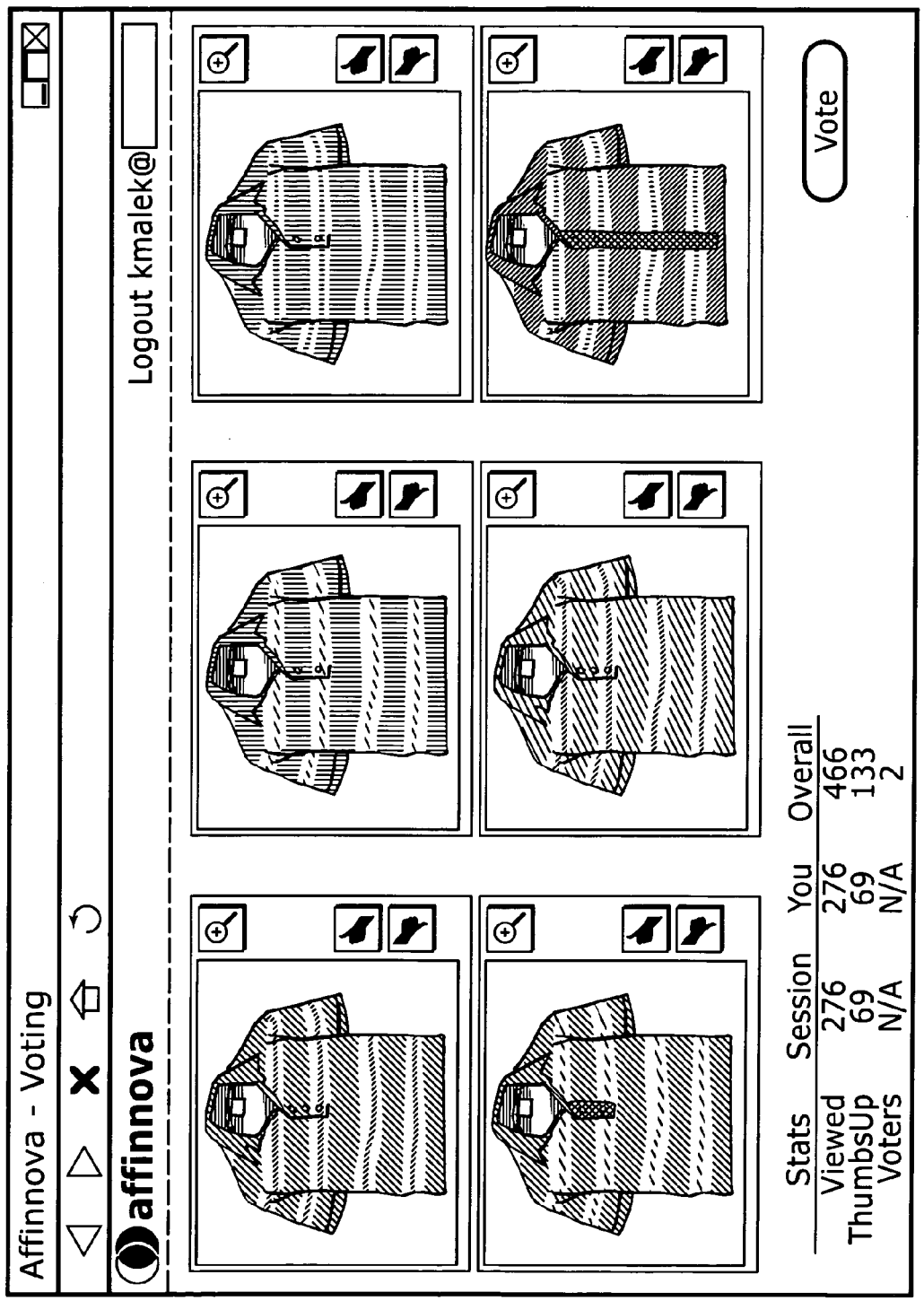
FIGS. 10 and 11 are screenshots showing the items presented to participants during one embodiment of a design exercise.
Figure 11:
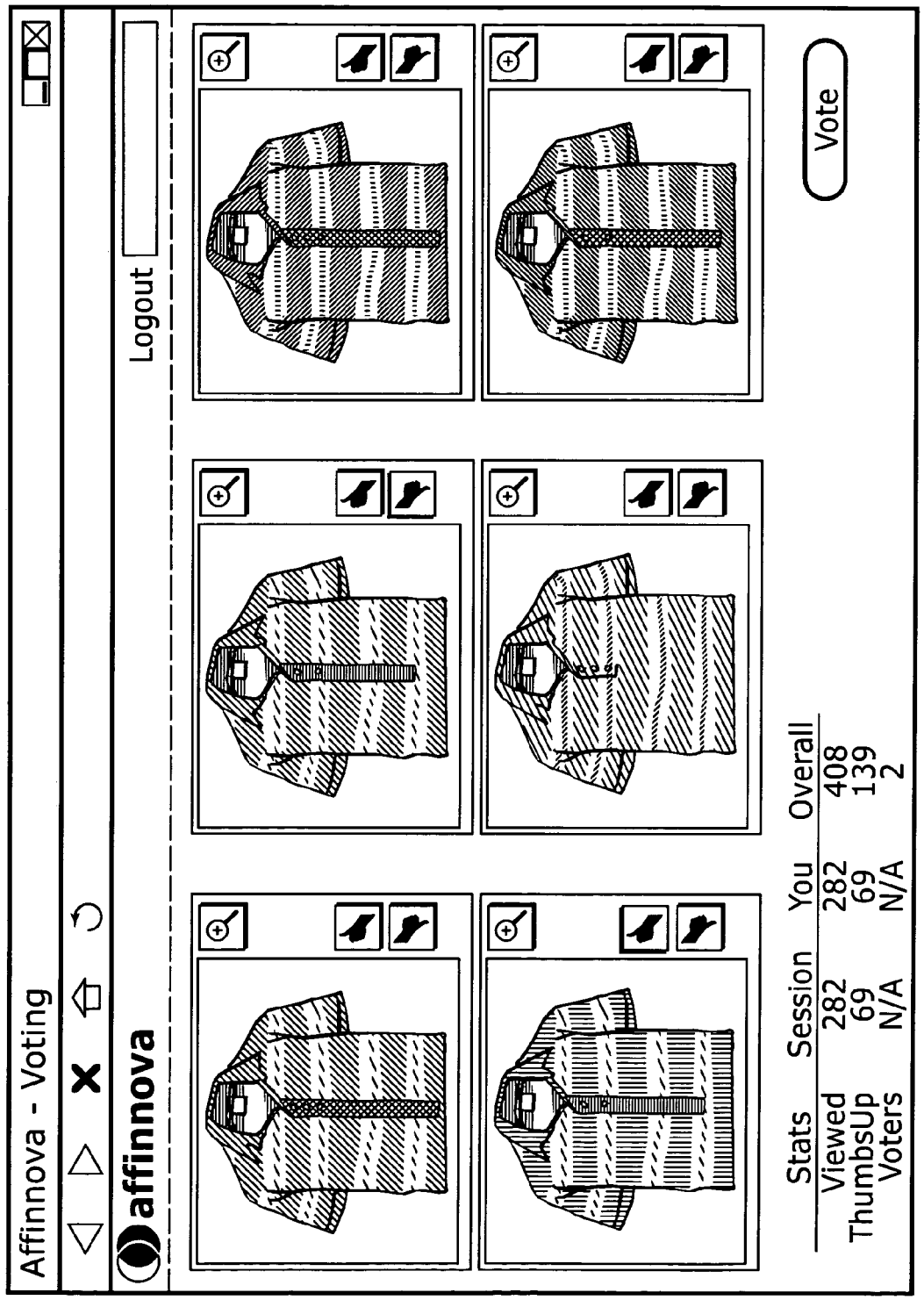
Figure 12:
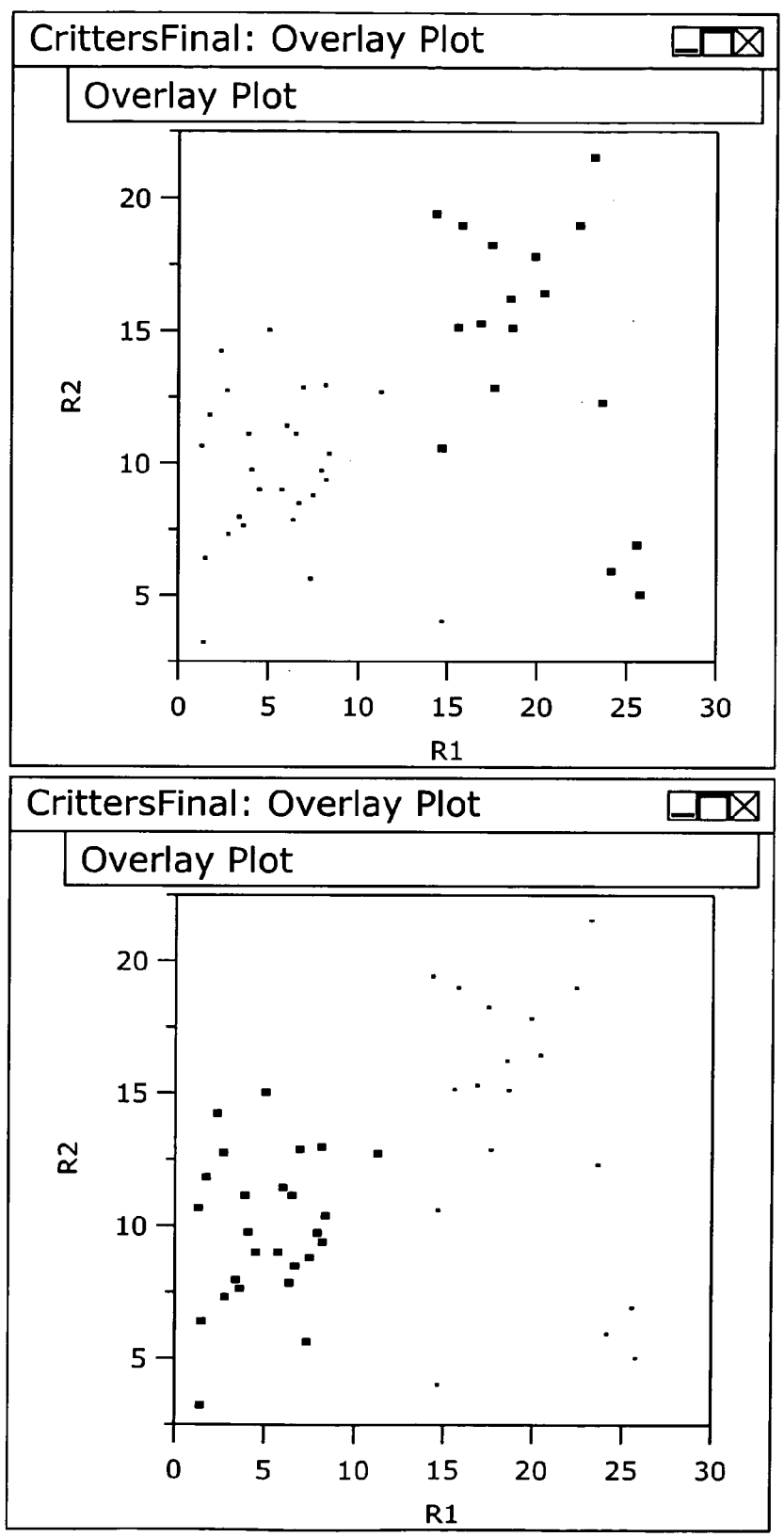
FIG. 12 is a screenshot depicting one embodiment of an R-space plot.
Figure 13:
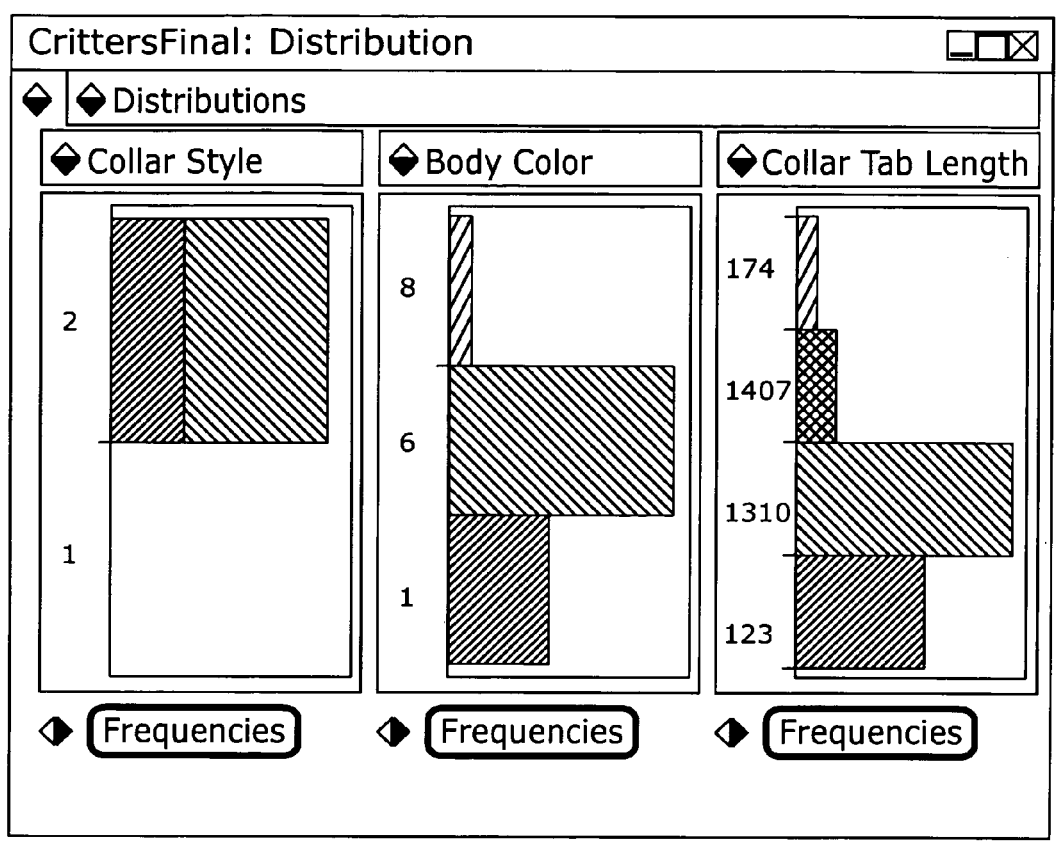
FIGS. 13 and 14 are screenshots depicting the distribution of feature genes in one embodiment of a design exercise.
Figure 14:
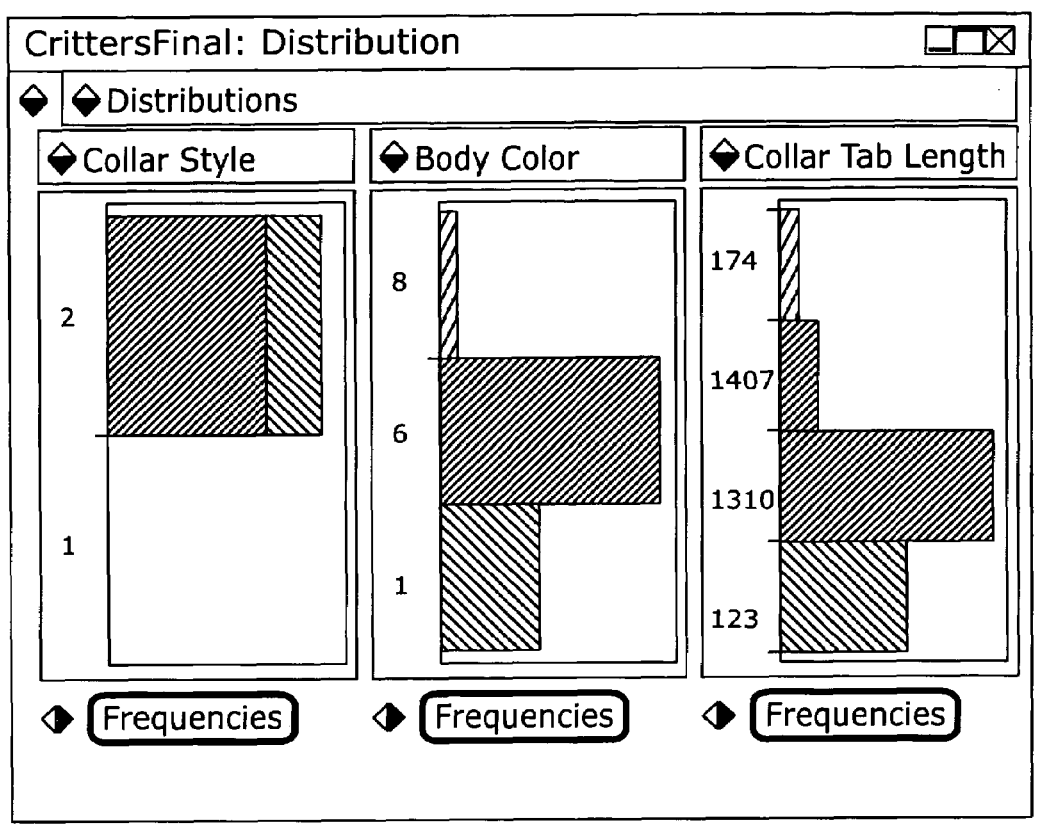

FIGS. 8 through 14 present an example of this dynamic segmentation process. In this example, two participants interacted with the system concurrently. The process starts with uniformly distributed reproduction genes and feature genes (see FIGS. 8 and 9, respectively) based on a random seeding of the population of candidates. After a number of voting cycles, two segments emerge, one corresponding to participant 1, and the other to participant 2. FIGS. 10 and 11 show the focus windows for the two participants at that point in the exercise. The content of each focus window is dominated by the design of choice for that participant, that is, the design choices shown to the first participant may feature different colors, patterns, and design styles (e.g. tab length) than the design choice presented to the second participant. The design choices shown to either participant may be highly concentrated in R-space, that is, each design choice may be very similar to each other design choice shown to that participant (e.g. similar colors, similar patterns, etc.). In other exercises the design choices presented to participants may be scattered in R-space, that is, each design choice may have a different color or pattern from other design choices being presented to the participant. FIG. 12 shows the R-space plot at that point, with the design candidates corresponding to the two segments highlighted; in this embodiment, the two clusters are clearly distinguished. Finally, FIGS. 13 and 14 show the distribution of feature gene values for each participant at that point in the process. FIG. 13 depicts the distribution of feature genes 1 though 3 for participant 1. Style "2" is the only surviving collar style, since it is preferred by both segments. Participant 1 prefers a purplish body style (body style "1") and a short tab length (value equal to 123).

FIG. 14 depicts a distribution of feature genes for participant 2. Collar style "2" (tab collar) is the only surviving collar style. Participant 2 prefers a green body style (body style "6") and a long tab length (value equal to 1310).

In one embodiment, the demographic information collected about each user may be used to alter the evolutionary algorithm described above. For example, a system may accept input from a wide universe of users but only use input from a set of users having a particular demographic for the purposes of evolving the universe of design objects. This embodiment allows the manufacturer to determine the preferences of a particular market segment without requiring the manufacturer to affirmatively direct a market research effort at a particular demographic market.

In another embodiment, the system described above may be used to permit data to be gathered concerning competitive products. This is accomplished by including competitive products in the set of products designed to see if they "survive." In one particular embodiment, the evolutionary algorithm recognizes when a competitive product is genetically similar to a set of product designs selected by one or more selectors and inserts the competitive design into the next generation of product choices.

In still another embodiment, the evolutionary design system includes information from commercial actors that supply raw materials to the manufacturer. For example, a supplier may provide information concerning handles available for inclusion in a product. The information typically will include dimension information and style information, but may also include pricing information. In this embodiment, a selector may be provided with information regarding the cost of a potential design and that genetic factor may be considered in creating the next generation of products for review by the selector.

In yet another embodiment, the evolutionary design techniques described above are enhanced by providing to selectors simulated endorsement data or other promotional schemes and strategies. In this embodiment, selectors that are perceived as opinion makers may have their voting preferences displayed to the voting public to determine if other selectors change their votes based on the knowledge of the opinion-makers voting preferences.

Hybrid Experiments

As mentioned above, it is advantageous to combine analysis and experiment methodologies when interacting with selectors. Such combinations are referred to as "hybrid experiments" and have multiple embodiments, each embodiment achieving different benefits in light of the data collected. Differing embodiments are discussed below.

Figure 15:
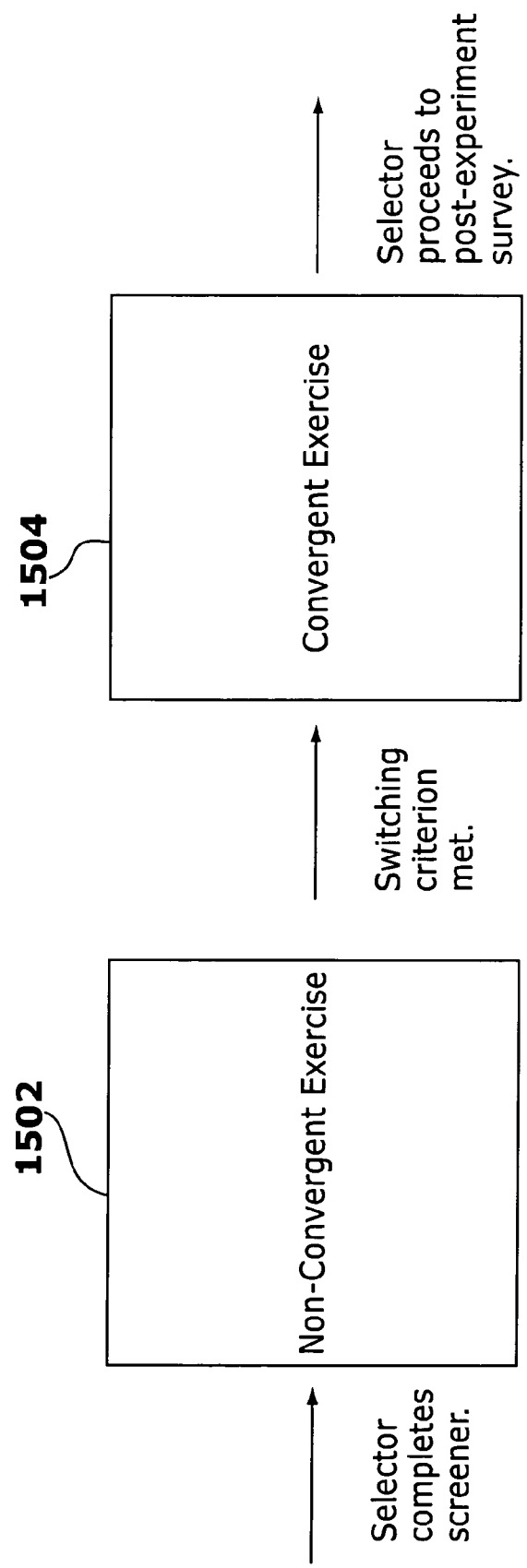
FIG. 15 is a diagram depicting an embodiment of the present invention, an experiment where a non-convergent exercise transitions to a convergent exercise.

FIG. 15 is a diagram depicting an embodiment of the claimed invention, an experiment where a non-convergent exercise 1502 transitions to a convergent exercise 1504. An experiment may consist of one or more exercises, which are smaller sets of experiences grouped together, usually through the form of analysis that is applied to the steps of the exercise.

A non-convergent exercise, like any exercise, is a series of interactions that a selector has with a presenter (e.g., a computer) wherein the selector's answers are collected and potentially analyzed. However, though the order and combinations in which choices are presented may be modified, the base population, preferably, is not. Since the base population is typically not modified in response to user input, it does not converge or evolve members to maximize their fitness (fitness being measured in terms of selector preference). Since this series of interactions does not cause population convergence, it is naturally referred to as a non-convergent exercise. Examples of non-convergent exercises may include interactions that utilize conjoint analysis.

A convergent exercise, on the other hand, evolves the base population into new attribute combinations as the selector participates in the exercise. The population converges towards maxima of selector preference as the exercise progresses, potentially creating completely new population members along the way. Naturally, interactions that involve population convergence are referred to as convergent exercises.

In some embodiments, the non-convergent exercise 1502 comprises a traditional conjoint experiment. In other embodiments, the non-convergent exercise 1502 comprises an Adaptive Conjoint Analysis wherein the order of choices presented may change in response to selector interaction, but the population preferably does not.

The convergent exercise 1504 may be a genetic algorithm-based exercise such as those described above, or it may be another evolutionary-oriented approach.

Transitioning from a non-convergent exercise to a convergent exercise is beneficial for experiment design in that it combines the advantages of each. A non-convergent exercise 1502 will typically provide, generally by means of a regression model, information about a selector's part-worths (or utilities) for particular decision object attributes for a broad number of decision objects. A convergent exercise 1504, however, focuses a selector's preferences into maxima of affinity. These maxima may be local to a selector or a group of selectors, or beneficially, a global maximum of affinity for all selectors. By combining these approaches, utilities may be calculated for a selector's preferences and those preferences may be applied to jump-start the evolutionary processes by presenting the selector(s) with "good" choices. Additionally, by running the non-convergent exercise first, knowledge may be gained about decision objects the selector did not approve of in the convergent portion of the exercise. Illustrative of jump-starting evolution, when a candy manufacturer is designing a candy bar wrapper and performing research on the marketability of different wrappers, a selector may prefer certain logo and wrapper colors, but may not be concerned with the placement of nutritional information. Once it has been determined that logo and colors are important to the selector, e.g., have higher part-worths on average, it is possible to focus the selector's attention on variations of the logo and color and not on the placement of the nutritional information. However, knowing that the selector did not express a preference about the placement of nutritional information is also valuable. Knowledge of a selector's dislikes allows the experiment designer to create alternate design scenarios or to answer hypothetical or modeling questions for disfavored or specific decision objects within the convergent population. Running the non-convergent exercise first also enables the experiment designer in some embodiments to collect data not influenced by previous decisions the selector may have made (thus the data is less biased). In fact, in some embodiments, no analysis is applied to the interactions at the point before the transition to the convergent exercise, i.e., the exercise is simply a data collection routine.

Running a convergent exercise 1504 utilizing the previous non-convergent exercise's 1502 utilities or part-worth estimates is beneficial because the experiment designer is able to focus on the selector's preferred combinations of parameters or attributes. Using the previous example, assume a conjoint analysis was performed at the end of the non-convergent exercise to determine that a selector indicated that logo color was important. The convergent exercise might begin by showing only wrapper variations with a prominently displayed preferred logo. Alternatively, the convergent exercise may begin by showing the selector several wrapper variations with a wide variety of logos to determine which logos are desirable, depending on the objective of the study. In either case, the convergent exercise is applying utilities obtained during the non-convergent exercise and presenting the selector choices based at least in part on this information.

Once the initial choices are displayed to the selector in the convergent exercise, the choices the selector made during the non-convergent exercise generally do not affect the convergent exercise. The nature of the convergent exercise is to adapt choices presented to the selector as the exercise progresses. Therefore, the transition between exercises may involve intelligently populating the choices presented to the selector at the beginning of the convergent exercise based on information obtained in the non-convergent exercise. In embodiments where no analysis is applied to the data before the convergent exercise is run, the choices presented in the beginning of the convergent exercise are chosen at random and reflect the distribution of attributes present in the evolutionary exercise population at that point in time.

It should be noted that it might not be apparent to the selector that she has changed exercise types. In some embodiments, the transition may be made seamlessly between choice screens and may appear to the selector that there is a single exercise being performed. In other embodiments, the exercises may be separated by a few hours, or even a day, in order to gain utility data from other participants or to let the current selector(s) rest. Differing transitions between the two exercise types constitute differing embodiments of the claimed invention.

Figure 16A:
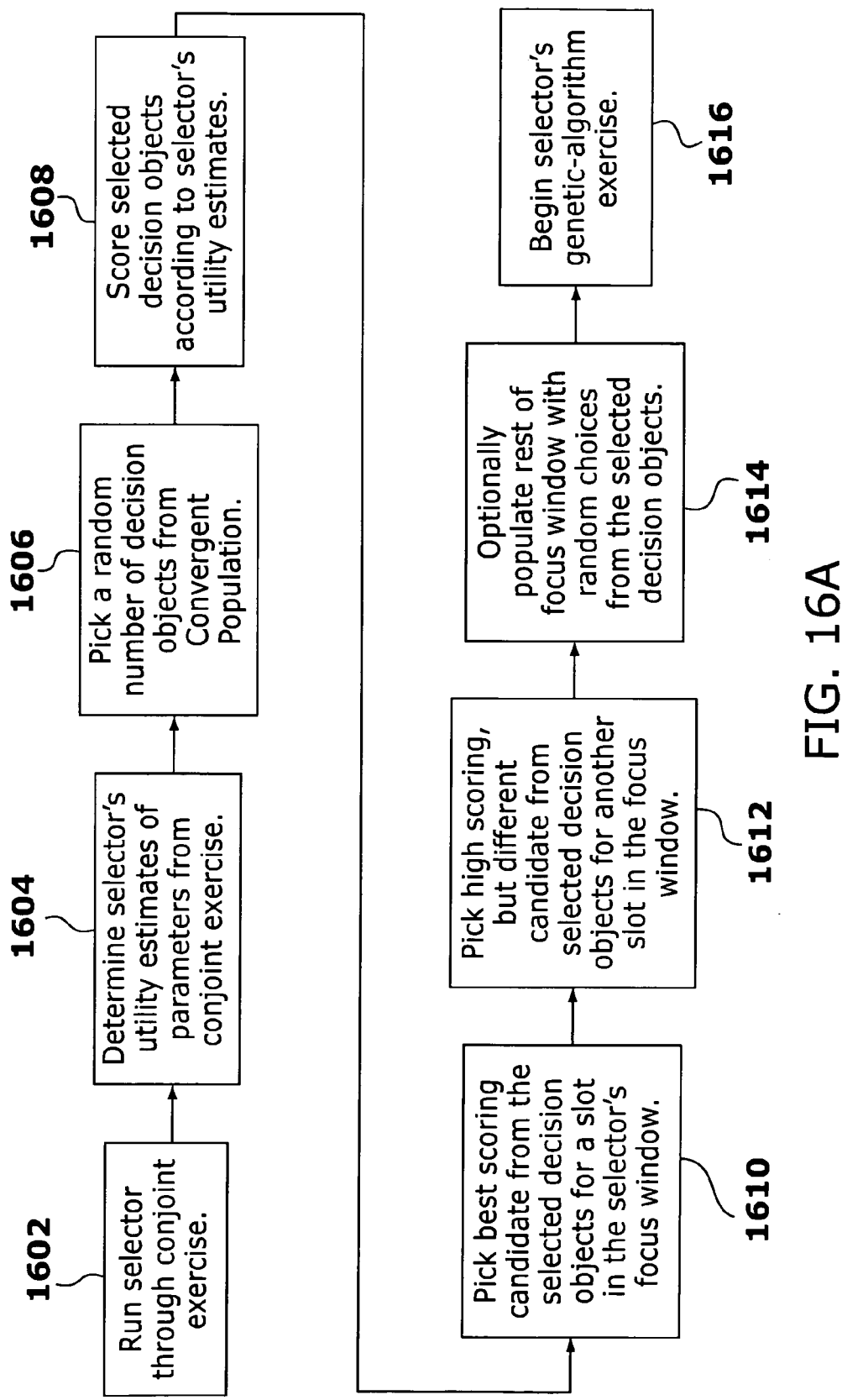
FIGS. 16A and B, 18A and B, 19, and 20 are diagrams depicting methods for transitioning between a non-convergent exercise and a convergent exercise in accordance with various embodiments of the invention.

FIG. 16A depicts one method for transitioning between a non-convergent exercise and a convergent exercise in accordance with one embodiment of the claimed invention. The first exercise of the overall experiment in this embodiment is a non-convergent exercise. In one version, the non-convergent exercise is a conjoint exercise (step 1602). In another version, the non-convergent exercise is an adaptive conjoint exercise. In still other embodiments, the non-convergent exercise is a conjoint exercise in which the obtained data is analyzed using a Hierarchical Bayes conjoint model. In all three versions, and others, the non-convergent exercise is preferably presented over an electronic network. The conjoint exercise selector chooses from among the selections presented, and the data indicating the selector's responses is captured. The exercise continues this way, i.e., repeated presentation of choices and the selector making decisions, until a switching criterion is met. In some embodiments the switching criterion is the presentation to the selector of a certain number of screens of choices. In other embodiments the switching condition is reaching a predetermined time limit. In yet another embodiment, the switching criterion is reaching certain desirable mathematical properties for the utility estimates (e.g., expected confidence level of said estimates.)

Once the switching criterion is met a regression model is used to calculate the selector's preferences for certain attributes (step 1604). A random number of decision objects are selected (step 1606) from the population of combinations that are used in the convergent exercise. Depending on the case, this population will represent a varying proportion of the entire universe of possible combinations. Also, depending on the state of the convergent exercise, the population will be in different conditions of randomness (early on in the exercise) or convergence towards preferred designs (later on during the exercise.) Regardless of what constitutes the population, the invention then scores the selection of decision objects according to the utility estimates (step 1608) provided by the regression model (from step 1604). The claimed invention then picks the decision object that the respondent's choices indicate would be the "best" choice (step 1610), and puts that decision object into a first slot of the focus window. The claimed invention then preferably chooses another decision object (step 1612) that has a desirable combination of attributes according to the selector's utilities but is different, i.e., is genetically distant, from the first decision object. Once a second decision object is chosen (step 1612), it is placed in a second focus window slot. In some embodiments, the remaining window slots are filled with random decision objects (step 1614). In other embodiments they are filled with non-random, but less desirable decision objects from the population. It should be noted that references to "first window slot," "second window slot," and "remaining window slots" do not connote any order or placement on the screen or within the focus window. Such references merely indicate that a position out of a limited number of possible positions has been filled. Once the focus window has been populated, a genetic algorithm exercise, or session, may begin (step 1616).

The second exercise in this embodiment, however, is not limited to a genetic algorithm process. In this embodiment, and others, it may be any convergent process.

Figure 16B:
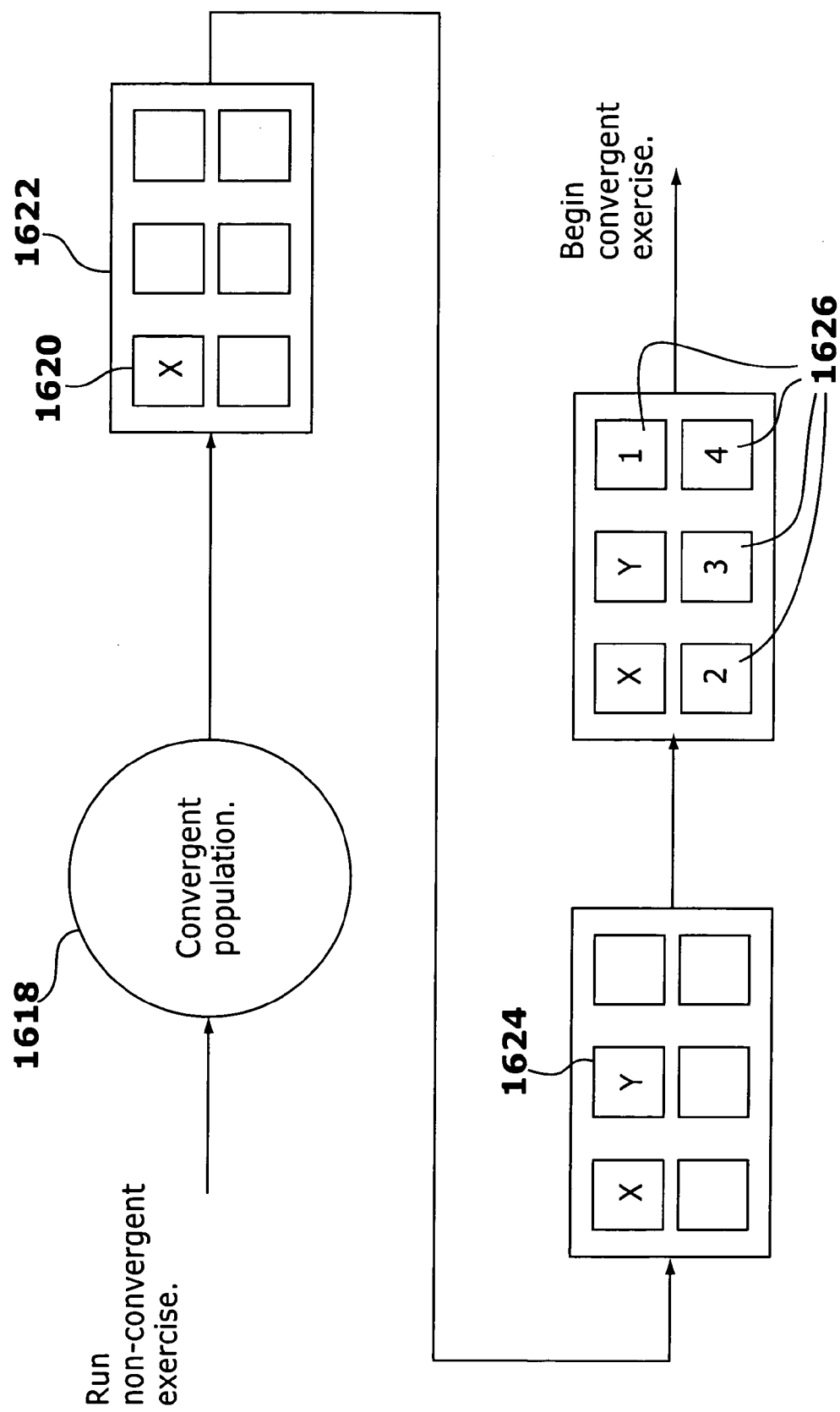

FIG. 16B depicts the method described in reference to FIG. 16A, but from the perspective of the convergent population and a voting window. From the convergent population 1618, a decision object X is picked for a slot 1620 in the focus window 1622 in accordance with the decision process described above. A second, different and distant decision object Y, is chosen for a second slot 1624 in the focus window 1622. The remaining slots 1626 within the focus window 1622 are then preferably populated by random decision objects from the convergent population 1618 (labeled 1, 2, 3, and 4 because unlike X and Y, they are not selected using information from the non-convergent exercise). Once the user's convergent experiment session has begun, the user is presented with the focus window containing the decision objects just selected from the population of decision objects. Again, the presentation may be over an electronic network, or may be through another means such as a survey or questionnaire. The selector's decisions and decision object preferences are captured and the evolutionary operators generate a new set of choices for the selector to choose from. An example of this process is described above and the exercise continues until a stopping criterion is met. Thereby, in this embodiment, the non-convergent exercise advantageously sets up decision objects of interest for the convergent exercise to begin focusing the selector's choices on.

Figure 17A:
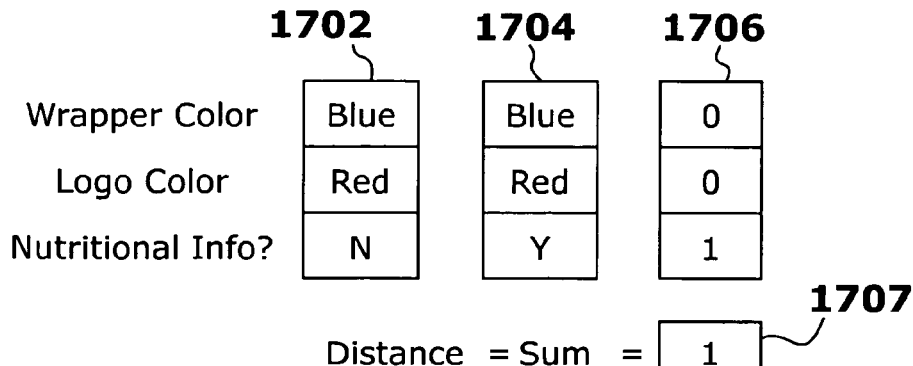
FIGS. 17A through 17C illustrate the concept of genetic distance in accordance with an embodiment of the invention.

One method of comparing decision objects is by genetic distance. Genetic distance is a measure of how far apart two decision objects are when they have different values for the same gene (as illustrated in FIG. 17A). In one embodiment, genes that express the same allele of a particular gene have a distance of 0 and genes that express different alleles of the same gene have a distance of 1. Continuing the candy bar wrapper example, if a first candy bar wrapper 1702 has a blue wrapper color with a red logo and no nutritional information on the side and a second candy bar 1704 has the same attributes except that it does display nutritional information on the side, then the distance between the two wrappers is 1 1707. This is calculated by looking at the first bar's wrapper color and comparing it to the second wrapper's color. They are the same, so the difference is 0 1706. Next, the two logo colors are compared. The distance here is also 0 because the two wrappers share the same logo color. The nutritional information, however, is different and increases the genetic difference 1706 by 1, bringing the total genetic distance to 1 as indicated in the summation 1707.

Figure 17B:
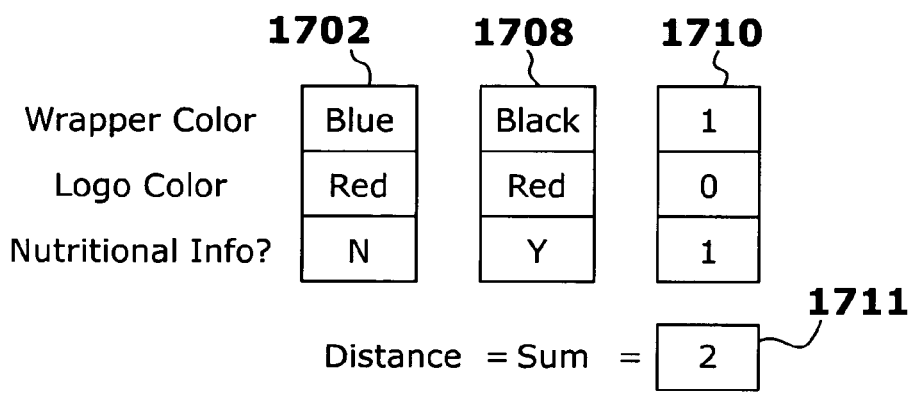

Referring to FIG. 17B, and using the first wrapper 1702 again, compare against a new wrapper 1708. The distance 1710 is again calculated between the two and the total distance is 2 as indicated in the summation 1711. The second wrapper 1708, though the same as the first 1702 in logo color (distance+0), is different in both wrapper color (distance+1)

and nutritional information (distance+1). This is a straightforward calculation based on whether alleles for each gene are the same or different.

Figure 17C:
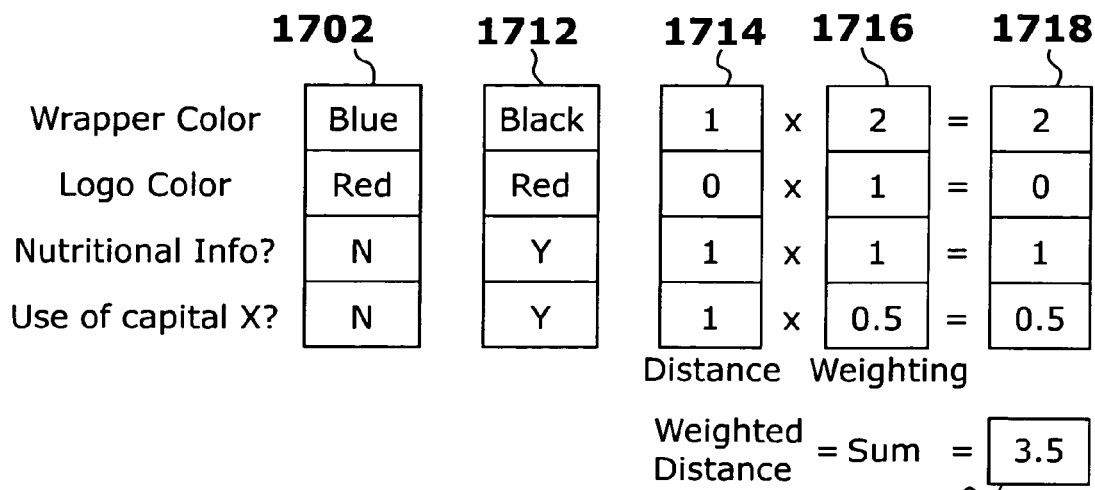

Refer now to FIG. 17C. In some embodiments, the distance calculation may additionally take weighting into account where a particular attribute may have an increased or decreased effect on the total distance or dissimilarity between decision objects; e.g., the logo color may be twice as important to a selector as the nutritional information. In that scenario, a difference in the logo increases the distance twice as much as a difference in the expression of nutritional information. In FIG. 17C, the first wrapper 1702 is used again but an additional attribute, "use of capital X," is shown. The first wrapper 1702 is compared with a new wrapper 1712. The new wrapper 1712 is has a distance 1714 of 3 utilizing the straightforward distance determination method described above. In this embodiment however, weighting 1716 is applied to the distance 1714 resulting in a different total distance, or a weighted distance 1718. In this scenario, the wrapper color is twice as important as normal while the use of the capital letter X in the wrapper language, e.g., "eXtreme" instead of "extreme," only matters half as much. The weighted distance between the two wrappers is therefore 3.5 (1719) making the two genetically further apart than if a straightforward distancing approach were used. The weighting factors to be used in the distance calculations are typically obtained from the conjoint analysis (either based on the range of utilities for the different values of each attribute, or their standard deviation.) Alternatively, they could be based on observing consumer behavior in the marketplace, direct questioning of representative consumers, or through some other type or preference assessment exercise. Additionally, in some embodiments, attribute values may be represented by cardinal numbers as opposed to the nominal ones shown in FIGS. 17A-C. For example, the color "medium blue" may have an cardinal value of 5 assigned to it, whereas light blue may be 3. In such a case, the distance calculation takes this cardinality into account; in the above example, e.g., the distance between the colors would equal 2 (assuming a weighting factor of unity is used.) In another embodiment, the dissimilarity or distance between two design candidates might involve raising the individual distance components to the $n^{th}$ power before summing them, as well as taking the $m^{th}$ root of the sum. As discussed previously, calculating a distance using any of the above approaches is straightforward (and familiar to those having ordinary skill in the art), and it is useful for comparing decision objects and their attributes during the transition from one exercise to another.

Figure 18A:
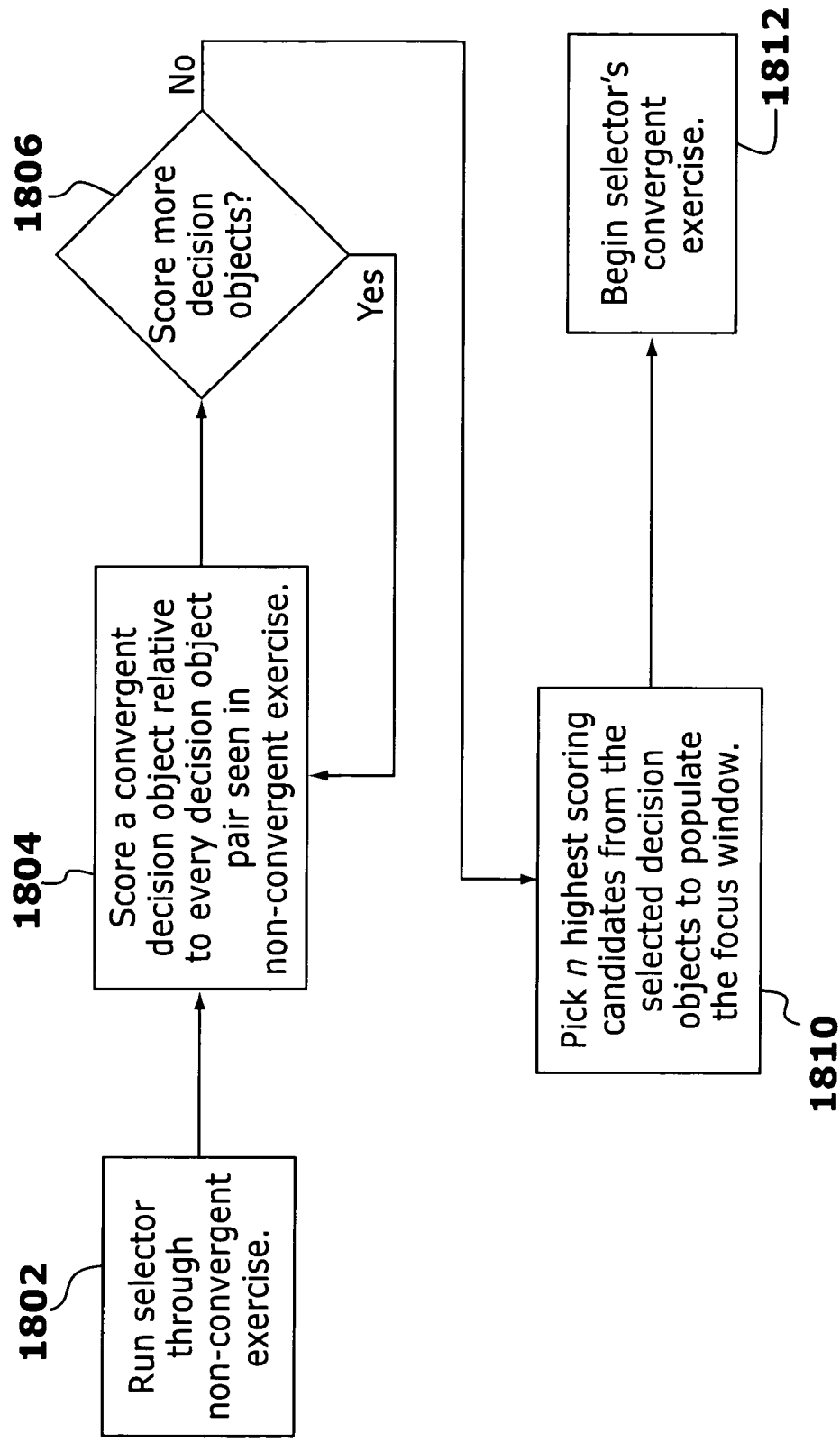

FIG. 18A depicts another method for transitioning between a non-convergent exercise and a convergent exercise in accordance with one embodiment of the claimed invention. After the non-convergent exercise has been run (step 1802) (as described above in reference to FIG. 16A), an embodiment of the invention scores (step 1804) decision objects that are candidates for the initial focus window and compares them (also step 1804) to all pairings of decision objects seen in the non-convergent exercise. In other words, the candidate is compared to a pair of decision objects among which the selector already indicated a preference. As described before, possible candidates for the focus window could be the entire population of decision objects in the convergent exercise, or a subset thereof. The embodiment then runs the scoring algorithm for each decision object candidate in the convergent population, using pairs of decision objects seen in the non-convergent exercise, iterating between selecting a candidate (step 1806), and scoring it (step 1804) until it has scored the candidates against all (or a predetermined number of) pairings. This embodiment therefore compares the decision object population in a fashion that would emulate what the selector may have chosen had she been presented with the population during the non-convergent exercise. In effect, this is creating a voter proxy for the selector, basing voting decisions at least in part on decisions the selector made during the non-convergent exercise. It should be noted that the claimed invention is not choosing decision objects for the selector. Instead, it is predicting what the selector may have chosen in the non-convergent exercise had the selector instead been presented with decision objects from the convergent population.

Figure 18B:
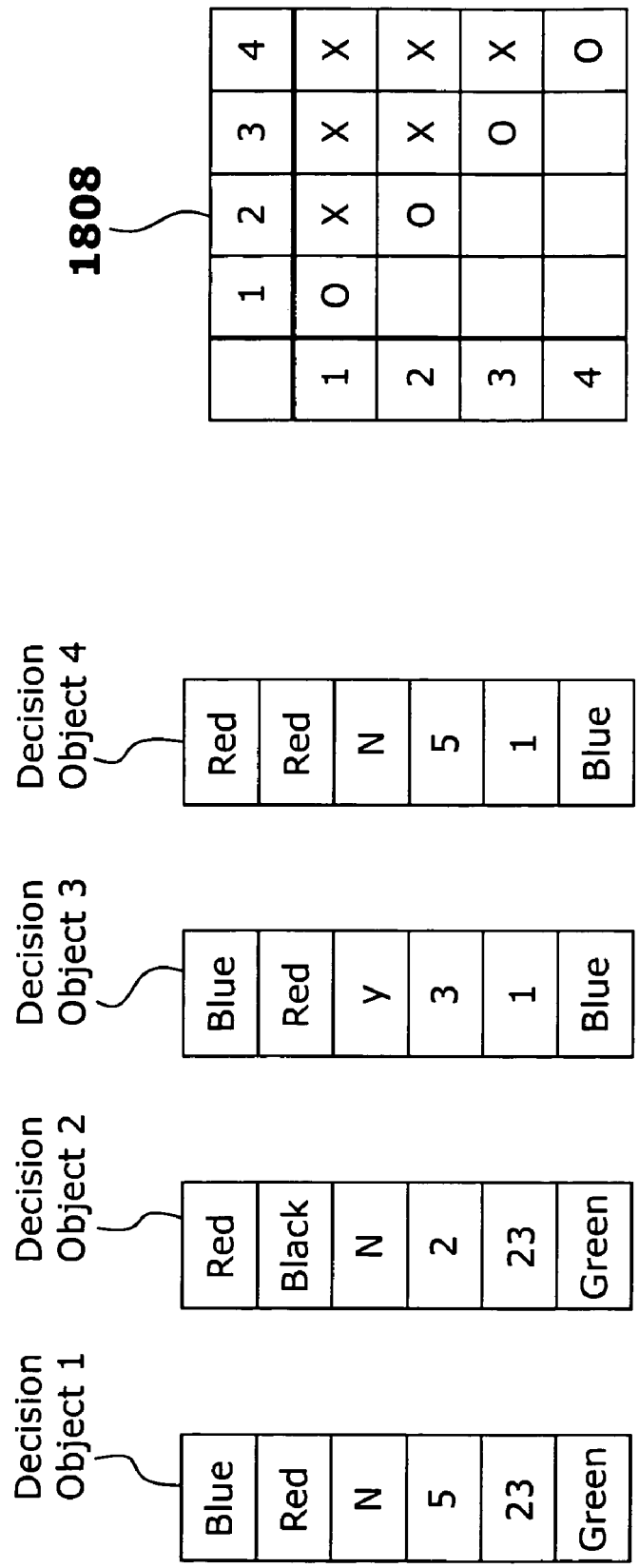

To illustrate the candidate-pairing comparison/voter proxy concept, refer to FIG. 18B. In this embodiment, if the selector viewed decision objects 1, 2, 3, and 4 in a particular choice window during the non-convergent exercise, this embodiment would consider using pairings of 1-2, 1-3, 1-4, 2-3, 2-4, and 3-4 (omitting pairing a decision object with itself and duplicate pairings) to score each candidate available in the convergent population for a focus window slot. An exemplary table 1808 of the pairings shows Xs for available pairings, Os where self-pairing is avoided, and blank entries where duplicate pairings are ignored. The scoring comparison between the candidate and a given previously viewed pair $(p_i, p_j)$ in this embodiment is achieved by computing:

$$\text{score}_c^{(p_i, p_j)} = (d(p_i, c) - d(p_j, c)) * (\text{NRating}(p_j) - \text{NRating}(p_i))$$

where $p_i$ is the first of the pair, $p_j$ is the second, c is the candidate for a focus window slot, $d(x,y)$ is the genetic distance between decision objects x and y, and $\text{NRating}(x)$ is a function of the preference rating received by decision object x. This scoring function defines the distance between the candidate and first and second decision objects of the pair from the non-convergent exercise multiplied by the negative difference in the scores they received during the non-convergent exercise. The total score for a decision object c is obtained by summing all score components obtained from using all available pairs, as follows:

$$\text{score}_c = \sum_{\text{all available pairs } (p_i, p_j)} ((d(p_i, c) - d(p_j, c)) * (\text{NRating}(p_j) - \text{NRating}(p_i)))$$

In effect this scoring algorithm calculates, based on the selector's previous rating of each of the pair, how the selector would rate, comparatively, the current decision object candidate. Referring back to FIG. 18A, this embodiment then determines, after computing the scores of all candidates using the decision object-pair-comparison algorithm described above, the highest scoring n decision objects (step 1810), where n is the number of slots in the focus window that is presented to the selector. This method is known as a "top N picks" method. In other embodiments the highest scoring m decision objects are chosen, where m<n and m is chosen by the experiment designer at a point before the transition between exercises. In that case, the remaining focus window slots would be populated by random selection from the evolutionary exercise population, or quasi-randomly to ensure some level of genetic difference between those decision objects selected randomly for the remaining slots (assuming more than one will be selected.)

Concerning the function NRating(x), it could be configured in any number of ways so as to convert the ratings provided by respondents into usable numerical values. In one embodiment, the respondent may be asked to select the best and second best decision objects in a given choice set screen of 4 decision objects; these two ratings could then be converted into values of 3 and 2 respectively. The decision objects that were not rated on the page would be assigned a value of 0, or −1. In another embodiment, the respondent would be asked to choose the best and worst decision objects in a choice set. In this case, the function would assign a value or 2 or 3 to the best decision object, a value of −2 or −3 to the worst decision object, and a value of 0 or −1 to those decision objects not rated. In yet another embodiment, the respondent may be provided with a 5-point or 7-point scale under each decision object in the choice set, and asked to select a numerical rating directly for all or a subset of the decision objects on the page. In that case, the function may use those numerical values without modification, or it might apply straightforward numerical transformations to them, including normalizing them to eliminate the effect of some respondents tending to choose one end of the scale versus the other. Many other variations on these embodiments would be easily developed and implemented by someone with ordinary skill in the art.

After the decision objects for the focus window are chosen, the focus window is shown to the selector and the convergent exercise proceeds (step 1812) as described above in reference to FIG. 16A.

Versions of the above embodiment apply different methods to select the decision objects presented. In one version, the invention applies a straight scoring mechanism based on conjoint analysis, wherein the decision object candidates in the evolutionary population are scored by summing their part-worths, as obtained by estimating a conjoint model using the data collected from the non-convergent exercise. The candidates with the highest total utility according to the sum of their part-worths are presented to the selector. In another version, the decision objects are chosen based on a clustering algorithm or latent-class regression. A latent-class regression model, in this scenario, would estimate different sets of part-worths, each corresponding to a different emergent grouping of respondents based on their similarity of preferences. In such a case, the latent-class conjoint analysis would be performed on data collected from the plurality of respondents who have gone through the exercise up to that point in time. The number of classes identified by the latent-class regression is variable, and depends on how similar or heterogeneous the group of respondents are. The different sets of part-worths (typically between 2 and 4), would be used to identify different candidates in the convergent decision objects population which score highly according to the different sets of part-worths. For example, if the latent-class regression identifies three classes and three corresponding sets of part-worths, each set of part-worths would be used to score the candidates, and the highest scoring one for each latent class would be identified and used to (partially) populate the initial focus window in the convergent exercise.

In yet another version, a threshold function is used to score candidates for populating the initial focus window of the convergent exercise portion of the experiment. Those candidates that score above the threshold are placed in a set, and random selection without replacement are made from that set to populate the initial focus window.

In other embodiments, the system may be set up so that more than the initial focus window is populated. One embodiment would also populate the second focus windows in the evolutionary exercise in the manner outlined above. And in yet another embodiment, subsequent focus windows may have a few slots reserved so they can be populated in a similar fashion.

Figure 19:
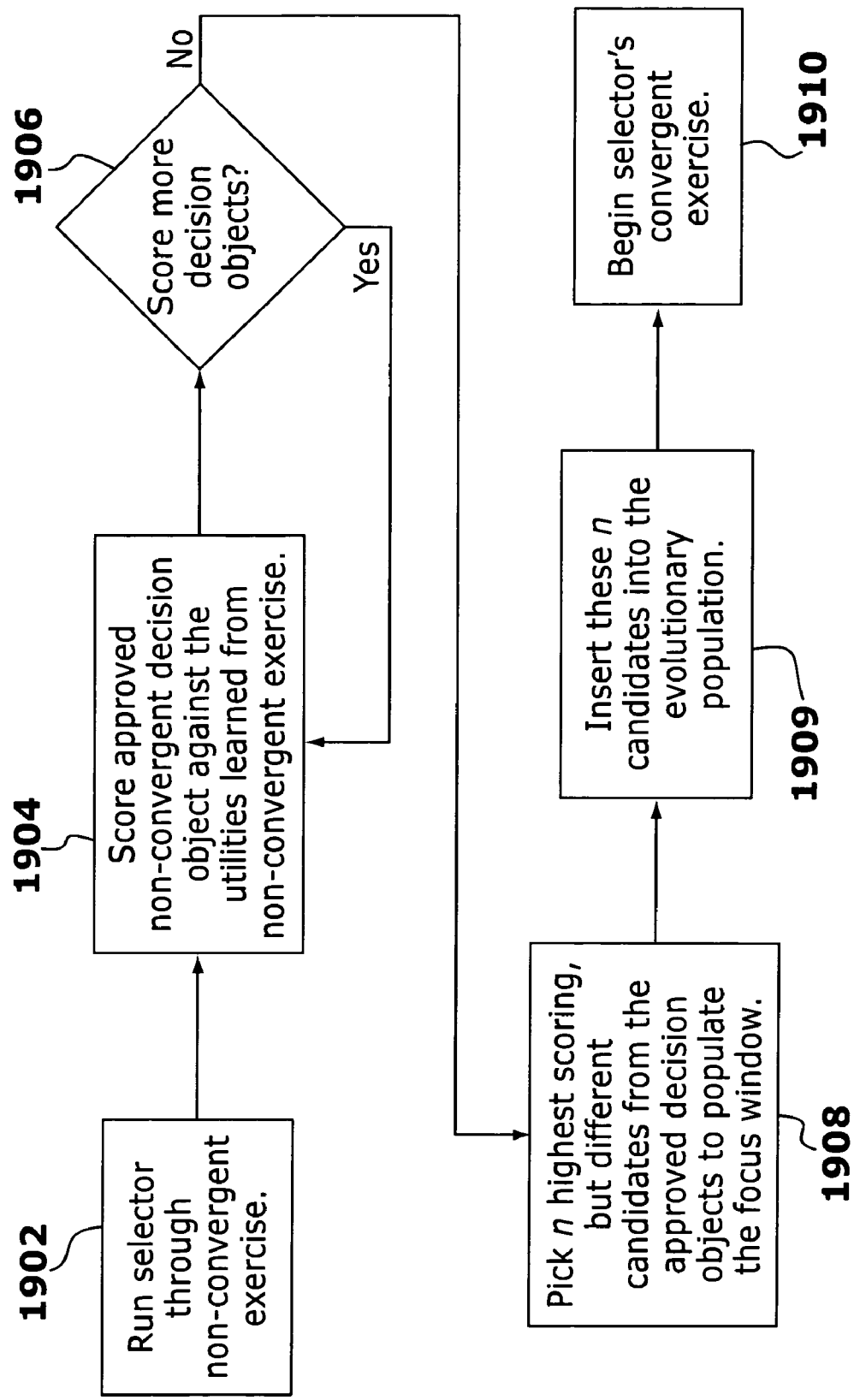

Another embodiment of the transition between a non-convergent exercise and a convergent exercise in accordance with the claimed invention is depicted in FIG. 19. After the non-convergent exercise has been run, an embodiment of the invention iterates through the decision objects that the selector viewed and approved of in the non-convergent exercise. A selector may have indicated a preference for a decision object by, but not limited to, ranking the decision object higher on an integer-based scale than other decision objects, e.g., a 9 on a scale of 1 to 10, by giving a decision object a "thumbs up" vote, or by indicating "this is my favorite on the screen" through selecting a radio button on a web page.

As illustrated in FIG. 19, a conjoint analysis regression model is run after the experiment (step 1902) to generate utilities based on all the decisions the selector made. Scores are applied to previously viewed decision objects based on information from the analysis of all the attributes of the decision objects viewed by the selector.

The invention then scores the decision objects seen by the respondent based on these utilities or part-worths (step 1906). Those utilities are applied (steps 1904-1906) to decision objects the selector saw in the non-convergent exercise until the method runs out of decision objects that the selector has viewed. Once the utilities are applied to all the decision objects (steps 1904 and 1906), the top n decision objects are picked (step 1908), where n is the number of slots in the focus window. These n decision objects are used to populate the slots in the initial focus of the evolutionary exercise, and they are simultaneously inserted into the population of the evolutionary exercise (step 1909). In one embodiment, this requires the removal from said population of n poorly performing decision objects to maintain the pre-determined population size. In a different embodiment of the invention, the population of decision objects used in the evolutionary exercise is allowed to grow in size to accommodate these additions.

It should be noted that in either embodiment, a criterion is applied when choosing the top n decision objects to increase the difference between them. In some embodiments this criterion could be based on some genetic distance threshold as described above. In other embodiments it is a clustering algorithm that uses some the genetic distance as a similarity metric to sort the candidates into groups and chooses representative decision objects from each group.

It should also be noted that in this embodiment, m decision objects may be chosen instead, where m<n and the remaining slots are filled randomly (from either population), or quasi-randomly, taking into account similarity, as described above or by another selection method. This "top N different picks" embodiment has the effect of presenting the selector with a diverse set of decision objects that all have been deemed acceptable during the running of the non-convergent exercise. Once the population is chosen via the selection method (step 1908), the convergent exercise is run (step 1910) as described above.

Figure 20:
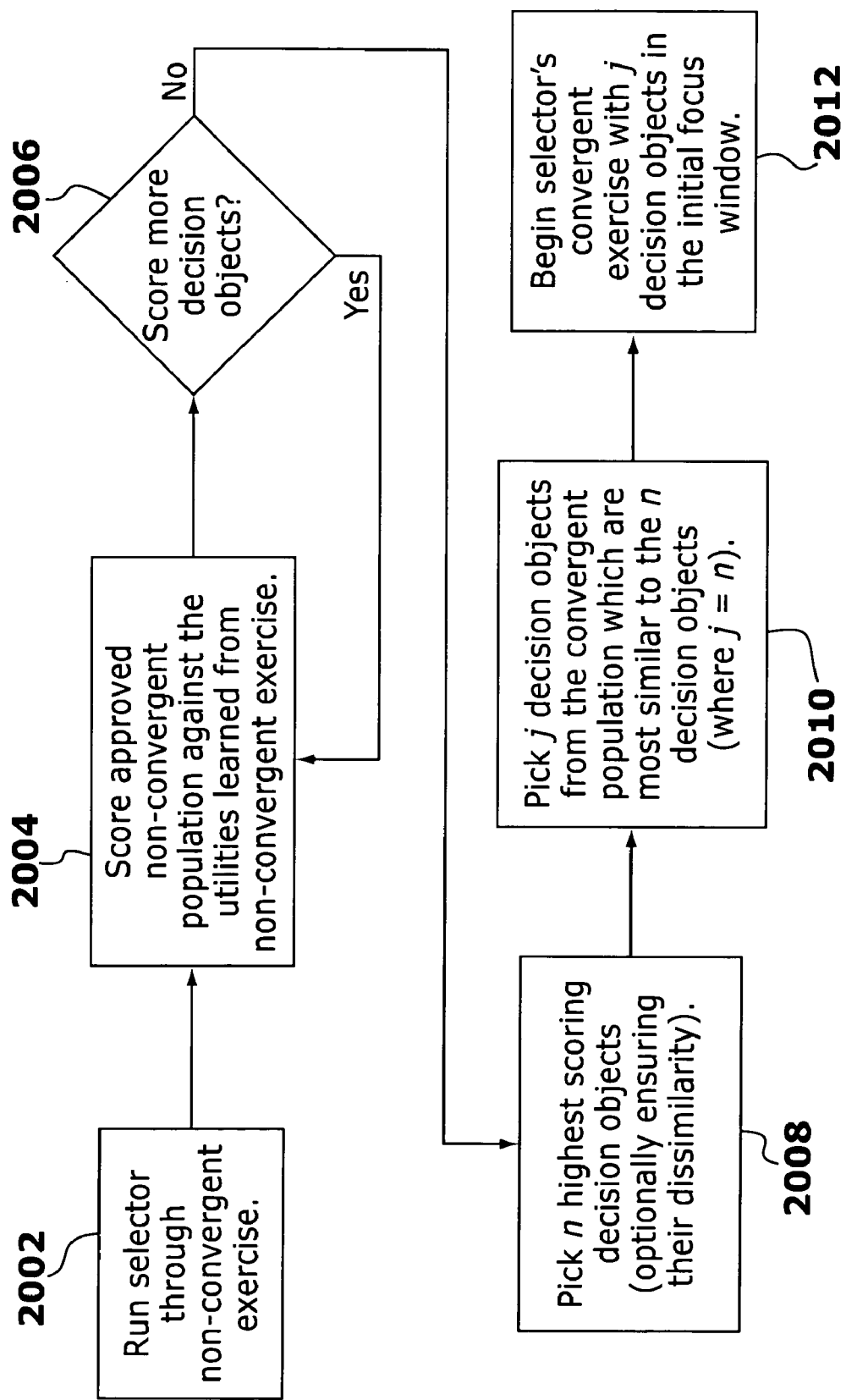

The embodiment of FIG. 20 is similar to that of FIG. 19 in that the method begins, after the non-convergent exercise is run (step 2002), by scoring the decision objects that have been seen (steps 2004-2006), iterating through the population already viewed by the selector (steps 2004-2006), and picking the top n decision objects (step 2008). In this embodiment however, decision objects from the non-convergent population are not used, but rather the invention selects j decision objects from the convergent population (step 2010) similar to the top-scoring ones from the non-convergent population (where j=n).

Similarity is measured by using the genetic distance approach described above with ties between candidates with equal distance scores being broken randomly. It should be noted that, as described above, a similarity test may be applied to the n top-scoring decision objects being chosen from the non-convergent exercise, in order to avoid duplicates or decision objects with a high degree of similarity.

Additionally, though j and n are equal in the above embodiment, they need not be so, in that the similarity matching need not be one-to-one. An experiment designer may search for two convergent population decision objects that are similar to the highest scoring non-convergent decision object (in which case j>n, specifically in this example, j=n+1.) Alternatively, the designer may choose to set up the experiment such that j<n; a larger number of top scoring decision objects are identified from the non-convergent exercise than the number of decision objects needed to populate the focus window in the convergent one; this is useful when the convergent population has evolved and converged to a point of low diversity, making it unlikely to find close enough matches in said convergent population to any arbitrary top-scoring decision objects from the non-convergent exercise. This latter embodiment is typically useful when a similarity threshold must be met before a convergent decision object is considered close enough to one of the top-ranking non-convergent decision objects. In yet another embodiment, the experiment designer may choose to switch between these schemes, depending on the degree of convergence (and therefore lack of similarity) in the convergent population. This method, and its variations, is known as a "top N look-a-likes" method.

As in other embodiments, n is the number of slots in the focus window and the experiment designer may be interested in populating only m slots of the focus window this way, where m<n. In that scenario, the relationships between j and n described in the previous paragraph would now apply between j and m. Once the look-alike decision objects are selected (step 2010) for the initial focus window, the convergent exercise may begin (step 2012) as described above.

As with the other embodiments described above, this embodiment provides a number of advantages. First, it allows collection of respondent preference observations, during the non-convergent exercise, in a manner that is optimized for reducing bias and noise in the part-worths estimates in the conjoint analysis. This is achieved by presenting decision objects during the non-convergent exercise either randomly or, preferably, following a pattern based on an optimal Design of Experiments scheme (known as DOE or DOX.) Such schemes make the most efficient use, mathematically speaking, of the limited number of choice sets and observations that the respondent will be taken through. A second advantage of the above embodiments is that they make use of the information collected during the non-convergent exercise to make the respondent's session during the convergent exercise more efficient and more directed initially, by focusing the initial activity of the respondent on an area of the convergent decision objects population that is estimated to be preferred by said respondent, based on his or her feedback during the non-convergent exercise. The third advantage of these embodiments is that they provide a sense of continuity for the respondent as he or she transitions form the non-convergent to the convergent exercise, by presenting him or her with an initial set of decision objects at the start of the latter which are related to the decision objects he or she saw and liked during the former, non-convergent one. In particular, these embodiments preferably copy the estimated preferred decision objects from the first exercise directly into the convergent population and into the selector's initial focus window.

Figure 21:
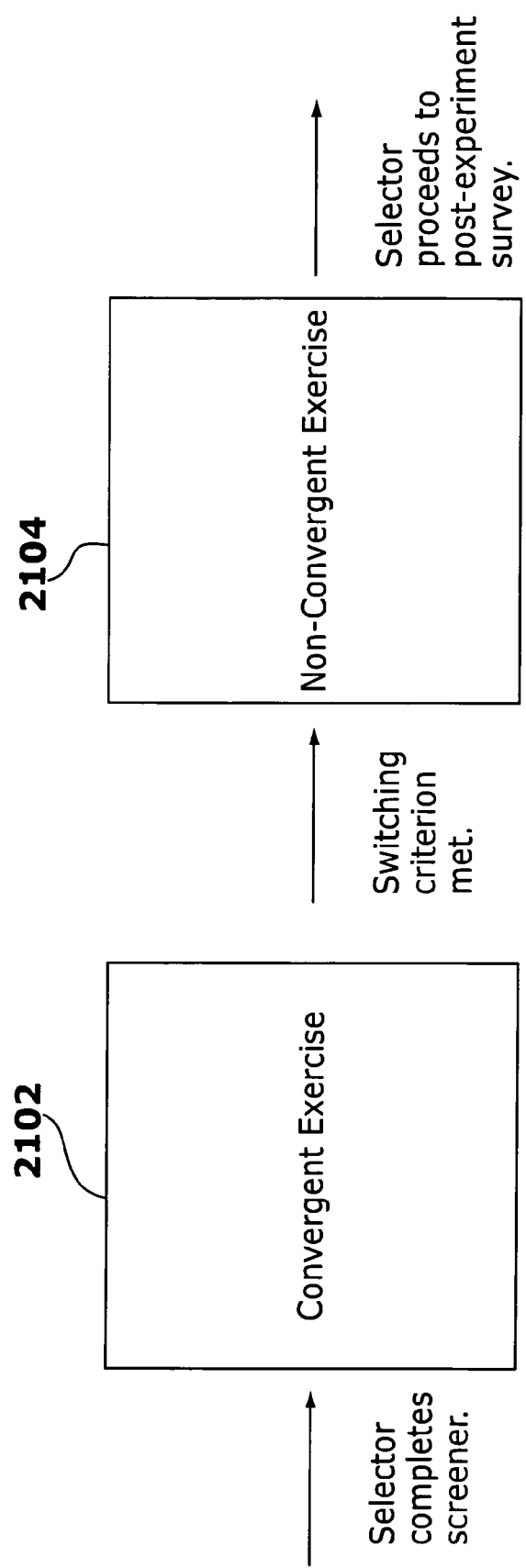
FIG. 21 is a diagram generally depicting a method for performing a non-convergent experiment after a convergent experiment in accordance with an embodiment of the invention.

FIG. 21 is a diagram generally depicting a method for performing a non-convergent experiment 2102 after a convergent experiment 2104 in accordance with an embodiment of the invention. This is generally the reverse of the methods described above. In this scenario, an embodiment of the invention begins by running a convergent exercise 2102. The convergent exercise may be a genetic algorithm-based exercise such as the one described above or it may be another evolutionary-oriented, convergent approach. The embodiment then utilizes information collected in the convergent exercise, such as the preferred combinations of attributes, preferred decision objects, or preferred partial decision objects, to set up and conduct a non-convergent exercise (2104) based on that information. This is advantageous for different reasons under different use scenarios described below.

Figure 22A:
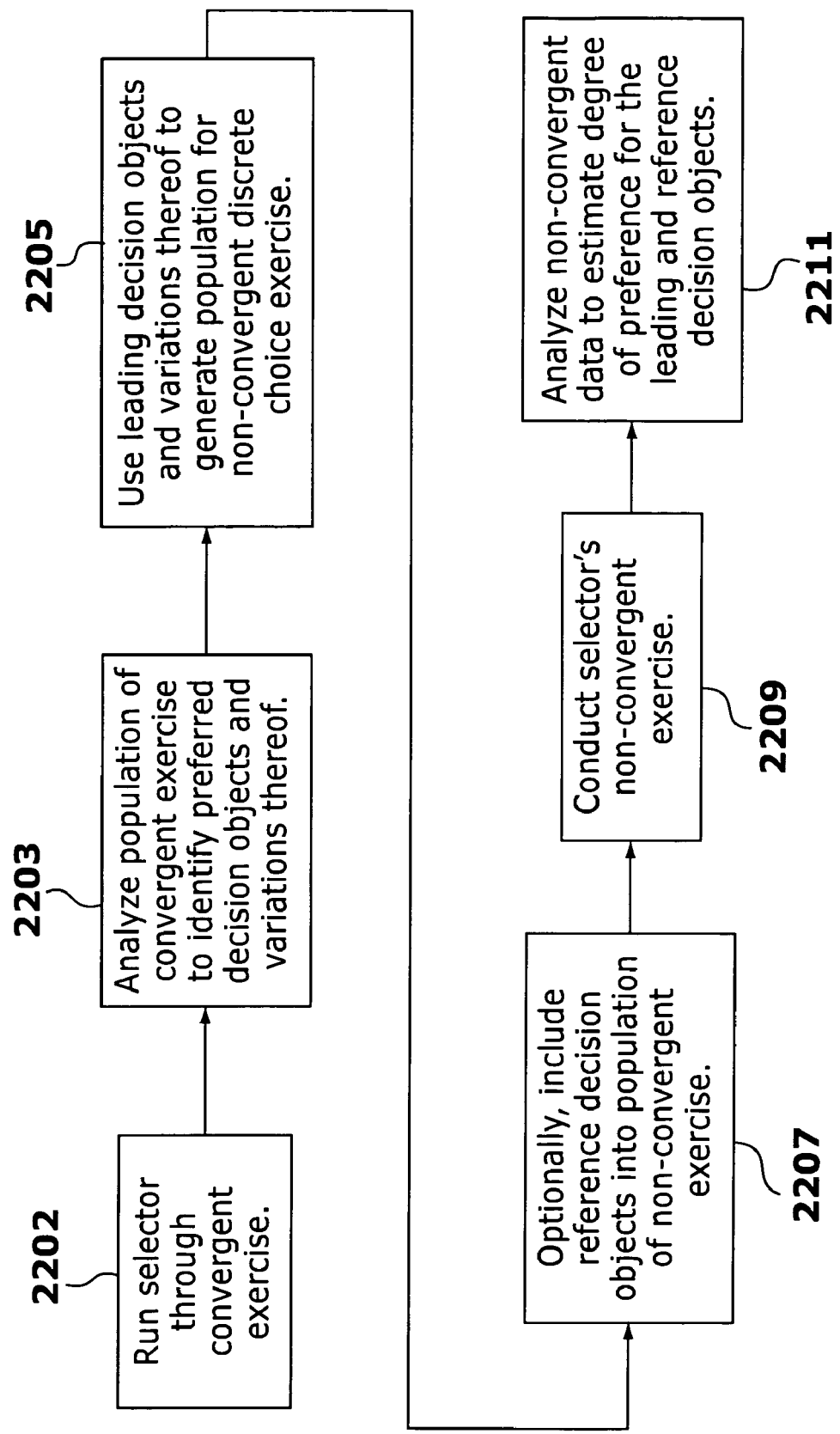
FIG. 22A is a diagram depicting a method for transitioning between a convergent exercise and a non-convergent exercise in accordance with various embodiments of the invention.

In a preferred embodiment depicted in FIG. 22A, a convergent exercise is conducted (step 2202), and the convergent population is analyzed in order to identify leading decision objects (step 2203). As described earlier, this analysis involves running a clustering algorithm on the convergent exercise population and identifying representatives of the different areas of preference reflected in the state of that population. Alternatively, other analytical methods may be employed. It is also possible to identify variations on these preferred decision objects, using analytical techniques known to those with ordinary skill in the art.

The leading decision objects (and variations thereon) would then be used to set up a non-convergent exercise (step 2205), often referred to as a Discrete Choice exercise. This is similar to a conjoint exercise except in that only one attribute is used to represent holistic decision objects, with the different values of that attribute referring to the different variants of decision objects. Optionally, additional "reference" decision objects may be added into the mix (step 2207). These decision objects comprise competing decision objects that are known a priori to the experiment designer but that did not evolve during the convergent exercise, either because they were not preferred, or because some of their attributes were not included in that first exercise. An example of such a reference might be a competitor's in-market designs. Once these decision objects are loaded into the non-convergent exercise (i.e., are used to set up the population of decision objects for that exercise), the non-convergent exercise is run (step 2209) and the data thus collected is analyzed using a regression model similar to a conjoint model (step 2211). The result of this analysis provides insight into how the different decision objects would fare against each other in the marketplace, and the share of preference that each would garner. The unbiased sampling used in the non-convergent exercise is optimal for obtaining unbiased estimates for the "share of preference" or "strength of preference" among these decision objects.

Figure 22B:
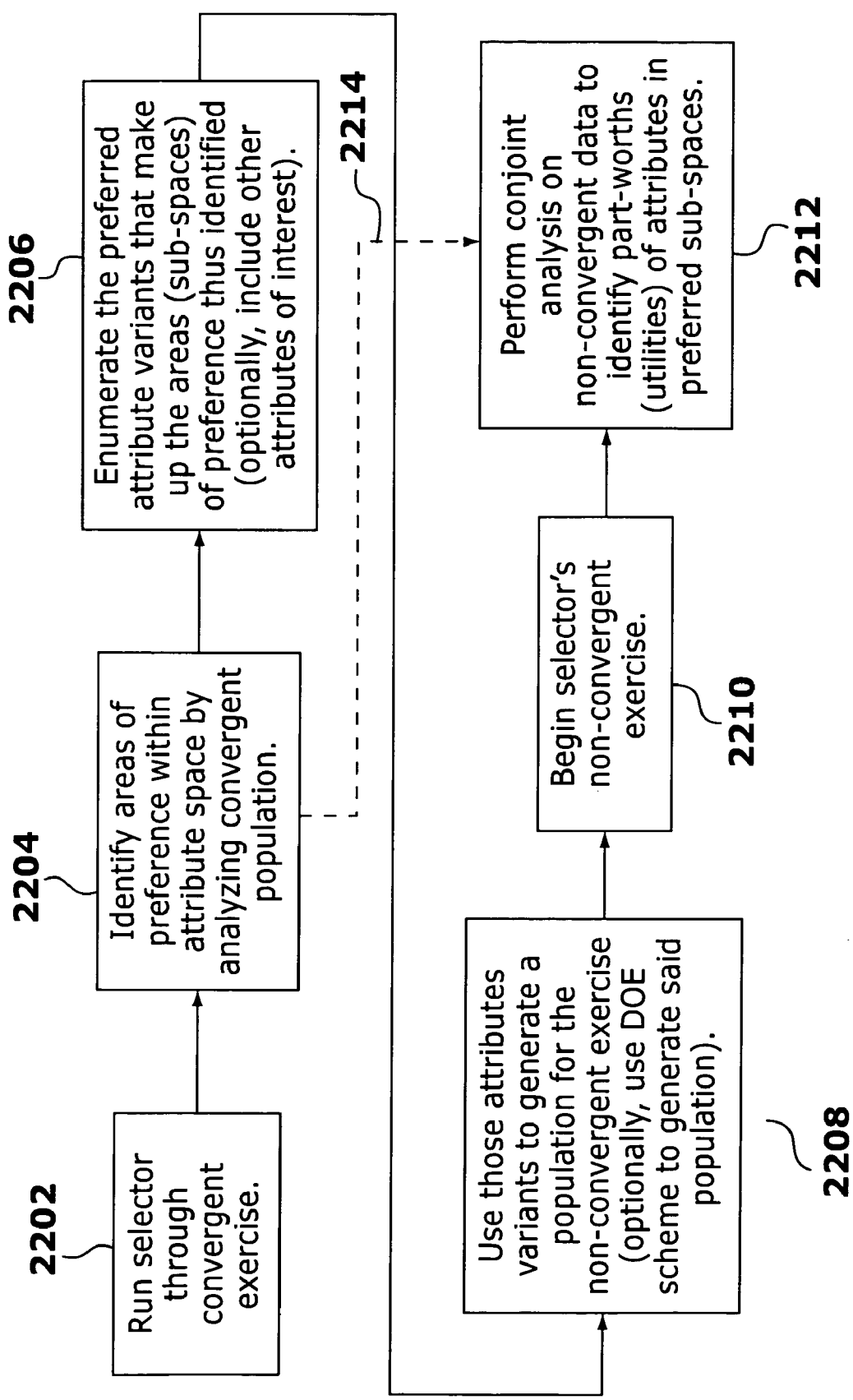
FIG. 22B is a diagram depicting another method for transitioning between a convergent exercise and a non-convergent exercise in accordance with various embodiments of the invention.

Another scenario where it is useful to conduct a non-convergent exercise following a convergent one is when the experiment designer is using the former to obtain more accurate attribute utility measures within a preferred subset of a very large attribute space. In this situation, the convergent exercise is first used to explore the large design space and to identify sub-areas of preference within it; the attributes that represent those subsets of the larger attribute space are loaded into the subsequent non-evolved exercise, which is used, in turn, to evenly sample decision objects within those subspaces. This technique obtains utility estimates with less statistical noise. One embodiment of this scenario is depicted in FIG. 22B. The experiment begins by running a convergent exercise (step 2202). The convergent exercise will generally converge on one or a limited number of preferred decision objects, by evolving the convergent population as described earlier. This evolution will cause the distribution of alleles for each gene to change over time, with the preferred alleles becoming more numerous and the less preferred sparser. By analyzing the state of the convergent population, those preferred gene alleles (attribute variants) are identified (step 2204.) In one embodiment, this is done by identifying preferred decision objects (and variations thereof) through clustering of the convergent population, followed by an enumeration step in which said preferred decision objects are parsed into their component alleles. In an alternative embodiment, a more straightforward analysis of allele distribution in the convergent population is conducted, and those with an above average frequency (or other threshold frequency) identified (step 2206.) Either way, the attribute variants thus identified are used to set up a non-convergent exercise (step 2208.) This could be a random non-convergent exercise, where the non-convergent population is generated at random (or quasi-randomly to avoid duplicate decision objects) from this pool of attributes, or it could be based on DOE principles as described earlier. Once this is done, the non-convergent exercise begins (step 2210). Subsequently, a conjoint analysis is performed (step 2212) on the non-convergent data to estimate part-worths or utilities for the smaller set of attributes variants in the preferred sub-space identified through the convergent exercise.

In this embodiment, information obtained during the convergent exercise can be used to supplement the conjoint analysis (step 2212) as illustrated by the dashed arrow (2214). Some of the feedback information collected during the non-convergent exercise can then be used to provide additional observations for the regression model. Alternatively, where interaction terms (higher-order terms that model synergies between specific attribute variants) are included in the conjoint regression model, based on observing the presence and importance of such interactions effects during the convergent exercise. This could be done by looking at conditional distributions of alleles in the convergent population, or by identifying the particular combinations of attribute that are present in the preferred decision objects.

This embodiment makes it possible to start with a very large design space (the universe of possible decision objects), one that would be too large to run through a conjoint analysis (including Hierarchical-Bayes models), as it would require too many respondents and too many screens per respondents to be practical. The convergent exercise is used to efficiently and quickly reduce a large design space to a more manageable one, which may then be run through a convergent exercise and a conjoint analysis.

Regardless, having expressed preferences from a convergent exercise allows an experiment designer to determine, through a non-convergent process, what is important about a preference that has been expressed. This is different from the information provided by the methods illustrated in FIGS. 15-20. In those embodiments, the experiment designer was able to glean what is generally important across the attribute space through a non-convergent exercise, and then to estimate the best choice out of the entire design space, based upon a convergent experiment. The approach described in this section allows for broad exploration within the design space to find promising candidates and then focus on those areas to determine the utilities of those subsets of featurization.

Figure 23:
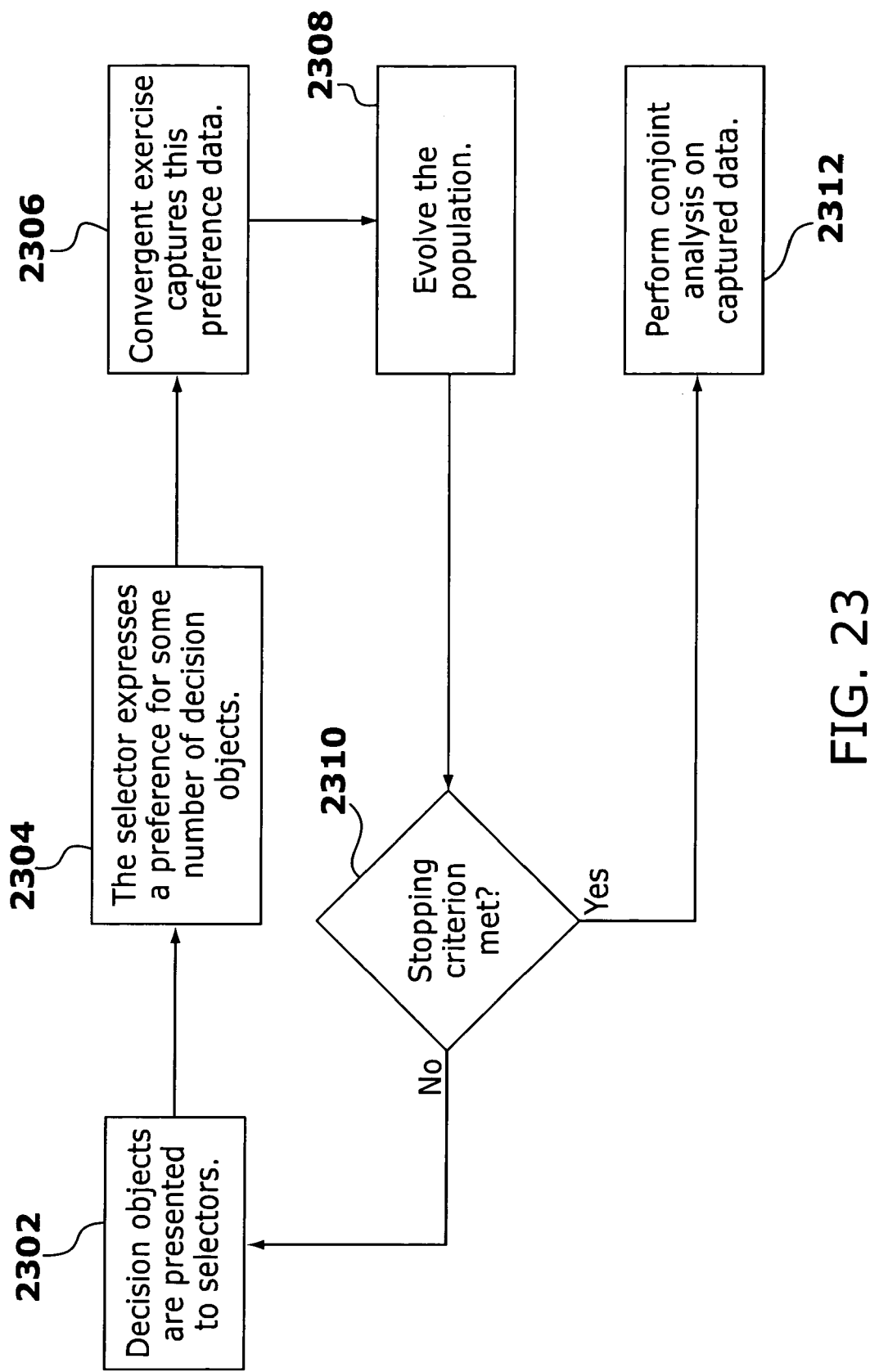
FIG. 23 is a diagram depicting running a convergent experiment and applying a conjoint analysis to the captured data in accordance with an embodiment of the present invention.

FIG. 23 depicts running a convergent experiment and applying a Conjoint Analysis to the captured data in accordance with an embodiment of the claimed invention. The method begins like the convergent algorithms above do: decision objects are presented to selectors (step 2302); the selector expresses a preference for a number of decision objects (step 2304); the convergent exercise captures this preference data (step 2306); evolves the population in response to said captured data (step 2308); and the process is repeated until a stopping criterion is met (step 2310). At the end of the exercise however, a Conjoint Analysis is performed (step 2312) on the preference or choice data captured during the operation of the convergent exercise. The convergent voting trail may not have the desirable sampling properties that an optimally designed non-convergent one would have, from the point of view of balance, orthogonality and other DOE desiderata. However, running a Conjoint Analysis on the captured preference or choice data still enables the experiment designer to gain valuable insight into the respondents' preferences. Since the convergent exercise is designed to converge towards preferred solutions, it is unlikely to spend as much time evolving and selecting decision objects with attribute variants that have proven to be not preferred based on the feedback provided by the early participants. By contrast, the non-convergent exercise will select decision objects with poorly-liked attributes as often as those with well-liked attributes. Thus, the utility estimates for poorly performing attribute variants will be noisier and potentially biased when based on the convergent voting trail as compared to the non-convergent one.

One advantage of running the conjoint analysis on the convergent voting trail however is that the resulting utilities for the highly preferred attributes will be advantageously biased to reflect higher order interaction effects, which are typically left unmodeled in regular conjoint analysis. This makes those utility estimates better suited at identifying the best attribute combinations for preferred decision objects. For these reasons, the experiment designer or the client may request a report with findings based both on analyzing the state of the converged population, as well as the conjoint analysis on the convergent exercise voting trail, giving the client or designer a more balanced view of the experiment run.

Figure 24:
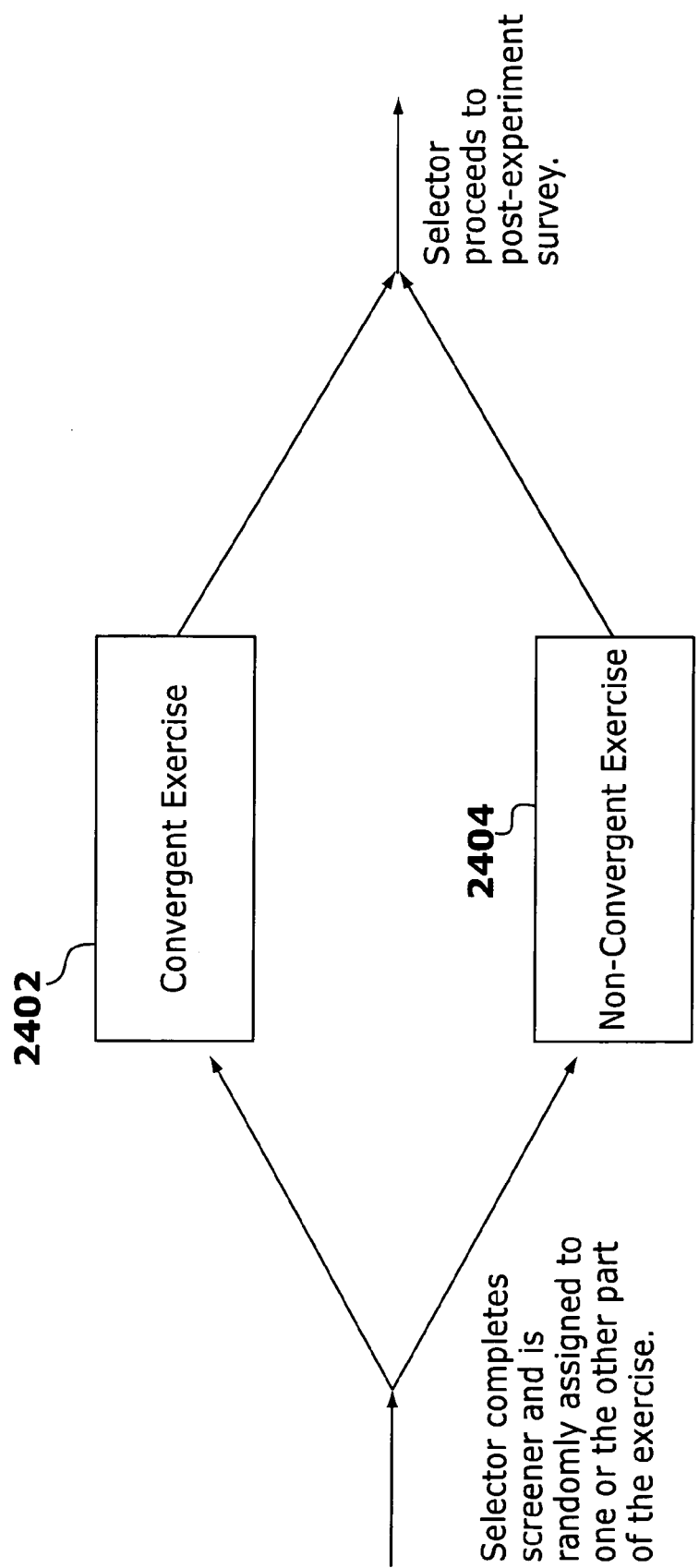
FIG. 24 is a diagram depicting a non-convergent experiment running generally in parallel with a convergent experiment.

FIG. 24 depicts a non-convergent experiment running generally in parallel with a convergent experiment. This embodiment begins by sending selectors, before the experiment begins, to one of two exercise setups. One setup is a convergent exercise 2402 and the other is a non-convergent exercise 2404. In some embodiments, which setup the selector, or respondent, goes to is determined at random.

In other embodiments the number of selectors for the two exercises is kept generally in equilibrium, or is performed deterministically by sending alternate respondents to different exercises. In other embodiments, and depending on the objective of the study, the distribution of respondents across the two exercises may not be even, but could follow any desirable ratio. For example, it may be desirable to send ⅓ of the respondents to the non-convergent exercise, and ⅔ to the convergent one. In that situation as well, respondent selection may be implemented deterministically or stochastically.

Once it is determined which setup the selector will participate in, the exercises are carried out. In some embodiments, the two experiment setups start out with the same or similar initial populations, generated randomly or quasi-randomly from the universe of possible decision objects. In other embodiments, as outlined above, the non-convergent population is generated based on an optimized Design of Experiments scheme, which may also determine the order and combinations in which decision objects are presented during the non-convergent exercise. The non-convergent population remains a constant with different selectors indicating preferences for decision objects presented to them. The convergent setup, though it may have started with the same population, evolves its population, and the decision objects presented to the selectors are products of that evolution.

In embodiments where a selector is not the first selector to view the population in the convergent exercise, the decision objects presented to her are the product of the choices of other selectors that have taken part, or are taking part, in the convergent exercise. In embodiments where a selector is the first to view the convergent population, the selector is presented with random sampling similar to those seen in the non-convergent exercise. Once the exercises are run, the utilities gleaned from the non-convergent population may be used in identifying the preferred decision objects of the convergent population. This allows the experiment designers to determine what was important to the group of respondents and how certain portions of the group effectuated a change in the original population to evolve it to the final, convergent best decision objects.

In a preferred embodiment, the range of utilities within an attribute, or the standard deviation of said within-attribute utilities (often referred to as "Choice Drivers") are used in the process of identifying representatives of the preferred decision objects to which the population of the convergent exercise actually converged. These Choice Drivers provide information on the relative importance to the respondents of the different decision object attributes. In the embodiment in question, they are used as weighting factors in a genetic similarity metric in a K-Medoid or K-Median clustering algorithm for identifying representative decision objects for clusters of preference in the convergent population.

Many alterations and modifications may be made by those having ordinary skill in the art without departing from the spirit and scope of the invention. Therefore, it must be expressly understood that the illustrated embodiment has been shown only for the purposes of example and should not be taken as limiting the invention, which is defined by the following claims. The following claims are thus to be read as not only literally including what is set forth by the claims but also to include all equivalent elements for performing substantially the same function in substantially the same way to obtain substantially the same result, even though not identical in other respects to what is shown and described in the above illustrations.

What is claimed is:

1. A method of analyzing the design preference tendencies of a group of selectors, the method comprising:
    (a) presenting, over an electronic network, to a plurality of selectors, one or more groups of decision objects, each decision object comprising a form of a product or service, each decision object further comprising a plurality of attributes;
    (b) obtaining information from the plurality selectors indicative of a preference of the respective selectors from among the presented decision objects;
    (c) using the information to determine a derived group of decision objects comprising one or more different combinations of attributes;
    (d) iterating steps (a) through (c), using a derived group from step (c) to arrive at one or more preferred decision objects;
    (e) using at least some information from step (b) to implement a conjoint analysis to gather information relevant to the attribute preferences of said selectors; and
    (f) providing a report based on the preferences of at least some of the selectors.

2. The method of claim 1, wherein the selector comprises one or more of: (i) a person; (ii) a group of persons; (iii) a proxy for a person; (iv) a machine learning system; (v) a neural net, statistical or other mathematical model, or expert system; or (vi) a combination thereof.

3. The method of claim 1 wherein a genetic algorithm is used to determine a derived group of decision objects.

4. The method of claim 1 wherein the decision objects comprise advertising material.

5. The method of claim 1 wherein the decision objects comprise packaging material.

6. The method of claim 1 wherein the decision objects comprise manufactured consumer goods.

7. The method of claim 1 wherein step (f) comprises generating the report which describes the design preference tendencies of the group of selectors.

8. The method of claim 1 wherein step (d) further comprises iterating steps (a) through (c) for a predetermined number of iterations.

9. The method of claim 1 wherein step (d) further comprises iterating steps (a) through (c) for a predetermined length of time.

10. The method of claim 1 further comprising the step of presenting a plurality of questions to each selector for a reply.

11. The method of claim 10 wherein each selector's reply is utilized to choose decision objects to be presented to that selector in step (a).

12. The method of claim 10 wherein more than one selector's replies are utilized to choose decision objects to be presented to each selector in step (a).

13. A method of analyzing the design preference tendencies of a group of selectors, the method comprising:
    (a) presenting, over an electronic network to a plurality of selectors, one or more groups of decision objects, each decision object comprising a form of a product or service, each decision object further comprising a plurality of attributes;
    (b) obtaining data from the plurality of selectors indicative of a preference of a selector from among the presented decision objects;
    (c) using at least some data from step (b) to implement a conjoint analysis to gather information relevant to the attribute preferences of the plurality of selectors;
    (d) presenting, over an electronic network, to a plurality of selectors, one or more additional groups of decision objects having a plurality of combinations of attributes;
    (e) obtaining information from a selector expressing a preference of that selector from among the presented decision objects;

(f) using the information to determine a derived group of decision objects comprising one or more different combinations of attributes;
(g) iterating steps (d) through (f), using a derived group from step (f) to arrive at one or more preferred decision objects;
(h) upon achieving a stopping criterion, selecting one or a group of preferred decision objects for further development, manufacture, use, or sale; and
(i) providing a report based on the preferences of at least some of the selectors.

14. The method of claim 13, wherein the selector comprises one or more of: (i) a person; (ii) a group of persons; (iii) a proxy for a person; (iv) a machine learning system; (v) a neural net, statistical or other mathematical model, or expert system; or (vi) a combination thereof.

15. The method of claim 13 wherein a genetic algorithm is used to determine the derived group of decision objects.

16. The method of claim 13 wherein step (c) is performed after step (g).

17. The method of claim 13 wherein step (c) is performed after step (h).

18. The method of claim 13 wherein the results of the conjoint analysis of step (c) are used to influence the attribute combinations of the population of additional decision objects presented in step (d).

19. The method of claim 13 wherein the decision objects presented in step (a) comprise random sets of attributes.

20. The method of claim 13 wherein the decision objects presented in step (a) comprise attributes designed to enhance the efficiency of the conjoint analysis of step (c).

21. The method of claim 13 wherein before step (a), a plurality of questions is presented to each selector for a reply.

22. The method of claim 21 wherein each selector's reply is utilized to choose decision objects to be presented to that selector.

23. The method of claim 21 wherein more than one selector's replies are utilized to choose decision objects to be presented to each selector.

24. A method of identifying and analyzing at least one selector's preferences for decision object attributes, the method comprising:
(a) presenting, over an electronic network, at least one decision object from a first population to the selector, the at least one decision object comprising a form of a product or service, the at least one decision object further comprising a plurality of attributes;
(b) obtaining, over the electronic network, data from the selector expressing that selector's preferences for the at least one decision object;
(c) repeating steps (a) and (b) until a switching criterion is met;
(d) presenting, over the electronic network, at least one decision object from a second population to the selector;
(e) obtaining, over the electronic network, information from the selector expressing that selector's preferences for at least one decision object;
(f) using the information to evolve at least one decision object in the second population;
(g) repeating steps (d) through (f) until a stopping criterion is met; and (h) providing a report based on the preferences of at least the at least one selector.

25. The method of claim 24, wherein the selector comprises one or more of: (i) a person; (ii) a group of persons; (iii) a proxy for a person; (iv) a machine learning system; (v) a neural net, statistical or other mathematical model, or expert system; or (vi) a combination thereof.

26. The method of claim 24 wherein step (c) further comprises, after the switching criterion is met, conducting a conjoint analysis on the obtained data.

27. The method of claim 26 wherein step (c) further comprises, selecting at least one decision object to be presented to the selector in response to the conjoint analysis.

28. The method of claim 24 wherein step (g) further comprises, after the stopping criterion is met, conducting a conjoint analysis on the obtained data and information.

29. The method of claim 24 wherein step (c) further comprises, after the switching criterion is met, utilizing the obtained data to select at least one decision object from the second population to be presented to the selector in step (d).

30. The method of claim 24 wherein a conjoint analysis is performed using either the obtained data or the obtained information.

31. The method of claim 24 wherein a conjoint analysis is performed using both the obtained data and information.

32. The method of claim 24 wherein step (h) comprises generating the report which identifies each selector's preferences for the decision object attributes.

33. The method of claim 24 wherein the switching criterion comprises a set number of repetitions of steps (a) and (b).

34. The method of claim 24 wherein the switching criterion comprises reaching a predetermined time limit.

35. The method of claim 24 wherein the stopping criterion comprises a set number or repetitions of steps (d) through (f).

36. The method of claim 24 wherein the stopping criterion comprises reaching a predetermined time limit.

37. The method of claim 24 wherein each decision object comprises advertising material.

38. The method of claim 24 wherein each decision object comprises packaging material.

39. The method of claim 24 wherein each decision object comprises manufactured consumer goods.

40. The method of claim 24 wherein, for each iteration, each selector is presented in step (d) with at least one decision object which is substantially different from that presented to any other selector.

41. A method of identifying and analyzing at least one selector's preferences for decision object attributes, the method comprising:
(a) presenting, over an electronic network, at least one decision object from a first population to the selector, the at least one decision object comprising a form of a product or service, the at least one decision object further comprising a plurality of attributes;
(b) obtaining, over the electronic network, information from the selector expressing that selector's preferences for at least one decision object;
(c) using the information to evolve at least one decision object in the first population;
(d) repeating steps (a) through (c) until a switching criterion is met;
(e) presenting, over the electronic network, at least one decision object from a second population to the selector;
(f) obtaining, over the electronic network, data from the selector expressing that selector's preferences for at least one decision object;
(g) repeating steps (e) and (f) until a stopping criterion is met; and (h) providing a report based on the preferences of at least the at least one selector.

42. The method of claim 41, wherein the selector comprises one or more of: (i) a person; (ii) a group of persons; (iii) a proxy for a person; (iv) a machine learning system; (v) a neural net, statistical or other mathematical model, or expert system; or (vi) a combination thereof.

43. The method of claim 41 wherein step (g) further comprises, after the stopping criterion is met, conducting a conjoint analysis on the obtained data.

44. The method of claim 41 wherein step (g) further comprises, after the stopping criterion is met, conducting a conjoint analysis on the obtained data and information.

45. The method of claim 41 wherein before step (a), a plurality of questions is presented to the selector for a reply.

46. The method of claim 45 wherein the reply is utilized to choose at least one decision object from the first population to be presented to the selector.

47. The method of claim 41 wherein at least one decision object of steps (a), (b), (c), (e), and (f) comprises a partial decision object, wherein the partial decision object comprises a subset of the decision object's attributes.

48. The method of claim 41 wherein a conjoint analysis is performed using the obtained data.

49. The method of claim 41 wherein a conjoint analysis is performed using both the obtained data and information.

50. The method of claim 41 wherein step (h) comprises generating the report which identifies each selector's preferences for the decision object attributes.

51. The method of claim 41 wherein the switching criterion comprises a set number of repetitions of steps (a) through (c).

52. The method of claim 41 wherein the switching criterion comprises reaching a predetermined time limit.

53. The method of claim 41 wherein the stopping criterion comprises a set number or repetitions of steps (e) and (f).

54. The method of claim 41 wherein the stopping criterion comprises reaching a predetermined time limit.

55. The method of claim 41 wherein each decision object comprises advertising material.

56. The method of claim 41 wherein each decision object comprises packaging material.

57. The method of claim 41 wherein each decision object comprises manufactured consumer goods.

58. The method of claim 41 wherein, for each iteration, each selector is presented in step (a) with at least one decision object which is substantially different from that presented to any other selector.

59. A method of identifying a subset of a larger population of decision objects for which each of a plurality of selectors has an affinity, each of the decision objects having a combination of attributes, the method comprising the steps of:

(a) presenting, over an electronic network, to each of the plurality of selectors a first group of decision objects selected from the larger set of decision objects, each decision object comprising a form of a product or service, each decision object further comprising a particular combination of attributes;

(b) capturing data indicative of a preference expressed for a subset of the presented decision objects by at least some of the selectors;

(c) using the captured data in a selection process to select a second group of decision objects;

(d) repeating steps (a) through (c), using the second group of step (c) as the first group of step (a), until a stopping condition is met;

(e) performing a conjoint analysis on the captured data; and (f) providing a report based on the preferences of at least some of the selectors.

* * * * *